United States Patent
Joshi et al.

(10) Patent No.: US 9,451,254 B2
(45) Date of Patent: Sep. 20, 2016

(54) DISABLING INTRA PREDICTION FILTERING

(71) Applicant: QUALCOMM Incorporated, San Diego, CA (US)

(72) Inventors: Rajan Laxman Joshi, San Diego, CA (US); Joel Sole Rojals, La Jolla, CA (US); Marta Karczewicz, San Diego, CA (US); Jewon Kang, Seoul (KR); Woo-Shik Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 14/334,496

(22) Filed: Jul. 17, 2014

(65) Prior Publication Data

US 2015/0023405 A1    Jan. 22, 2015

Related U.S. Application Data

(60) Provisional application No. 61/856,637, filed on Jul. 19, 2013, provisional application No. 61/857,131, filed on Jul. 22, 2013, provisional application No. 61/876,205, filed on Sep. 10, 2013, provisional application No. 61/880,087, filed on Sep. 19, 2013, provisional application No. 61/888,319, filed on Oct. 8, 2013, provisional application No. 61/890,822, filed on Oct. 14, 2013, provisional application No. 61/890,844, filed on Oct. 14, 2013.

(51) Int. Cl.
*H04N 19/593* (2014.01)
*H04N 19/176* (2014.01)
*H04N 19/70* (2014.01)
*H04N 19/117* (2014.01)
*H04N 19/82* (2014.01)

(52) U.S. Cl.
CPC ...... *H04N 19/00763* (2013.01); *H04N 19/117* (2014.11); *H04N 19/176* (2014.11); *H04N 19/593* (2014.11); *H04N 19/70* (2014.11); *H04N 19/82* (2014.11)

(58) Field of Classification Search
CPC ................. H04N 19/00763; H04N 19/00884; H04N 19/00896
See application file for complete search history.

(56) References Cited

U.S. PATENT DOCUMENTS

2010/0128803 A1* 5/2010 Divorra Escoda ... H04N 19/159
375/240.29
2011/0103485 A1* 5/2011 Sato ..................... H04N 19/105
375/240.16

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Dave Czekaj
*Assistant Examiner* — Nam Pham
(74) *Attorney, Agent, or Firm* — Shumaker & Sieffert, P.A.

(57) ABSTRACT

A video decoder may adaptively disable, based on a syntax element, one or more filters used for intra-prediction. In addition, the video decoder may perform intra-prediction to generate prediction data for a current block of a current video slice. Furthermore, a video encoder may adaptively disable one or more filters used for intra-prediction. Furthermore, the video encoder may signal a syntax element that controls the one or more filters. In addition, the video encoder may perform intra prediction to generate prediction data for a current video block the video data.

23 Claims, 22 Drawing Sheets

(56) References Cited

U.S. PATENT DOCUMENTS

| | | | |
|---|---|---|---|
| 2012/0082219 A1* | 4/2012 | Sun | H04N 7/26058 375/240.12 |
| 2014/0078394 A1* | 3/2014 | Lou | H04N 11/20 348/453 |

OTHER PUBLICATIONS

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

Bross et al., "High efficiency video coding (HEVC) text specification draft 10 (for FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

Bross, et al., "Editors' Proposed Corrections to HEVC version 1," Joint Collaborative Team on Video Coding (JCT-VC) of ITU-T SG16 WP3 and ISO/IEC JTC1/SC29/WG11, 13th Meeting, Incheon, KR, Apr. 2013, 309 pp.

Flynn, et al., "HEVC Range Extensions Draft 3," JCT-VC meeting; MPEG meeting; Apr. 18-26, 2013; Incheon; (Joint Collaborative Team on Video Coding of ISO/IEC JTC1/SC29/WG11 and ITU-T SG.16 ); URL: http://wftp3.itu.int/av-arch/jctvc-site/, Document: JCTVC-M1005_v1, XP030114428, 315 pp.

Kang, et al., "Implicit Derivation for Adaptively Turning Filtering off in Intra Prediction," JCT-VC Meeting; Oct. 23-Nov. 1, 2013; Geneva; (Joint Collaborative Team on Video Coding of ISO/IECJTC1/SC29/WG11 and ITU-T SG.16); URL: http://wftp3.itu.int/av-arch/jctvc-site/, No. JCTVC-08181-r2, XP030115217, 8 pp.

Lai, et al., "Description of Screen Content Coding Technology Proposal by MediaTek," JCT-VC Meeting; Mar. 27-Apr. 4, 2014; Valencia; (Joint Collaborative Team on Video Coding of ISO/IEC JTC1/SC29/WG11 and ITU-T SG.16); URL: http://wftp3.itu.int/av-arch/jctvc-site/, No. JCTVC-Q0033-v4, XP030115920, 31 pp.

Lan, et al. "Intra and Inter Coding tools for screen contents," 20110311, No. JCTVC-E145, Mar. 11, 2011; KP030008651, 11 pp.

McCann, et al., "High Efficiency Video Coding (HEVC) Test Model 10 (HM 10) Encoder Description", JCT-VC Meeting, MPEG Meeting, Jan. 14-23, 2013, Geneva, (Joint Collaborative Team on Video Coding of ISO/IEC JTC1/SC29/WG11 and ITU-T SG.16), URL: http://wftp3.itu.int/av-arch/jctvc-site/, No. JCTVC-_1002_v1, XP030113947, 37 pp.

Zheng et al., "CE13: Mode Dependent Hybrid Intra Smoothing," Joint Collaborative Team on Video Coding (JCT-VC) of ITU-T SG16 WP3 and ISO/IEC JTC1/SC29/WG11 4th Meeting; Document: JCTVC-D282, Jan. 20-28, 2011, 5 pp.

Zheng, et al., "Simplified Intra Smoothing," MPEG Meeting; Oct. 7-15, 2010; Guangzhou; (Motion Picture Expert Group or ISO/IEC JTC1/SC29/WG11), Document: JCTVC-C234; No. M18274, XP030007941, 4 pp.

Zhou, "RExt: Proposed changes in the horizontal and vertical gradient filtering control for intraprediction", JCT-VC Meeting; Oct. 23-Nov. 1, 2013; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-O0147, XP030115164, 5 pp.

Flynn, et al., "High Efficiency Video Coding (HECV) Range Extensions text specification: Draft 3," (Joint Collaborative Team on Video Coding of ISO/IEC JTC1/SC29/WG11 and ITU-T SG.16); Apr. 18-26, 2013, Document: JCTVC-M1005_v1, 315 pp.

Chen, et al., "Non-RCE 2: Enhanced angular intra prediction for screen content coding," (Joint Collaborative Team on Video Coding of ISO/IEC JTC1/SC29/WG11 and ITU-T SG.16); Document: JCTVC-N0183, Jul. 25-Aug. 2, 2013, 6 pp.

Bross, et l., "Editors' proposed corrections to HEVC version 1," (Joint Collaborative Team on Video Coding of ISO/IEC JTC1/SC29/WG11 and ITU-T SG.16); Apr. 18-26, 2013, Document: JCTVC-M0432_v3, 310 pp.

International Search Report and Written Opinion from International Application No. PCT/US2014/047222, dated Oct. 8, 2014, 11 pp.

Response to Written Opinion dated Oct. 23, 2014, from International Application No. PCT/US2014/047222, filed on May 5, 2015, 5 pp.

Second Written Opinion from International Application No. PCT/US2014/047222, dated Jun. 23, 2015, 11 pp.

Response to Second Written Opinion dated Jun. 23, 2015, from International Application No. PCT/US2014/047222, filed on Aug. 21, 2015, 5 pp.

International Preliminary Report on Patentability from International Application No. PCT/US2014/047222, dated Sep. 15, 2015, 6 pp.

* cited by examiner

| $P_{-1,-1}$ | $P_{-1,0}$ | $P_{-1,1}$ | . . . | $P_{-1,N-1}$ | $P_{-1,N}$ | . . . | | $P_{-1,2N-1}$ |
|---|---|---|---|---|---|---|---|---|
| $P_{0,-1}$ | $P_{0,0}$ | $P_{0,1}$ | . . . | $P_{0,N-1}$ | | | | |
| $P_{1,-1}$ | $P_{1,0}$ | | | .<br>.<br>. | | | | |
| .<br>.<br>. | .<br>.<br>. | | | | | | | |
| $P_{M-1,-1}$ | $P_{M-1,0}$ | . . . | | $P_{M-1,N-1}$ | | | | |
| $P_{M,-1}$ | | | | | | | | |
| .<br>.<br>. | | | | | | | | |
| $P_{2M-1,-1}$ | | | | | | | | |

FIG. 3

| $P_{-1,-1}$ | $P_{-1,0}$ | $P_{-1,1}$ | • • • | $P_{-1,N-1}$ | $P_{-1,N}$ | • • • | | $P_{-1,2N-1}$ |
|---|---|---|---|---|---|---|---|---|
| $P_{0,-1}$ | $P_{0,0}$ | $P_{0,-1}$ | • • • | $P_{0,N-1}$ | | | | |
| $P_{1,-1}$ | $P_{1,0}$ | | | ⋮ | | | | |
| ⋮ | ⋮ | | | | | | | |
| $P_{M-1,-1}$ | $P_{M-1,0}$ | • • • | | $P_{M-1,N-1}$ | | | | |
| $P_{M,-1}$ | | | | | | | | |
| ⋮ | | | | | | | | |
| | | | | | | | | |
| $P_{2M-1,-1}$ | | | | | | | | |

M = N = 4 in this figure

FIG. 5

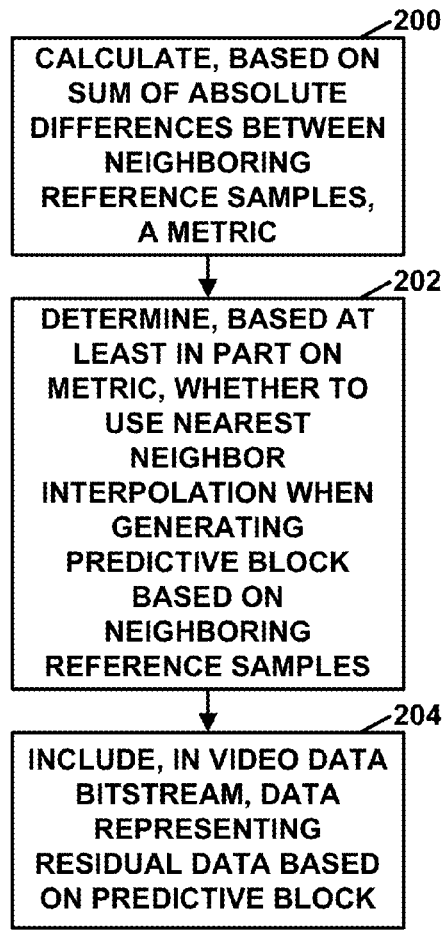
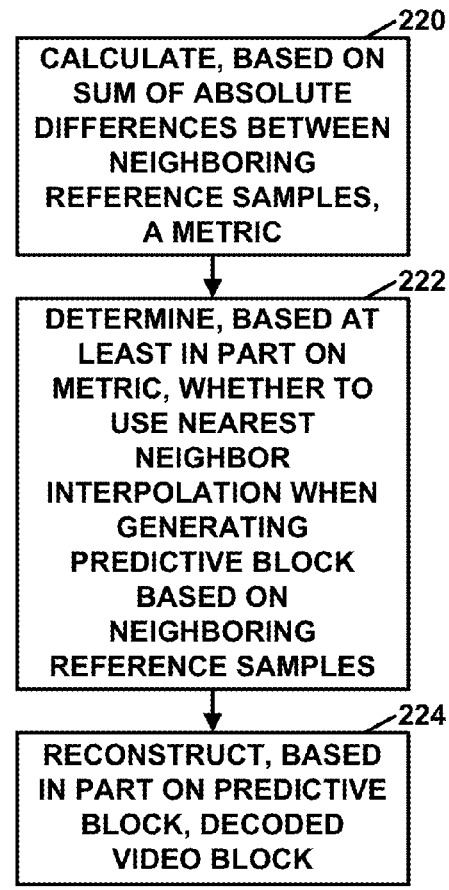
FIG. 12A
FIG. 12B

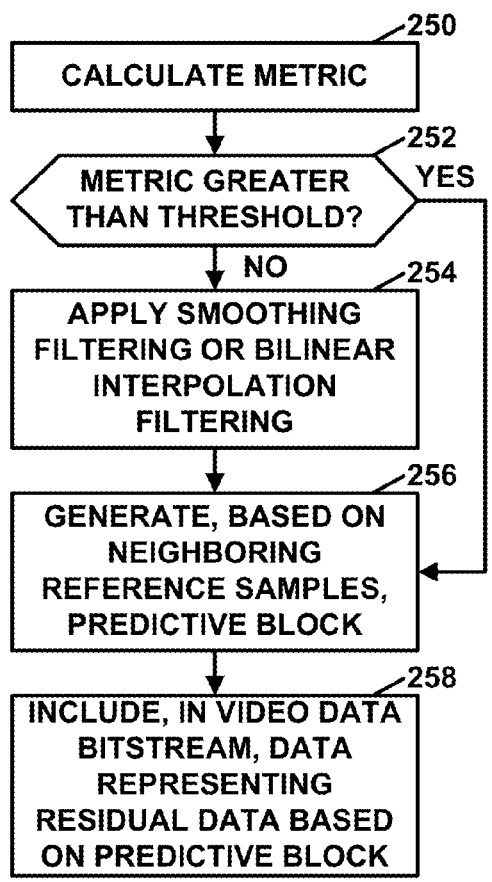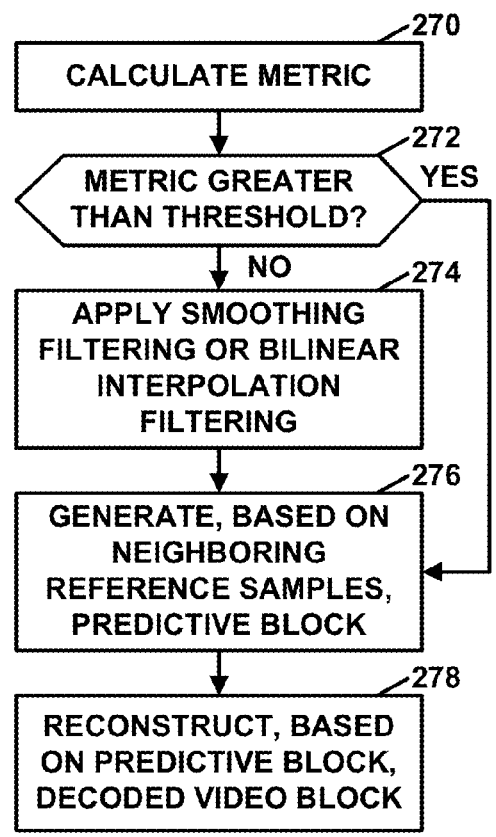
FIG. 13A
FIG. 13B

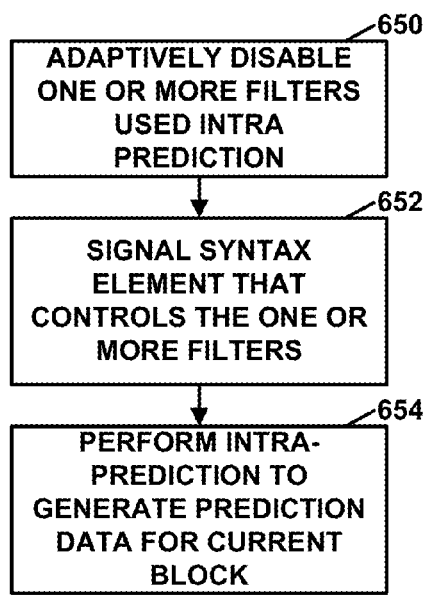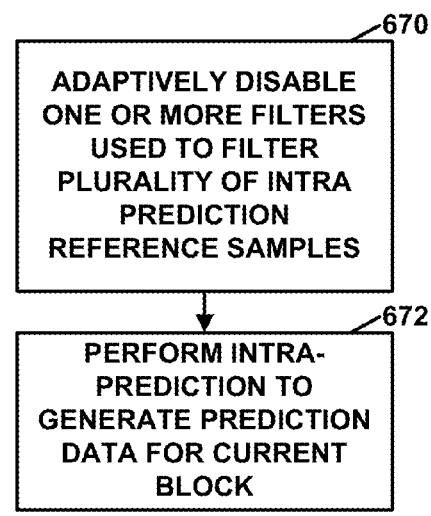
FIG. 22A
FIG. 22B

DISABLING INTRA PREDICTION FILTERING

This application claims the benefit of U.S. Provisional Patent Application No. 61/856,637, filed Jul. 19, 2013, U.S. Provisional Patent Application No. 61/857,131, filed Jul. 22, 2013, U.S. Provisional Patent Application No. 61/876,205, filed Sep. 10, 2013, U.S. Provisional Patent Application No. 61/880,087, filed Sep. 19, 2013, U.S. Provisional Patent Application No. 61/888,319, filed Oct. 8, 2013, U.S. Provisional Patent Application 61/890,822, filed Oct. 14, 2013, and U.S. Provisional Patent Application No. 61/890,844, filed Oct. 14, 2013, the entire content of each of which is incorporated herein by reference.

TECHNICAL FIELD

This disclosure relates to video encoding and decoding and, in some examples, filtering of reference samples for intra-prediction.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. In some examples, such video blocks may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients (i.e., residual transform coefficients), which then may be quantized. The quantized coefficients (i.e., the residual transform coefficients), initially arranged in a two-dimensional array, may be scanned in order to produce a one-dimensional vector of coefficients (i.e., transform coefficients), and entropy coding may be applied to achieve even more compression.

A multiview coding bitstream may be generated by encoding views, e.g., from multiple perspectives. Some three-dimensional (3D) video standards have been developed that make use of multiview coding aspects. For example, different views may transmit left and right eye views to support 3D video. Alternatively, some 3D video coding processes may apply so-called multiview plus depth coding. In multiview plus depth coding, a 3D video bitstream may contain not only texture view components, but also depth view components. For example, each view may comprise one texture view component and one depth view component.

SUMMARY

In general, this disclosure describes techniques for intra-prediction. As described in one example technique of this disclosure, a video encoder may adaptively disable one or more filters used for intra prediction. The video encoder may signal a syntax element that controls the one or more filters. In addition, the video encoder may perform intra prediction to generate prediction data for a current video block of the video data. Furthermore, in some examples, a video decoder may adaptively disable, based on a syntax element, one or more filters used for intra prediction. In addition, the video decoder may perform intra prediction to generate prediction data for the current block.

In accordance with an example, this disclosure describes a method of decoding video data, the method comprising: adaptively disabling, based on a syntax element, one or more filters used for intra-prediction; and performing intra-prediction to generate prediction data for a current block of a current video slice.

In another example, this disclosure describes a method of encoding video data, the method comprising: adaptively disabling one or more filters used for intra prediction; signaling a syntax element that controls the one or more filters; and performing intra prediction to generate prediction data for a current video block the video data.

In another example, this disclosure describes a video decoding device comprising: a computer-readable medium configured to store video data, and one or more processors configured to: adaptively disable, based on a syntax element, one or more filters used for intra prediction; and perform intra prediction to generate prediction data for a current block of a current video slice.

In another example, this disclosure describes a video encoding device comprising: a computer-readable medium configured to store video data, and one or more processors configured to: adaptively disable one or more filters used for intra prediction; signal a syntax element that controls the one or more filters; and perform intra prediction to generate prediction data for a current video block the video data.

In another example, this disclosure describes a video decoding device comprising: means for adaptively disabling, based on a syntax element, one or more filters used for intra-prediction; and means for performing intra-prediction to generate prediction data for a current block of a current video slice.

In another example, this disclosure describes a video encoding device comprising: means for adaptively disabling one or more filters used for intra prediction; means for signaling a syntax element that controls the one or more filters; and means for performing intra prediction to generate prediction data for a current video block the video data.

In another example, this disclosure describes a computer-readable data storage medium (e.g., a non-transitory computer-readable data storage medium) having instructions stored thereon that when executed cause one or more processors to: adaptively disable, based on a syntax element, one or more filters used for intra-prediction; and perform intra-prediction to generate prediction data for a current block of a current video slice.

In another example, this disclosure describes a computer-readable data storage medium (e.g., a non-transitory computer-readable data storage medium) having instructions stored thereon that when executed cause one or more processors to: adaptively disable one or more filters used for intra prediction; signal a syntax element that controls the one or more filters; and perform intra prediction to generate prediction data for a current video block the video data.

The details of one or more examples are set forth in the accompanying drawings and the description below. Other features, objects, and advantages will be apparent from the description, drawings, and claims.

BRIEF DESCRIPTION OF DRAWINGS

FIG. 3 is a conceptual diagram illustrating example reference samples of a block for High-Efficiency Video Coding (HEVC) intra-prediction.

FIG. 5 is a conceptual diagram illustrating a method for adaptive filter control for reference samples of a block for HEVC intra-prediction in accordance with an example of this disclosure.

FIG. 12A is a flowchart illustrating an example operation of a video encoder to encode video data, in accordance with one or more techniques of this disclosure.

FIG. 12B is a flowchart illustrating an example operation of a video decoder to decode video data, in accordance with one or more techniques of this disclosure.

FIG. 13A is a flowchart illustrating an example operation of a video encoder to encode video data, in accordance with one or more techniques of this disclosure.

FIG. 13B is a flowchart illustrating an example operation of a video decoder to decode video data, in accordance with one or more techniques of this disclosure.

FIG. 22A is a flowchart illustrating an example operation of a video encoder to encode video data, in accordance with one or more techniques of this disclosure.

FIG. 22B is a flowchart illustrating an example operation of a video decoder to decode video data, in accordance with one or more techniques of this disclosure.

DETAILED DESCRIPTION

Figure 1:
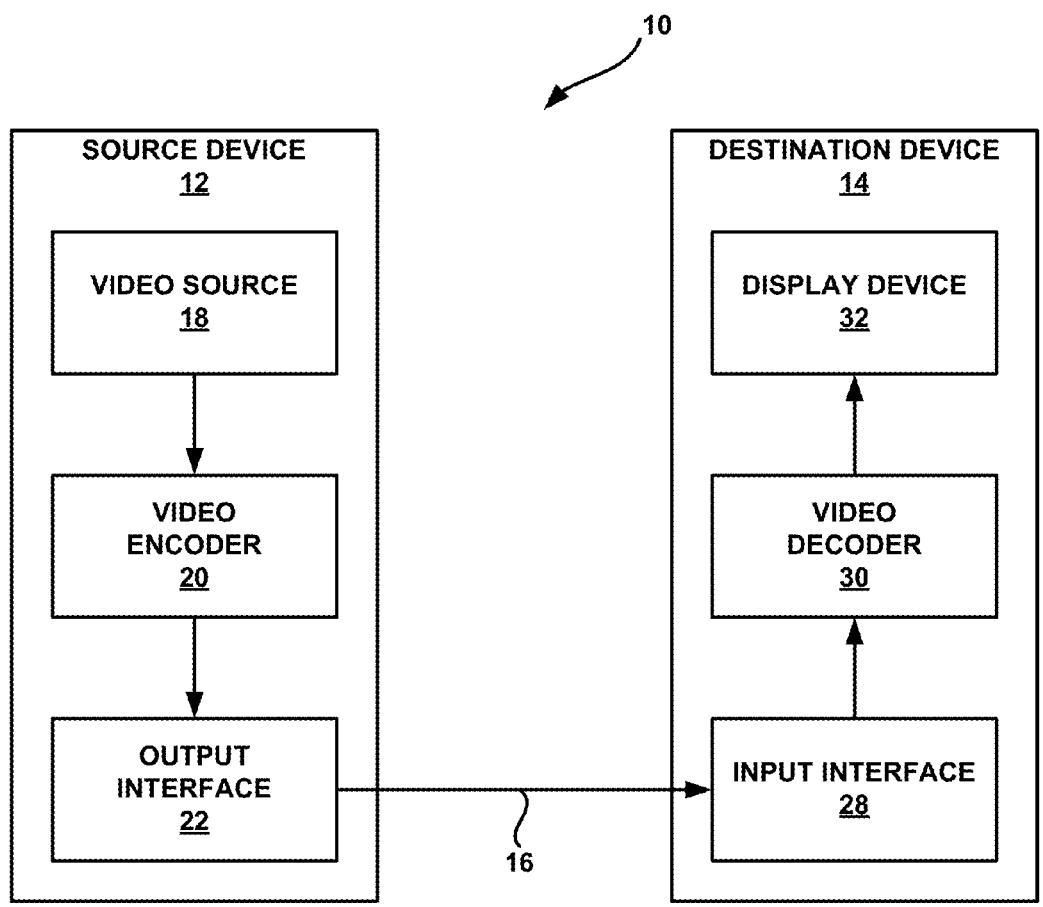
FIG. 1 is a block diagram illustrating an example video coding system that may utilize the techniques described in this disclosure.

Many video coding standards, such as High Efficiency Video Coding (HEVC), implement intra-prediction. In general, intra-prediction involves the generation, based on reference samples in a picture that is currently being coded, of a predictive block for a block that is currently being coded. This disclosure may refer to the picture that is currently being coded as the current picture. Furthermore, this disclosure may refer to the block that is currently being coded as the current block. The video coder may use various intra-prediction modes to generate a predictive block. The intra-prediction modes may include angular intra-prediction modes, a planar intra-prediction mode, and a DC intra-prediction mode.

A video coder may use various filters when using intra-prediction to generate a predictive block. For example, the video coder may determine values of samples of the predictive block based on values of reference samples located along the left and top edges of the current block. In this example, when the video coder uses a diagonal intra-prediction mode or the planar intra-prediction mode, the video coder may apply a smoothing filter to the reference samples to reduce differences between the reference samples. In some examples, the video coder may apply or disable the smoothing filter in other circumstances as well. The strength of this smoothing filter may be dependent on the size of the current block. Furthermore, when the size of the current block is larger, the video coder may apply the smoothing filter to the reference samples when using an increased range of diagonal intra-prediction modes.

Furthermore, when the video coder uses an angular intra-prediction mode to generate a predictive block, the video coder may determine, for each respective sample of the predictive block, an intersection point where a line passing through the respective sample intersects the top row of reference samples or the left column of reference samples. The angular intra-prediction mode defines the angle and direction of the line. The video coder may use a bilinear interpolation filter to determine, based on the reference sample on either side of the intersection point, a value of an interpolated reference sample. The value of the respective predicted sample is equal to the value of this interpolated reference sample. In this way, the video coder may use bilinear interpolation to generate the predictive block.

In some examples, when the video coder uses an angular intra-prediction mode to generate a predictive block, the video coder may determine, for each respective sample of the predictive block, a fractional position factor (e.g., iFact) for the respective sample. Furthermore, in such examples, when the fractional position factor for the respective sample does not have a particular value (e.g., 0), the video coder may determine the value of the respective sample using a bilinear interpolation filter over the reference samples on either side of the intersection point, as described above. Otherwise, in such examples, when the fractional position factor for the respective sample has the particular value (e.g., 0), the video coder may determine the value of the respective sample is equal to one of the reference samples.

Furthermore, when the video coder uses an angular intra-prediction mode that is horizontal, the size of the predictive block is less than 32×32, and the current block is not coded using transform and quantization bypass mode, the video coder may apply edge filtering to the top row of samples of the predictive block. In some examples, the video coder may apply the edge filtering to only the luma samples of the top row of the samples of the predictive block. Similarly, when the video coder uses an angular intra-prediction mode that is vertical, the size of the predictive block is less than 32×32, and the current block is not coded using transform and quantization bypass mode, the video coder may apply edge filtering to the left column of samples of the predictive block. In some examples, the video coder may apply the edge filtering to only the luma samples of the left column of the samples of the predictive block.

When the video coder uses the DC intra-prediction mode and the size of the predictive block is less than 32×32, and the component index for the block is 0 (luma), the video coder may apply a two-tap Finite Impulse Response (FIR) filter to a first column of the predictive block. In some examples, the video coder may also apply the two-tap FIR filter to a first (i.e., top) row of the predictive block. The video coder may also apply a three-tap filter to a corner sample of the predictive block.

In some examples, it may be desirable to disable one or more of the filters mentioned above. For instance, it may be desirable to disable application of the smoothing filter, regardless of the size of the current block and the intra-prediction mode. Furthermore, it may be desirable to disable the bilinear interpolation filter, regardless of the value of the fractional position factor. Additionally, it may be desirable to disable the edge filter regardless of the angular intra-prediction mode, size of the predictive block, and the transform and quantization bypass mode. Likewise, it may be desirable to disable the filter applied when the video coder uses the DC intra-prediction mode.

For example, synthetic video content (e.g., computer-generated graphics) tend to include sharp edges. In such situations, the use of the filters when using intra-prediction to generate predictive blocks may reduce coding efficiency, resulting in larger bitstreams. In other words, the filtering operations may blur the differences between samples on opposite sides of a sharp edge, resulting in inaccurate predictive samples. Hence, to increase coding efficiency, it may be desirable to disable one or more of these filters.

The techniques of this disclosure include techniques for disabling the application of a filter when generating a predictive block using intra-prediction. For instance, in accordance with some of the techniques of this disclosure, a video decoder may adaptively disable, based on a syntax element, one or more filters used for intra prediction. Furthermore, the video decoder may performing intra-prediction to generate prediction data for a current block of a current video slice. In this way, the video decoder may be able to determine adaptively whether to apply the filters when using intra-prediction to generate the predictive block. This may increase coding efficiency In another example, a video encoder may signal, in a bitstream, one or more syntax elements that a video decoder may use to determine whether to apply one or more filters when using intra-prediction to generate a predictive block. In accordance with one such example, a video decoder may decode a value for a first syntax element (e.g., filter_disable_flag) and a value for a second syntax element (e.g., transform_skip_flag). In this example, the first syntax element is representative of whether to enable a filter for intra-prediction of a block of the video data. The second syntax element specifies whether residual signals after prediction are quantized without transform. The video decoder may intra-predictive decode the block. As part of intra-predictive decoding the block, the video decoder may determine whether to enable or disable the filter based at least in part on the value for the first syntax element and the value for the second syntax element. When the filter is enabled, the video decoder may apply the filter to intra-predictive data for the block. In other words, the video decoder may use the filter in a process to determine values of samples of the predictive block. In this way, the video decoder may be able to determine whether to apply the filters when using intra-prediction to generate the predictive block.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding. Hence, FIG. 1 is a block diagram illustrating an example video encoding and decoding system 10 that may utilize the techniques described in this disclosure. The techniques described in this disclosure include techniques for signaling adaptive filter use in intra-prediction.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Thus, video coding system 10 includes a source device 12 that generates encoded video data to be decoded at a later time by a destination device 14. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, video streaming devices, in-car computers, or the like. In some cases, source device 12 and destination device 14 may be equipped for wireless communication.

Destination device 14 may receive encoded video data from source device 12 via a channel 16. In other words, source device 12 may provide video data to destination device 14 via channel 16. Channel 16 may also be referred to as a "link." In some examples, channel 16 may comprise a computer-readable medium. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. Thus, in some examples, encoded data may be output from output interface 22 to a storage device. Similarly, encoded data may be accessed from the storage device by input interface. The storage medium (e.g., storage device) may include a variety of locally-accessed data storage media such as Blu-ray discs, DVDs, CD-ROMs, flash memory, or other suitable digital storage media for storing encoded video data. Thus, channel 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and may provide the encoded video data to destination device 14, e.g., via network transmission. Similarly, a computing device of a medium production facility, such as a disc stamping facility, may receive encoded video data from source device 12 and produce a disc containing the encoded video data. Therefore, channel 16 may be understood to include one or more computer-readable media of various forms, in various examples.

In a further example, channel 16 may include a file server or another intermediate storage device that stores encoded video data generated by source device 12. In this example, destination device 14 may access encoded video data stored at the file server or other intermediate storage device (e.g., via streaming or download). The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet (such as such as dynamic adaptive streaming over HTTP (DASH)), encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In many examples, the encoding and decoding is performed by devices that do not communicate with one another, but simply encode data to memory and/or retrieve and decode data from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data. As a further alternative, video source 18 may generate computer graphics-based data as the source video, or a combination of live video, archived video, and computer-generated video.

Video encoder 20 may encode video data (e.g., captured, pre-captured, or computer-generated video) from video source 18. In some examples, source device 12 directly transmits the encoded video data to destination device 14 via output interface 22. In other examples, the encoded video data may also be stored onto a storage medium or a file server for later access by destination device 14 for decoding and/or playback. In accordance with one or more of the techniques of this disclosure, video encoder 20 of source device 12 may apply techniques for signaling adaptive filter use in intra-prediction.

In the example of FIG. 1, destination device 14 includes an input interface 28, a video decoder 30, and a display device 32. In other examples, source device 12 and destination device 14 may include other components or arrangements. For example, source device 12 may receive video data from an external video source, such as an external camera. Likewise, destination device 14 may interface with an external display device, rather than including an integrated display device.

Input interface 28 may receive encoded video data over channel 16. In some examples, input interface 28 includes a receiver and/or a modem. Video decoder 30 may decode encoded video data. The encoded video data communicated over channel 16, or provided on a storage device, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server. Thus, in some examples, input interface 28 of destination device 14 receives information from channel 16 (e.g., a computer-readable medium). The information of channel 16 may include syntax information defined by video encoder 20, which is also used by video decoder 30, that includes syntax elements that describe characteristics and/or processing of blocks and other coded units, e.g., groups of pictures (GOPs).

Display device 32 may display the decoded video data (e.g., to a user). Display device 32 may be integrated with or may be external to destination device 14. In some examples, destination device 14 may include an integrated display device and may be configured to interface with an external display device. In other examples, destination device 14 may be a display device. Display device 32 may comprise a variety of display devices, such as a liquid crystal display (LCD), a plasma display, an organic light emitting diode (OLED) display, a cathode ray tube (CRT) display, or another type of display device.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. MUX-DEMUX units may conform to a suitable multiplexer protocol. For instance, if applicable, MUX-DEMUX units may conform to the ITU H.223 multiplexer protocol, or other protocols such as the user datagram protocol (UDP).

Video encoder 20 and video decoder 30 each may be implemented as any of a variety of suitable circuitry (e.g., encoder or decoder circuitry, as applicable), such as one or more microprocessors, digital signal processors (DSPs), application-specific integrated circuits (ASICs), field-programmable gate arrays (FPGAs), discrete logic, hardware, or any combinations thereof. In examples where the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

The illustrated system 10 of FIG. 1 is merely one example. Techniques for signaling adaptive filter use in intra-prediction may be performed by any digital video encoding and/or decoding device. Although generally the techniques of this disclosure are performed by a video encoding device, the techniques may also be performed by a video encoder/decoder, typically referred to as a "CODEC." Moreover, a video preprocessor may perform one or more of the techniques of this disclosure. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some instances, any bitstream conforming to the MVC-based 3DV extension of H.264/AVC always contains a sub-bitstream that is compliant to the MVC extension of H.264/AVC. Furthermore, there is an ongoing effort to generate a three-dimensional video (3DV) coding extension to H.264/AVC, namely AVC-based 3DV. In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March 2005, which may be referred to herein as the H.264 standard or H.264 specification, or the H.264/AVC standard or specification. The Joint Video Team (JVT) continues to work on extensions to H.264/MPEG-4 AVC. In other examples, video encoder 20 and video decoder 30 may operate according to ITU-T H.261, ISO/IEC MPEG-1 Visual, ITU-T H.262 or ISO/IEC MPEG-2 Visual, and ITU-T H.264, ISO/IEC Visual. Alternatively, video encoder 20 and video decoder 30 may operate according to other proprietary or industry standards, or extensions of such standards.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). In some examples, video encoder 20 and video decoder 30 conform to the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three or thirty-five intra-prediction encoding modes. The techniques of this disclosure are described with reference to HEVC for purposes of illustration, but are not necessarily limited to any particular coding standard.

A recent draft of the HEVC standard, referred to as "HEVC Working Draft 10" or "WD10," is described in document JCTVC-L1003v34, Bross et al., "High efficiency video coding (HEVC) text specification draft 10 (for FDIS & Last Call)," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which is downloadable from: http://phenix.int-evry.fr/jct/doc_end_user/documents/12_Geneva/wg11/JCTVC-L1003-v34.zip.

Another recent HEVC text specification draft, referred to as HEVC WD10 or "WD10 revisions" for simplicity, described in Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, April 2013, is available from http://phenix.int-evey.fr/jct/doc_end_user/documents/13_Incheon/wg11/JCTVC-M0432-v3.zip. A final version of the HEVC standard is available and may be referred to as "HEVC version 1." Furthermore, there are ongoing efforts to produce scalable video coding, multi-view coding, and 3DV extensions for HEVC. The scalable video coding extension of HEVC may be referred to as SHEVC. The 3DV extension of HEVC may be referred to as HEVC-based 3DV or HEVC-3DV.

The JCT-VC has developed the HEVC standard and continues to work toward range extensions of the HEVC standard. Range extensions for the HEVC standard are described in Flynn, Sole Rojals, and Suzuki, "High Efficiency Video Coding (HEVC) Range Extensions text specification: Draft 3," JCTVC-M1005-v2, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, referred to herein as "HEVC Range Extensions," or "JCTVC-M1005-v2." At least as of 14 Oct. 2013, JCTVC-M1005 is available from: http://phenix.int-evry.fr/jct/doc_end_user/documents/13_Incheon/wg11/JCTVC-M1005-v2.zip.

In HEVC and other video coding specifications, a video sequence typically includes a series of pictures. Pictures may also be referred to as "frames." A group of pictures (GOP) generally comprises a series of one or more of the video pictures. A GOP may include syntax data in a header of the GOP, a header of one or more of the pictures, or elsewhere, that describes a number of pictures included in the GOP.

A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). In this way, the working model of the HM describes that a video frame or picture may be divided into a sequence of treeblocks or LCUs (also referred to as "coding tree units") that include both luma and chroma samples. A treeblock may have a similar purpose as a macroblock of the H.264 standard.

The CTUs of HEVC may be broadly analogous to the macroblocks of other standards, such as H.264/AVC. However, a CTU is not necessarily limited to a particular size and may include one or more coding units (CUs). Syntax data within a bitstream may define a size for LCUs, which is a largest coding unit in terms of the number of pixels.

A video frame or picture may be partitioned into one or more slices. A slice may include an integer number of CTUs ordered consecutively in a raster scan order. In other words, a slice may include a number of consecutive treeblocks in coding order. In some examples, each slice of a picture may include slice syntax data that describes an encoding mode for the respective slice. Video encoder 20 typically operates on video blocks within individual video slices in order to encode the video data. The video blocks may have fixed or varying sizes, and may differ in size according to a specified coding standard.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. A CU may have a similar purpose as a macroblock of the H.264 standard, except that a CU does not have a size distinction.

Accordingly, in some examples, each treeblock may be split into one or more CUs according to a quadtree. For example, a treeblock may be split into four child nodes (also referred to as sub-CUs), and each child node may in turn be a parent node and be split into another four child nodes. In general, a quadtree data structure includes one node per CU, with a root node corresponding to the treeblock. If a CU is split into four sub-CUs, the node corresponding to the CU includes four leaf nodes, each of which corresponds to one of the sub-CUs. A final, unsplit child node, referred to as a leaf node of the quadtree, comprises a coding node, also referred to as a leaf-CU (e.g., a coded video block). Thus, a video block may correspond to a coding node within a CU. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred to as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split. A size of the CU corresponds to a size of the coding node (i.e., a size of a coding block of the CU) and, in some examples, must be square in shape. The size of the CU may range from 8×8 pixels up to the size of the treeblock with a maximum of 64×64 pixels or greater. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU).

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., predictive luma, Cb, and Cr blocks) for prediction blocks (e.g., luma, Cb, and Cr prediction blocks) of each PU of the CU. Thus, a leaf-CU may include one or more PUs. In general, a PU represents a spatial area corresponding to all or a portion of the corresponding CU, and may include data for retrieving a reference sample for the PU.

Moreover, a PU may include data related to prediction. In other words, a PU may include data related to the prediction process. For example, when the PU is intra-mode encoded, the PU may include data describing an intra-prediction mode for the PU. As another example, when the PU is inter-mode encoded, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape.

The HM supports prediction in various PU sizes. For instance, in some examples, assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM may also support asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Video encoder 20 may use intra-prediction or inter-prediction to generate the predictive blocks for a PU. If video encoder 20 uses intra-prediction to generate the predictive blocks of a PU, video encoder 20 may generate the predictive blocks of the PU based on decoded samples of the picture associated with the PU. If video encoder 20 uses inter-prediction to generate the predictive blocks of a PU, video encoder 20 may generate the predictive blocks of the PU based on decoded samples of one or more pictures other than the picture associated with the PU. In some examples, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

Figure 2:
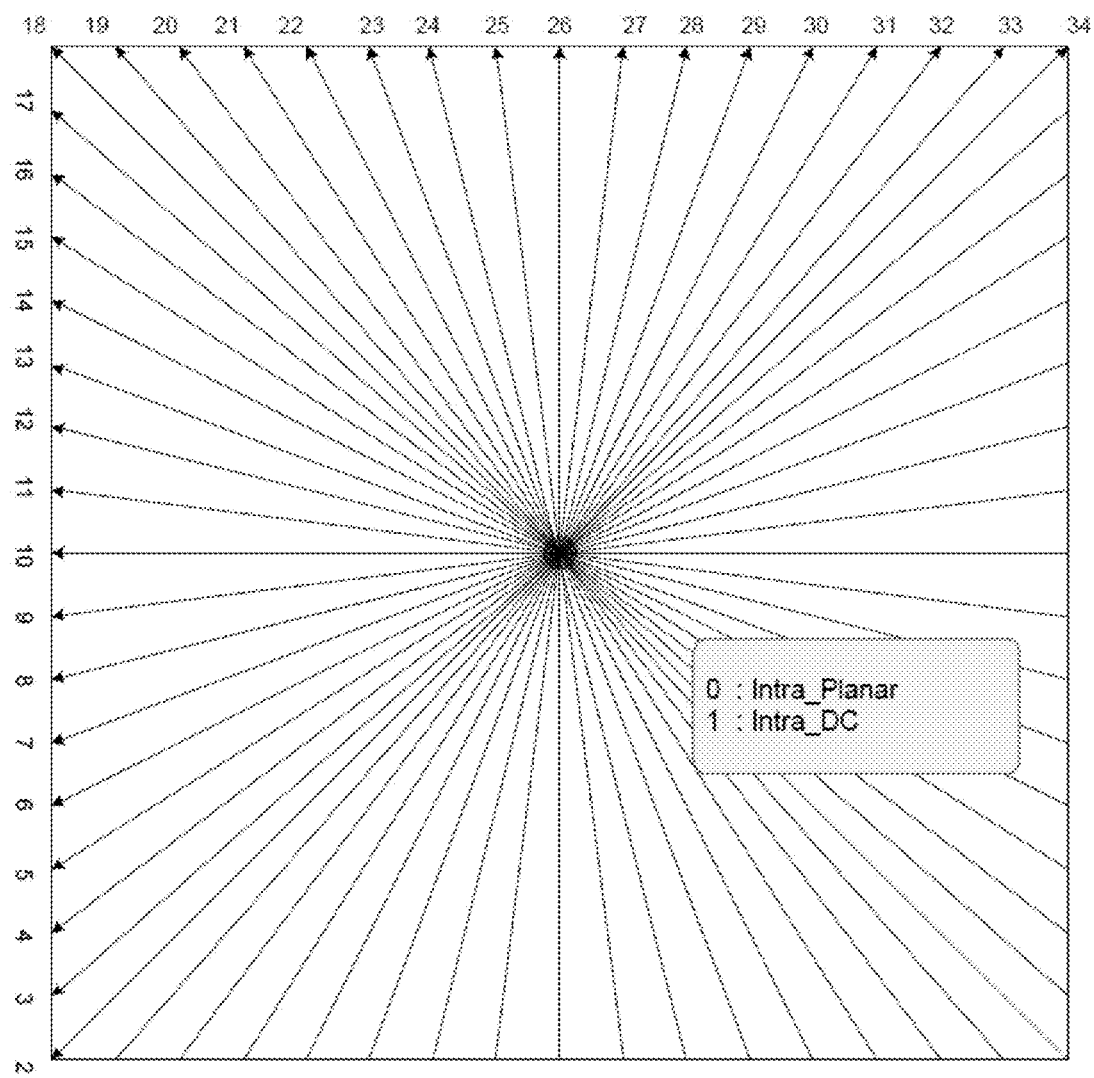
FIG. 2 is a conceptual diagram illustrating example intra-prediction mode directions.

When a video coder uses intra-prediction to generate a predictive block, the video coder may generate the predictive block according to an intra-prediction mode from a plurality of available intra-prediction modes. The intra-prediction modes may include a plurality of directional (i.e., angular) intra-prediction modes. For instance, in some versions of HEVC, there are 33 directional intra-prediction modes. Each of the directional intra-prediction modes corresponds to a different direction. FIG. 2 is a conceptual diagram illustrating example intra-prediction mode directions. When the video coder generates a predictive block according to a directional intra-prediction mode, the video coder may, for each respective sample of the predictive block, assign to the respective sample a value of a reference sample (or a weighted combination of reference samples) that is aligned with the respective sample in a direction corresponding to the directional intra-prediction mode. When a video coder uses a directional (i.e., angular) intra-prediction mode to generate a predictive block for a current block, the video coder may be said to be performing angular intra-prediction.

After video encoder 20 generates predictive blocks (e.g., predictive luma, Cb, and Cr blocks) for one or more PUs of a CU, video encoder 20 may generate one or more residual blocks for the CU. In other words, following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data.

Each sample in a residual block indicates a difference between a sample in one of the CU's predictive blocks and a corresponding sample in one of the CU's coding blocks. For example, video encoder 20 may generate a luma residual block for the CU. Each sample in the CU's luma residual block indicates a difference between a luma sample in one of the CU's predictive luma blocks and a corresponding sample in the CU's original luma coding block. Thus, residual data may correspond to pixel differences between pixels of the unencoded picture and prediction values corresponding to the PUs. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

A leaf-CU having one or more PUs may also include one or more transform units (TUs). In general, a TU is used for the transform and quantization processes. A given CU having one or more PUs may also include one or more TUs. Video encoder 20 may use quad-tree partitioning to decompose the residual blocks (e.g., luma, Cb, and Cr residual blocks) of a CU into one or more transform blocks (e.g., luma, Cb, and Cr transform blocks). A transform block is a rectangular (e.g., square or non-square) block of samples on which the same transform is applied. Thus, a TU can be square or, in some examples, non-square (e.g., rectangular) in shape. Following prediction, video encoder 20 may calculate residual values corresponding to the PU. The residual values comprise pixel difference values that may be transformed into transform coefficients, quantized, and scanned using the TUs to produce serialized transform coefficients for entropy coding.

In some examples, the TUs are sized based on the size of PUs within a given CU defined for a partitioned LCU, although this may not always be the case. The TUs are typically the same size or smaller than the PUs. Thus, a TU is not necessarily limited to the size of a PU. Rather, TUs may be larger or smaller than a PU. For intra coding, a PU may be collocated with a corresponding leaf-TU for the same CU. In some examples, the maximum size of a leaf-TU may correspond to the size of the corresponding leaf-CU.

In some examples, a split flag may indicate whether a leaf-CU is split into four TUs. Then, each TU may be split further into further sub-TUs. When a TU is not split further, it may be referred to as a leaf-TU. In some examples, for intra coding, all the leaf-TUs belonging to a leaf-CU share the same intra-prediction mode. That is, the same intra-prediction mode is generally applied to calculate predicted values for all TUs of a leaf-CU. For intra coding, a video encoder may calculate a residual value for each leaf-TU using the intra-prediction mode, as a difference between the portion of the CU corresponding to the TU and the original block.

In some examples, residual samples corresponding to a CU may be subdivided into smaller units using a quadtree structure known as "residual quad tree" (RQT). In other words, the TUs may be specified using an RQT (also referred to as a TU quadtree structure). That is, TUs of leaf-CUs may also be associated with respective quadtree data structures, referred to as RQTs. In this way, a leaf-CU may include a quadtree indicating how the leaf-CU is partitioned into TUs. The leaf nodes of the RQT may be referred to as TUs. The root node of a TU quadtree generally corresponds to a leaf-CU, while the root node of a CU quadtree generally corresponds to a treeblock (or LCU). TUs of the RQT that are not split may be referred to as leaf-TUs. In general, this disclosure uses the terms CU and TU to refer to leaf-CU and leaf-TU, respectively, unless noted otherwise. Pixel difference values associated with the TUs may be transformed to produce transform coefficients, which may be quantized. In some examples, when the PU is intra-mode encoded, data for the PU may be included in a RQT, which may include data describing an intra-prediction mode for a TU corresponding to the PU.

A TU of a CU may comprise a transform block of luma samples, two corresponding transform blocks of chroma samples, and syntax structures used to transform the transform block samples. In other words, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block. In this way, a CU may include a coding node and PUs and TUs associated with the coding node. Syntax data associated with a CU may also describe, for example, partitioning of the CU into one or more TUs according to a quadtree. This disclosure may use the term "block" to refer to any of a CU, PU, or TU, in the context of HEVC, or similar data structures in the context of other standards (e.g., macroblocks and sub-blocks thereof in H.264/AVC). Furthermore, in some instances, this disclosure may use the term "video block" to refer to a coding node of a CU. In some specific cases, this disclosure may also use the term "video block" to refer to a treeblock, i.e., LCU, or a CU, which includes a coding node and PUs and TUs.

Video encoder 20 may apply one or more transforms to a luma transform block of a TU to generate a luma coefficient block for the TU. In other words, the HEVC standard allows for transformations according to TUs, which may be different for different CUs. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU. In this way, video encoder 20 may form the TUs including the residual data for the CU, and then transform the TUs to produce transform coefficients for the CU. Video encoder 20 may form the TUs including the residual data for the CU, and then transform the TUs to produce transform coefficients for the CU.

After generating a coefficient block (e.g., a luma coefficient block, a Cb coefficient block or a Cr coefficient block), video encoder 20 may quantize the coefficient block. In other words, following any transforms to produce transform coefficients, video encoder 20 may perform quantization of the transform coefficients. Quantization generally refers to a process in which transform coefficients are quantized to possibly reduce the amount of data used to represent the transform coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. For instance, after scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a picture parameter set (PPS), a second type of NAL unit may encapsulate an RBSP for a coded slice, a third type of NAL unit may encapsulate an RBSP for SEI, and so on. NAL units that encapsulate RBSPs for video coding data (as opposed to RBSPs for parameter sets and SEI messages) may be referred to as video coding layer (VCL) NAL units.

HEVC and other video coding standards provide for various types of parameter sets. For example, a video parameter set (VPS) is a syntax structure comprising syntax elements that apply to zero or more entire coded video sequences (CVSs). A sequence parameter set (SPS) may contain information that applies to all slices of a CVS. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

One or more of the techniques of this disclosure are related to video coding according to HEVC Range Extensions. In other words, one or more of the techniques of this disclosure may be used in conjunction with HEVC Range Extensions. One or more of the techniques may provide adaptive filter control for reference samples used in intra-prediction in HEVC Range Extensions. Techniques related to screen contents coding are also described in this disclosure. However, the techniques of this disclosure are not necessarily limited to the HEVC standard, or to HEVC Range Extensions, and may be applicable in other video coding systems and processes. In the section below, several filtering operations used for intra sample prediction in the current HEVC Range Extensions working draft specification (JCTVC-M1005-v2) are presented.

In HEVC intra-prediction, already reconstructed samples from the top and left side neighboring blocks are used for prediction. The neighboring reference samples, which may number as many as 2*width+2*height+1 samples, are used for the reference samples for intra-prediction. Accordingly, these already-reconstructed samples may be referred to as reference samples. In other words, in the intra sample prediction, the neighboring samples from the top and the left side of a block to be intra encoded by video encoder 20 or intra decoded by video decoder 30 that are already reconstructed before the deblocking filter are used for the prediction. That is, these top- and left-side pixels are referred to as reference samples. The reference samples may be reconstructed samples obtained before application of loop-filtering. For instance, per the techniques of JCTVC-M1005-v2, in intra-sample prediction, neighboring samples from the top and the left side are reconstructed before the deblocking filter is used for the prediction.

FIG. 3 is a conceptual diagram illustrating example reference samples of a block for HEVC intra-prediction. In other words, FIG. 3 is a conceptual diagram illustrating a current block and neighboring blocks to the current block. FIG. 3 shows a block of size M (height)×N (width), and the neighboring samples, including the left neighboring samples and the top neighboring reference samples. Specifically, FIG. 3 shows a block size 4×4, and the shaded neighboring samples (as many as 2*width+2*height+1) may be used as reference samples. The samples are denoted by $P_{i,j}$, $0 \le i \le (M-1)$, $0 \le j \le (N-1)$. In other words, the current block includes pixels in rows (0,0) to (M−1,0), and columns (0,0) to (0,N−1).

The shaded blocks represent neighboring pixels (i.e., reference samples) that may be available for predicting the pixels of the current block. In the example of FIG. 3, the reference samples used for intra-prediction are denoted by $P_{-1,j}$, $-1 \le j \le (2N-1)$ and $P_{i,-1}$, $0 \le i \le (2M-1)$. In HEVC and other video coding standards, if one or more reference pixels are not available, a video coder may use a specific padding process to generate missing reference samples. For instance, if the neighboring pixels are not available (e.g. in a picture or a slice boundary), HEVC uses a specific padding process to substitute the missing samples, as specified in sub-clause 8.4.4.2.2 of JCTVC-M1005-v2. Hence, it may be assumed that a padding process has been completed so that all the reference samples are available.

For certain intra-prediction modes, a bilinear interpolation is performed to form the prediction. In other words, when a video coder uses particular intra-prediction modes to generate a predictive block, the video coder may determine, for each respective sample of the predictive block, a value of the respective sample based on a bilinear interpolation of two of the reference samples. For instance, when the video coder uses an angular intra-prediction mode to generate a predictive block, the video coder may determine, for each respective sample of the predictive block, an intersection point where a line passing through the respective sample intersects the top row of reference samples or the left column of reference samples. The angular intra-prediction mode defines the angle and direction of the line. The video coder may use a bilinear interpolation filter to determine, based on the reference sample on either side of the intersection point, a value of an interpolated reference sample. The value of the respective predicted sample is equal to the value of this interpolated reference sample.

Figure 4A:
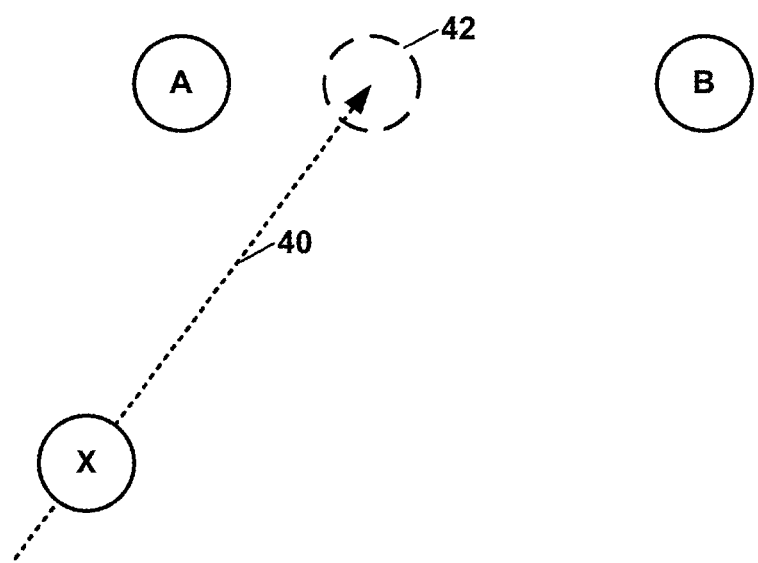
FIG. 4A is a conceptual diagram illustrating bi-linear interpolation in angular intra-prediction.

FIG. 4A is a conceptual diagram illustrating bi-linear interpolation in angular intra-prediction. In the example of FIG. 4A, a video coder is determining a value of sample "X" in a predictive block. A line 40 passing through sample "X" intersects the top row of reference samples at a location 42 between reference sample "A" and reference sample "B." Line 40 is not actually present in the predictive block or picture, but is shown for purposes of illustration. Accordingly, the video coder uses a bilinear interpolation filter to determine the value for location 42. The value of the sample "X" is set equal to the determined value for location 42.

In JCTVC-M1005-v2, bilinear interpolation is specified by Equations (8-52) and (8-60). A portion of section 8.4.4.2.6 of JCTVC-M1005-v2 containing Equations (8-52) and (8-60) are reproduced below.

If predModeIntra is equal or greater than 18, the following ordered steps apply:
1. . . . .
2. The values of the prediction samples predSamples[x][y], with x, y=0 . . . nTbS−1 are derived as follows:
    a. The index variable iIdx and the fractional position factor iFact are derived as follows:

$$iIdx=((y+1)*\text{intraPredAngle})>>5 \qquad (8\text{-}50)$$

$$i\text{Fact}=((y+1)*\text{intraPredAngle})\ \&\ 31 \qquad (8\text{-}51)$$

b. Depending on the value of iFact, the following applies:
        If iFact is not equal to 0, the value of the prediction samples predSamples[x][y] is derived as follows:

$$\text{predSamples}[x][y]=((32-i\text{Fact})*\text{ref}[x+iIdx+1]+i\text{Fact}*\text{ref}[x+iIdx+2]+16))>>5 \qquad (8\text{-}52)$$

Otherwise, the value of the prediction samples predSamples[x][y] is derived as follows:

$$\text{predSamples}[x][y]=\text{ref}[x+iIdx+1] \qquad (8\text{-}53)$$

c. When predModeIntra is equal to 26 (vertical), cIdx is equal to 0, nTbS is less than 32 and cu_transquant_bypass_flag is equal to 0, the following filtering applies with x=0, y=0 . . . nTbS−1:

$$\text{predSamples}[x][y]=\text{Clip1}_Y(p[x][-1]+((p[-1][y]-p[-1][-1])>>1)) \qquad (8\text{-}54)$$

Otherwise (predModeIntra is less than 18), the following ordered steps apply:
1. . . . .
2. The values of the prediction samples predSamples[x][y], with x, y=0 . . . nTbS−1 are derived as follows:
    a. The index variable iIdx and the fractional position factor iFact are derived as follows:

$$iIdx=((x+1)*\text{intraPredAngle})>>5 \qquad (8\text{-}58)$$

$$i\text{Fact}=((x+1)*\text{intraPredAngle})\ \&\ 31 \qquad (8\text{-}59)$$

b. Depending on the value of iFact, the following applies:
        If iFact is not equal to 0, the value of the prediction samples predSamples[x][y] is derived as follows:

$$\text{predSamples}[x][y]=((32-i\text{Fact})*\text{ref}[y+iIdx+1]+i\text{Fact}*\text{ref}[y+iIdx+2]+16))>>5 \qquad (8\text{-}60)$$

Otherwise, the value of the prediction samples predSamples[x][y] is derived as follows:

$$\text{predSamples}[x][y]=\text{ref}[y+iIdx+1] \qquad (8\text{-}61)$$

c. When predModeIntra is equal to 10 (horizontal), cIdx is equal to 0, nTbS is less than 32 and cu_transquant_bypass_flag is equal to 0, the following filtering applies with x=0 . . . nTbS−1, y=0:

$$\text{predSamples}[x][y]=\text{Clip1}_Y(p[-1][y]+((p[x][-1]-p[-1][-1])>>1)) \qquad (8\text{-}62)$$

Screen content or non-camera generated content may contain very sharp edges. Consequently, bilinear interpolation may not be suitable for forming the prediction value for such content. Accordingly, Chen et al., "Non-RCE2: Enhanced angular intra-prediction for screen content coding," JCTVC-N0183, JCT-VC of ITU-T SG 16 WP 3 and ISO/IEC JTC 1/SC 29/WG 11, 14th Meeting: Vienna, Austria, 25 Jul. to 2 Aug. 2013 (hereinafter, "JCTVC-N0183") proposed using nearest-neighbor interpolation when iFact is not equal to zero, subject to the condition that variance of a subset of reference samples is greater than a threshold. In other words, JCTVC-N0183 proposed using the nearest-neighboring sample selection without the 1/32 pel accuracy interpolation filter subject to a condition. In one approach, if the variance of a subset of reference sample is greater than a threshold, the filtering is disabled. The subset is determined (i.e., the reference samples in the subset are determined) with an intra-prediction direction. In other words, in JCTVC-N0183, the subset of reference sample is determined based on intra-prediction mode. In another approach, if the difference between the two adjacent reference samples is greater than a threshold, the filtering is disabled. As described in JCTVC-N0183, this adaptation is performed for all the prediction samples. In other words, a video coder may determine, for each sample of the predictive block, whether to apply the bilinear interpolation filter.

As shown above in equations (8-51) and (8-59), above, iFact is a fractional position factor based on a position of a sample of a predictive block and the intra-prediction angle. JCTVC-N0183 proposed using nearest-neighbor interpolation when iFact is not equal to zero, subject to the condition that the variance of a subset of reference samples is greater than a threshold. In other words, if the variable of a subset of the reference samples is greater than the threshold and iFact is not equal to zero, a video coder may use nearest-neighbor interpolation. JCTVC-N0183 proposed using nearest-neighbor interpolation when iFact is not equal to zero, subject to the condition that the variance of a subset of reference samples is greater than a threshold. In other words, if the variable of a subset of the reference samples is greater than the threshold and iFact is not equal to zero, a video coder may use nearest-neighbor interpolation. Although this disclosure describes nearest-neighbor interpolation as a form of interpolation, nearest-neighbor interpolation may merely comprise setting a predictive sample equal to one of the reference samples without modification of the value of the reference sample based on values of any other reference samples.

The use of a bilinear interpolation filter and nearest-neighbor prediction proposed by JCTVC-N0183 can be specified as follows. The bilinear interpolation between reference samples A and B can be described as:

predSamples[$x$][$y$]=((32−$i$Fact)*$A$+$i$Fact*$B$+16)>>5

For nearest-neighbor interpolation, if iFact is less than or equal to 16, predSamples[$x$][$y$]=$A$, otherwise
predSamples[$x$][$y$]=$B$.

Figure 4B:
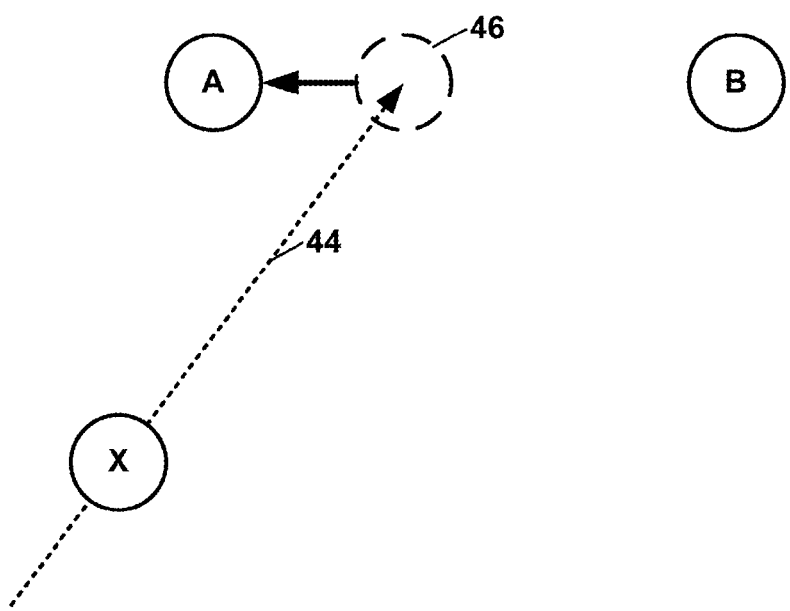
FIG. 4B is a conceptual diagram illustrating nearest-neighbor prediction in angular intra-prediction.

FIG. 4B is a conceptual diagram illustrating nearest-neighbor prediction in angular intra-prediction. FIG. 4B is similar to FIG. 4A in that a video coder is determining a value of sample "X" in a predictive block. A line 44 passing through sample "X" intersects the top row of reference samples at a location 46 between reference sample "A" and reference sample "B." Line 44 is not actually present in the predictive block or picture, but is shown for purposes of illustration. However, in nearest-neighbor prediction, the video coder does not use a bilinear interpolation filter to determine the value for location 46. Rather, the value of the sample "X" is set equal to whichever one of the reference samples (e.g., reference sample "A") is closer to the location where line 44 intersects the top row of reference samples. For instance, if the value of iFact for sample "X" is less than or equal to 16, the value of the sample "X" is set equal to the value of sample "A." Otherwise, the value of the sample "X" is set equal to the value of sample "B." Thus, no filtering is applied in nearest-neighbor prediction.

JCTVC-M1005-v2 describes generation and substitution of general reference samples. JCTVC-M1005-v2 also describes a mode-dependent intra-smoothing (MDIS) process. After the reference samples are generated as discussed above, a smoothing filter can be applied for each reference sample. For example, different smoothing filters may be applied differently for particular block sizes and prediction modes. HEVC uses a [1 2 1]/4 smoothing filter for a block size larger than or equal to 8×8. In addition, a stronger smoothing can be performed for a 32×32 block size if the neighboring samples meet certain criteria. As for the intra-prediction mode, only the diagonal modes (i.e., 2, 18, 34) in the angular prediction plus a planar mode use the smoothed reference samples in 8×8 block size. However, the restriction to the prediction mode is more relaxed in larger blocks. For example, for 32×32 blocks, in an encoder or decoder, all angular modes except for the horizontal and vertical prediction direction use the smoothed samples. The DC intra-prediction mode does not use the smoothing filtering in any case. A more detailed description of the DC intra-prediction mode is provided in sub-clause 8.4.4.2.3 of JCTVC-M1005-v2.

JCTVC-M1005-v2 also describes 1/32-pel (i.e., 1/32 pixel) bi-linear interpolation. In the angular prediction, each predicted sample (i.e., each sample of a predictive block) is obtained by projecting a location to the reference pixels. The prediction value is interpolated at 1/32 pixel accuracy using the two nearest reference samples as specified in the JCTVC-M1005-v2, shown below in formula (8-52):

predSamples[$x$][$y$]=((32−$i$Fact)*ref[$x$+$iIdx$+1]+
$i$Fact*ref[$x$+$iIdx$+2]+16)>>5      (8-52)

In formula (8-52), iFact is a weighting between the two reference samples (i.e., ref[$x$+$i$Idx+1] and ref[$x$+$i$Idx+2]) corresponding to the projected sub-pixel location. iFact is derived from the prediction direction and the x and y indices of the prediction sample. More details are discussed in sub-clause 8.4.4.2.6 of JCTVC-M1005-v2, above.

JCTVC-M1005-v2 also describes boundary filtering, e.g., using an edge filter and/or DC filtering. In edge filtering, an encoder and/or decoder filters a first prediction column for vertical prediction and a first prediction row for horizontal prediction using a gradient based smoothing, respectively, shown in equation (8-54) and (8-62) of JCTVC-M1005-v2, as follows:

predSamples[$x$][$y$]=Clip1$Y$($p$[$x$][−1]+
(($p$[−1][$y$]−$p$[−1][−1])>>1))      (8-54)

predSamples[$x$][$y$]=Clip1$Y$($p$[−1][$y$]+
(($p$[$x$][−1]−$p$[−1][−1])>>1))      (8-62)

In DC filtering, a first prediction row of a predictive block and a first prediction column of the predictive block are filtered using the DC value with a two-tap FIR filter, and a corner sample of the predictive block is filtered with a 3-tap filter (the DC value, the above, and the left neighboring sample) for the luminance (luma) component when a block size is less than 32. The DC value is computed in the HEVC WD specification, as follows:

$$dcVal = \left( \sum_{x'=0}^{nTbS-1} p[x'][-1] + \sum_{y'=0}^{nTbS-1} p[-1][y'] + nTbS \right) >> (k+1) \qquad (8\text{-}41)$$

where $k = \text{Log2}(nTbS)$.

Section 8.4.4.2.5 of JCTVC-M1005-v2, which includes equation (8-41), is reproduced below.
Inputs to this process are:
  the neighbouring samples p[x][y], with x=−1, y=−1 . . . nTbS*2−1 and x=0 . . . nTbS*2−1, y=−1,
  a variable nTbS specifying the transform block size,
  a variable cIdx specifying the colour component of the current block. Outputs of this process are the predicted samples predSamples[x][y], with x, y=0 . . . nTbS−1.
The values of the prediction samples predSamples[x][y], with x, y=0 . . . nTbS−1, are derived by the following ordered steps:
  1. A variable dcVal is derived as follows:

$$dcVal = \left( \sum_{x'=0}^{nTbS-1} p[x'][-1] + \sum_{y'=0}^{nTbS-1} p[-1][y'] + nTbS \right) >> (k+1) \quad (8\text{-}41)$$

where $k = \text{Log2}(nTbS)$.

2. Depending on the value of the colour component index cIdx, the following applies:
     If cIdx is equal to 0 and nTbS is less than 32, the following applies:

predSamples[0][0]=(p[−1][0]+2*dcVal+p[0][−1]+2)>>2  (8-42)

predSamples[x][0]=(p[x][−1]+3*dcVal+2)>>2, with x=1 . . . nTbS−1  (8-43)

predSamples[0][y]=(p[−1][y]+3*dcVal+2)>>2, with y=1 . . . nTbS−1  (8-44)

predSamples[x][y]=dcVal, with x, y=1 . . . nTbS−1  (8-45)

Otherwise, the prediction samples predSamples[x][y] are derived as follows:

predSamples[x][y]=dcVal, with x, y=0 . . . nTbS−1  (8-46)

As shown in equation (8-42) of section 8.4.4.2.5 of JCTVC-M1005-v2, a video coder applies a 3-tap FIR filter to the corner sample of the predictive block (i.e., predSamples[0][0]). Furthermore, as shown in equation (8-43) of 8.4.4.2.5 of JCTVC-M1005-v2, the video coder applies a 2-tap filter to the first row of the predictive block (i.e., predSamples[x][0]). Furthermore, as shown in equation (8-44) of 8.4.4.2.5 of JCTVC-M1005-v2, the video coder applies a 2-tap filter to the first column of the predictive block (i.e., predSamples[0][y]).

There may be one or more issues associated with the technique proposed by JCTVC-N0183. For example, the technique proposed by JCTVC-N0183 relies on a variance. The computation of this variance may be relatively complex.

In accordance with one example technique of this disclosure, instead of using the variance as proposed in JCTVC-N0183 to determine whether to use bilinear interpolation filtering or nearest-neighbor prediction (i.e., nearest-neighbor interpolation), a video coder may use a sum of absolute difference between neighboring reference samples as a metric. The computation of the sum of absolute differences may be less complex than the calculation of the variance. This metric may be used to determine whether nearest-neighbor interpolation is used. Let the subset of reference samples used for metric calculation contain K samples denoted by $S_i$, $0 \leq i \leq (K-1)$. Then, the sum of absolute difference between neighboring reference samples (SAD) is:

$$SAD = \sum_{i=0}^{K-2} \text{abs}(S_i - S_{i+1}).$$

Thus, in this example, a video coder may calculate, based at least in part on a sum of absolute differences between neighboring reference samples, a metric. For example, video encoder 20 may determine the SAD values for reference samples in the subset that are above the current block, separately determine the SAD values for reference samples that are on the left side of the current block, and then add these two SAD values. In addition, the video coder may determine, based at least in part on the metric, whether to use nearest-neighbor interpolation when generating a predictive block based on the neighboring reference samples.

In an alternative example, the SAD values for reference samples in the subset that are above the current block and those that are on the left side of the current block may be calculated separately and then added up. Furthermore, other metrics may be used to represent the variation in intra reference samples as well. In other words, a video coder may use other metrics to represent the variation in the intra reference samples.

Various examples of this disclosure describe determining a metric based on one or more neighboring reference samples. In such examples where the metric is used to determine a filtering mode to use, a video coder (e.g., a video encoder or a video decoder) may determine the metric based on values that the neighboring reference samples had prior to the application of intra smoothing (e.g., intra smoothing or bilinear interpolation for 32×32 blocks) to the neighboring reference samples. Alternatively, a video coder may determine the metric based on values that the neighboring reference samples have after application of intra smoothing to the neighboring reference samples. In examples where the metric is used to determine whether to disable filters, the video coder may determine the metric based on values that the neighboring reference samples have after application of intra smoothing to the neighboring reference samples.

As described above, when determining reference samples, HEVC (or another video coding specification) may use smoothing of the intra reference samples for certain intra-prediction modes and certain block sizes. For 32×32 blocks (i.e., blocks of size 32×32), under certain conditions, a bilinear interpolation filter may be applied instead of the smoothing filter. In other words, when a video coder is determining reference samples to use for generating a 32×32 predictive block, the video coder may apply a bilinear filter instead of a smoothing filter to the reference samples that the video coder will use to determine values of samples of the predictive block. Section 8.4.4.2.3 of the current HEVC Range Extensions specification (JCTVC-M1005-v2) describes the application of this bilinear filter to reference samples of 32×32 blocks instead of a smoothing filter. Section 8.4.4.2.3 of JCTVC-M1005-v2 is reproduced below:

8.4.4.2.3 Filtering Process Of Neighbouring Samples
Inputs to this process are:
  the neighbouring samples p[x][y], with x=−1, y=−1 . . . nTbS*2−1 and x=0 . . . nTbS*2−1, y=−1,
  a variable nTbS specifying the transform block size.
Outputs of this process are the filtered samples pF[x][y], with x=−1, y=−1 . . . nTbS*2−1 and x=0 . . . nTbS*2−1, y=−1.

The variable filterFlag is derived as follows:
  If one or more of the following conditions are true, filterFlag is set equal to 0:
    predModeIntra is equal to INTRA_DC.
    nTbS is equal 4.
  Otherwise, the following applies:
    The variable minDistVerHor is set equal to Min(Abs (predModeIntra−26), Abs(predModeIntra−10)).
    The variable intraHorVerDistThres[nTbS] is specified in Table 8-4.
    The variable filterFlag is derived as follows:
    If minDistVerHor is greater than intraHorVerDistThres [nTbS], filterFlag is set equal to 1.
    Otherwise, filterFlag is set equal to 0.

TABLE 8-4

Specification of intraHorVerDistThres[nTbS] for various transform block sizes

|  | nTbS = 8 | nTbS = 16 | nTbS = 32 |
|---|---|---|---|
| intraHorVerDistThres[nTbS] | 7 | 1 | 0 |

When filterFlag is equal to 1, the following applies:
  The variable biIntFlag is derived as follows:
    If all of the following conditions are true, biIntFlag is set equal to 1:
    strong_intra_smoothing_enabled_flag is equal to 1
    nTbS is equal to 32
    $Abs(p[-1][-1]+p[nTbS*2-1][-1]-2*p[nTbS-1][-1]) < (1<<(BitDepth_Y-5))$
    $Abs(p[-1][-1]+p[-1][nTbS*2-1]-2*p[-1][nTbS-1]) < (1<<(BitDepth_Y-5))$
    Otherwise, biIntFlag is set equal to 0.
  The filtering is performed as follows:
    If biIntFlag is equal to 1, the filtered sample values pF[x][y] with x=−1, y=−1 . . . 63 and x=0 . . . 63, y=−1 are derived as follows:

$$pF[-1][-1]=p[-1][-1] \qquad (8\text{-}30)$$

$$pF[-1][y]=((63-y)*p[-1][-1]+(y+1)*p[-1][63]+32)>>6 \text{ for } y=0 \ldots 62 \qquad (8\text{-}31)$$

$$pF[-1][63]=p[-1][63] \qquad (8\text{-}32)$$

$$pF[x][-1]=((63-x)*p[-1][-1]+(x+1)*p[63][-1]+32)>>6 \text{ for } x=0 \ldots 62 \qquad (8\text{-}33)$$

$$pF[63][-1]=p[63][-1] \qquad (8\text{-}34)$$

Otherwise (biIntFlag is equal to 0), the filtered sample values pF[x][y] with x=−1, y=−1 . . . nTbS*2−1 and x=0 . . . nTbS*2−1, y=−1 are derived as follows:

$$pF[-1][-1]=(p[-1][0]+2*p[-1][-1]+p[0][-1]+2)>>2 \qquad (8\text{-}35)$$

$$pF[-1][y]=(p[-1][y+1]+2*p[-1][y]+p[-1][y-1]+2)>>2 \text{ for } y=0 \ldots nTbS*2-2 \qquad (8\text{-}36)$$

$$pF[-1][nTbS*2-1]=p[-1][nTbS*2-1] \qquad (8\text{-}37)$$

$$pF[x][-1]=(p[x-1][-1]+2*p[x][-1]+p[x+1][-1]+2)>>2 \text{ for } x=0 \ldots nTbS*2-2 \qquad (8\text{-}38)$$

$$pF[nTbS*2-1][-1]=p[nTbS*2-1][-1] \qquad (8\text{-}39)$$

In another example technique of this disclosure, if a metric calculated over the reference samples (or a subset thereof) is greater than a threshold, filterFlag is set to 0. In other words, a video coder may set filterFlag to 0 in response to determining that a metric calculated over intra reference samples exceeds a threshold value. In some examples, this metric is the sum of absolute differences between neighboring reference samples. Setting filterFlag to 0 may imply that no smoothing or bilinear interpolation filtering (biIntFlag) is applied to the intra-prediction reference samples. In other words, a video coder does not apply smoothing or bilinear interpolation filtering to intra-prediction reference samples if the filterFlag is 0.

In accordance with another example technique of this disclosure, a metric (such as a variance or a sum of absolute difference between neighboring reference samples) is used to determine whether smoothing or bilinear interpolation filtering (biIntFlag) is applied to intra-prediction reference samples. In other words, a video coder determines, based on a metric, whether to apply smoothing or bilinear interpolation filtering to intra-prediction reference samples. In this example, another metric is then used to determine whether bilinear or nearest-neighbor interpolation is applied to the reference samples when iFact is not equal to 0. In other words, when iFact is not equal to 0, a video coder may determine, based on a second, different metric, whether to apply bilinear interpolation filtering or nearest-neighbor interpolation filtering to the intra-prediction reference samples. In some examples, the same metric (e.g., variance, sum of absolute differences between neighboring reference samples, etc.) is used to make both the decisions. For instance, a video coder may determine, based on the same metric, whether to apply smoothing or bilinear interpolation filter and whether to apply bilinear interpolation filtering or nearest-neighbor interpolation filtering to intra-prediction reference samples.

In accordance with another example technique of this disclosure, when iFact is not equal to 0, some prediction values may be formed using bilinear interpolation and other prediction values may be formed using nearest-neighbor interpolation. In other words, a video coder may use bilinear interpolation to determine values of some samples of a predictive block and may use nearest-neighbor interpolation to determine values of other samples of the predictive block. In this example, the metric to decide which form of interpolation to use is the absolute difference between the two reference samples that will be used for prediction. In other words, a video coder may determine, based on an absolute difference between the two reference samples to be used for determining the value of a sample of a predictive block, whether to determine the value of the sample using bilinear interpolation or nearest-neighbor interpolation. In this example, if this difference (i.e., the absolute difference between the reference samples) is greater than a threshold, the video coder uses nearest-neighbor interpolation. Furthermore, in this example, if the difference is less than or equal to a threshold, the video coder uses bilinear interpolation. In other examples, instead of using the absolute difference between the reference samples, the video coder may use other metrics as well.

In addition to the problems described above, the filtering operations used for intra-prediction may also present the following issues. First, the filtering design used for the intra-prediction in HEVC was developed for natural videos. However, screen contents or non-camera generated videos may include synthetic contents with sharp edges along object boundaries. This property may work against the filtering design principles used in HEVC. The filtering operations may blur differences. As a result, inaccurate prediction samples can incur a coding loss. Second, disabling the ⅟₃₂-pel interpolation filter may be adaptively triggered as described in the JCTVC-N0183 document. However, the decision processes described by JCTVC-N0183 are complicated. Moreover, the decision processes described by JCTVC-N0183 are not system-friendly designs due to the dependency on a prediction mode. Furthermore, the decision processes described in JCTVC-N0183 work only for the interpolation filter switch-off. Third, in JCTVC-N0183, thresholds used for the decision criteria are not flexible. As described elsewhere in this disclosure, the threshold used for the decision criteria can be formulated in a more flexible form than was proposed in JCTVC-N0183.

This disclosure describes various techniques for adaptively turning on and off filters used for intra-prediction. The techniques may be performed individually or in any combination, and may be performed within an encoder, such as video encoder 20, to support intra-encoding processes and/or a decoder, such as video decoder 30, to support intra-decoding processes.

This disclosure describes techniques for adaptively turning off filters used for intra-prediction. In some examples, the techniques may turn a filter disabling flag (i.e., a disable filtering flag) on to disable one or more filters, e.g., partially or fully. In other words, adaptively disabling the one or more filters comprises determining a value of a disabling flag that indicates whether the one or more filters are disabled. In various examples, the filter disabling flag may be turned on (e.g., to disable filters) when one or more criteria meet or exceed one or more prescribed thresholds. For example, a video coder may disable one or more filters in response to the video coder determining that one or more criteria meet or exceed one or more prescribed threshold values.

The techniques may comprise, in various examples, low-complexity criteria to decide a flag for turning off filters. In other words, the video coder may use low-complexity criteria to determine whether to set a filter disable flag to "on." For instance, in some examples, the flag (i.e., a filter disable flag) is decided with a coded syntax element (e.g. "transform_skip_flag" and/or "cu_transquant_bypass_flag"). Furthermore, this disclosure describes various decision criteria for turning on the flag. In addition, this disclosure describes variations of the decision criteria made based on different block sizes and/or a component type, e.g., luma or chroma component. Furthermore, this disclosure describes restrictions of the method based on block sizes and component types. This disclosure also describes methods for reducing complexity. These methods for reducing complexity may include CU-based adaptation and sub-sampling of pixel samples in the decision process. For instance, in CU-based adaptation, a video coder may determine on a CU-by-CU basis whether to disable a filter, as opposed to determining on a sample-by-sample basis whether to disable a filter as described in JCTVC-N0183.

In addition, one or more of the techniques of this disclosure provide for a decoding process of the flag that results from the decision process. In some examples, the same derivation process of the flag (i.e., the filter disable flag) is used in the encoder and the decoder. In other words, a video encoder and a video decoder may use the same derivation process for the filter disable flag. In other examples, the techniques of this disclosure provide for explicit signaling of the flag (i.e., the filter disable flag). The explicit signaling of the filter disable flag may be TU-based, PU-based, CU-based, etc. For instance, video encoder 20 may explicitly signal the filter disable flag in at least one of: a TU, a PU, or a CU.

Furthermore, one or more of the techniques of this disclosure provide for implicit derivation of the adaptation parameters used in the decision process. In other examples, one or more of the techniques of this disclosure provide for explicit signaling of the parameters (e.g., in a video parameter set, a sequence parameter set, a picture parameter set, and/or elsewhere). In addition, this disclosure describes example filters to be disabled by the flag (i.e., the filter disable flag).

FIG. 5 is a conceptual diagram illustrating a method for adaptive filter control for reference samples of a block for HEVC intra-prediction, in accordance with an example of this disclosure. With reference to FIG. 5, a video coder (such as video encoder 20 or video decoder 30) may perform the proposed method of this example according to the following procedure.

First, traverse the neighboring pixels (i.e., intra-prediction reference samples) from the below-left position (e.g., $P_{2M-1,-1}$), to the right-above position (e.g., $P_{-1,2N-1}$), i.e., along the path indicated by the arrows in FIG. 5, considering all or some of the neighboring pixels from the below-left position $P_{2M-1,-1}$, to the top-left position $P_{-1,-1}$, and then to top-right position $P_{-1,2N-1}$. Alternatively, the video coder can use any path or pattern comprising the neighboring pixels (i.e., intra-prediction reference samples). For example, the path of FIG. 5 could be reversed to run from the top-right position $P_{-1,2N-1}$, to the top-left position $P_{-1,-1}$, and then to the below-left position $P_{2M-1,-1}$.

Second, find a pixel difference that is greater than a predetermined threshold value (Thr1) between any two consecutive neighboring samples (i.e., intra-prediction reference samples) along the path. In some examples, the pixel difference is an absolute value of a difference between the values of the consecutive neighbor samples. For example, the video coder may determine the difference between the pixel values of two consecutive neighboring samples along the scan path, and may compare the difference (e.g., the absolute value of the difference) to the threshold value (Thr1). The two consecutive neighboring samples may be adjacent to one another. Alternatively, in the case that the neighboring samples are sub-sampled along the scan path for this determination, the two consecutive neighboring samples are consecutively scanned but possibly are not immediately adjacent to one another. In some examples, Thr1 is set to 1<<(bitdepth−1), where bitdepth indicates the bit depth of the neighboring samples. Alternatively, any integer value in [0, (1<<bitdepth)−1] can be used as the threshold value Thr1.

Third, if the video coder finds two consecutive neighboring samples (i.e., intra-prediction reference samples) along the path that have a pixel difference greater than Thr1, the video coder turns on a disabling flag (i.e., the filter disable flag). In some examples, a video encoder may turn on the disabling flag and may signal the disabling flag to a video decoder. Alternatively, a video decoder may infer and generate the disabling flag at the video decoder based on a scan of a path of neighboring samples at the decoder side in a manner as described above (i.e., in a same or similar manner as the video encoder). In other examples, instead of turning on a disabling flag, a video encoder may generate a syntax element indicating that filters should be disabled. However, this disclosure describes the use of a disabling flag for purposes of illustration.

Fourth, if the disabling flag is on, the video coder disables the entire set of filters or some of the filters in the MDIS (e.g., the smoothing filter, DC intra-prediction mode filters), the ⅟₃₂-pel interpolation, and the edge filter. Hence, in some examples, one or more filters may be turned off, i.e., disabled, when the disabling flag is turned on. For example, when some or all of such filters are disabled, the pertinent filtering operations are not performed on the reference samples prior to use of the reference samples in intra-prediction. Furthermore, when some such intra prediction filters are disabled, such intra prediction filters are not applied to samples of a predictive block.

Additionally, in some examples, the DC filter can be disabled. That is, in addition to disabling some or all of the filters in the MDIS, the $\frac{1}{32}$-pel interpolation and the edge filter, the DC filter can be disabled alone or in combination with disabling one or more of the other filters (e.g., according to the disabling flag). As a further alternative, in some examples, individual disabling flags may be turned on or off to indicate disabling status for individual filter operations. As an illustration, in various examples, when one or more disabling flags are turned on, the filter or filters in the MDIS may be disabled while other filters are enabled, the filter or filters in $\frac{1}{32}$-pel interpolation may be disabled while other filters are enabled, the filter or filters in the edge filter are disabled while other filters are enabled, the DC filter is disabled while other filters are enabled, two or more of the foregoing filters, in any combination, are disabled while other filters are enabled, any combination of the foregoing filters are disabled while other filters are enabled, or all filters are disabled. In some examples, the disabling flag may specify disabling of filters for a given block to be intra coded.

The procedures described in this example may be performed by a video encoder or a video decoder once in the entire intra-prediction for a block (e.g., CU, PU, TU, etc.), and may be invoked before any filtering operation. That is, in one example, a video coder may perform the operation described above for disabling a filter before performing the MDIS. Thereafter, a video coder may use the fully filtered, partially filtered or non-filtered reference samples, as applicable, for intra-prediction. Performing these procedures once for an entire intra-prediction for a block may be less complex than determining on a sample-by-sample basis whether to disable particular filters.

In another example of this disclosure, a counter-based decision criterion is applied. In other words, a video coder applies a counter-based decision criterion. As an alternative to generating a disabling flag (e.g., turning on a disabling flag) if the pixel difference (e.g., absolute pixel difference) between two consecutive neighboring samples in the path exceeds a threshold value, a video coder may determine a count of the number of instances in which the pixel difference (e.g., absolute pixel difference) between two consecutive neighboring samples in the path exceeds a first threshold value. The video coder may then compare the count to a second threshold value. Hence, the video coder may then determine generation of the disabling flag based on the count. An example of the use of a counter-based decision criterion may operate as follows.

First, traverse the neighboring pixels. For example, the video coder may traverse the neighboring pixel along a path from the below-left position (i.e., $P_{2M-1,-1}$), to the right-above position (i.e., $P_{-1,2N-1}$) (e.g., along the path indicated by the arrows in FIG. 5), considering all or some of the neighboring pixels from the below-left position $P_{2M-1,-1}$ to the top-left position $P_{-1,-1}$, and then to top-right position $P_{-1,2N-1}$. As mentioned with reference to the example above, the path may proceed in the opposite direction or in different paths or patterns.

Second, find a pixel difference greater than a predetermined threshold value (Thr1) between the two consecutive (e.g., adjacent) samples along the path. Third, if the pixel difference (e.g., the absolute pixel difference) is greater than a predetermined threshold value (Thr1), a counter is increased by one. Fourth, if a value of the counter is greater than a second threshold value (Thr2), the disabling flag is turned on. If the value of the counter is less than or equal to the second threshold value (Thr2), the disabling flag is turned off. Fourth, if a disabling flag is on, the filters are disabled. For example, all or some of the filters in the MDIS, the $\frac{1}{32}$-pel interpolation, and the edge filter are disabled (e.g., as described above). In addition, the DC filter may be disabled in some examples if the disabling flag is turned on (e.g., as described above).

As an alternative, a video coder (e.g., a video encoder or a video decoder) may turn a disabling flag on based on a count of the number of instances in which a pixel difference between two consecutive neighboring samples in the path is less than another threshold value. For example, the video coder may find a pixel difference smaller than a threshold value (Thr3) between the two adjacent samples in the traversing of a path through the neighboring samples as described above.

An example of the use of a counter-based decision criterion for a pixel difference smaller than threshold Th3 may operate, in the encoder or decoder, as follows. First, traverse the neighboring pixels along a path (e.g., as described above). Second, find a pixel difference (e.g., an absolute pixel difference) smaller than a threshold (Thr3) between the two consecutive (e.g., adjacent) samples along the path. Third, if the video coder finds a pixel difference (e.g., an absolute pixel difference) smaller than the threshold (Thr3), the video coder increases a counter by one. Fourth, if a counter is greater than a threshold (Thr4), the video coder turns on the disabling flag. Fifth, if a disabling flag is on, all of the filters are disabled, or some of the filters are disabled, e.g., as described above.

As an alternative to, or in addition to, the fourth step of the example of the previous paragraph, the video coder may consider the counter with a difference (e.g., an absolute difference) greater than Thr1 in a combined manner. For example, if the number of counts for pixel difference (e.g., an absolute pixel difference) smaller than Thr3 exceeds a threshold value Thr4, and the count of pixel differences (e.g., absolute pixel differences) greater than Thr1 exceeds a threshold value Thr2, the video coder turns on the disabling flag (e.g., such that some of all filtering operations are disabled and not applied to the reference samples for intra coding of the block to be coded). In this example, if either of these conditions is not met, the video coder may turn off the disabling flag (e.g., such that filtering is applied to the reference samples).

In accordance with another example of this disclosure, instead of using a sample-by-sample comparison with a threshold, or sample-by-sample comparison with counts, a video coder (e.g., a video encoder or a video decoder) may use any of a variety of different criteria to determine whether disable filters. For example, the video coder may use a 3-tap finite impulse response (FIR) filter (e.g., using [−1, 2, −1]) to detect a sharp edge. The video coder may perform the FIR filtering pixel-by-pixel, or every three pixels. As one illustration, a FIR filter mask may be moved along a path of neighboring reference samples (e.g., in a path as described in one or more of the examples above, and as shown in FIG. 5). The video coder may move the FIR filter mask one pixel at a time, or three pixels at a time, generating a FIR filter output for each set of three pixels (to which the coefficients of the FIR filter may be applied). Hence, in some examples, the successive three-pixel sets to which the FIR filter is applied may overlap one another or may be distinct in terms of the reference samples included in the sets. If the filter output (e.g., the absolute value of the filter output) from any of the successively FIR filtered sets of three samples along the path produces a value that exceeds a predetermined threshold, the video coder may turn on the disabling flag. Alternatively, in a count-based example, if the video coder counts filter outputs (e.g., the absolute value of the filter outputs) that exceed the threshold value, and the count exceeds a count threshold, the video coder may turn on the disabling flag. Otherwise, the video coder may turn off the disabling flag.

In one example, the video coder only uses the three corners denoted by $P_{2M-1,-1}$, $P_{-1,-1}$, and $P_{-1,2N-1}$ in FIG. 5. In this example, the video coder examines the differences for whether the differences (e.g., absolute differences) are greater than a threshold value or not. For example, the video coder may use the three corners denoted by $P_{2M-1,-1}$, $P_{-1,-1}$, and $P_{-1,2N-1}$ in FIG. 5 as the inputs to the FIR filter. As one example, if the FIR filter output (e.g., the absolute value of the FIR filter output) produced by application of the FIR filter to the values of reference samples $P_{2M-1,-1}$, $P_{-1,-1}$, and $P_{-1,2N-1}$, respectively, exceeds a predetermined threshold value, the video coder may turn on the disabling flag, such that all filters or some filters are disabled. As another alternative, instead of using reference samples $P_{2M-1,-1}$, $P_{-1,-1}$, and $P_{-1,2N-1}$ as inputs to the FIR filter, the video coder may apply the FIR filter to reference samples $P_{2M-1,-1}$, $P_{M,-1}$, and $P_{-1,1}$ in the left column and reference samples $P_{-1,2N-1}$, $P_{-1,N}$, and $P_{-1,-1}$ in the top row. In this case, the video coder applies the FIR filtering two times. Again, if the FIR filter output (e.g., the absolute value of the FIR filter output) exceeds a predetermined threshold value, the video coder may turn on the disabling flag.

Alternatively, or in addition, the video coder may jointly consider the sum of absolute difference (SAD) value of the two neighboring pixels, e.g., with the FIR filter outputs described above. The video coder may compute the SAD value for all pixels in between two of the pixels used to produce the FIR filter output. That is, for P(2M−1,−1) and P(−1,−1) in the left column, the SAD of adjacent pixels refers to the sum of the difference of P(2M−1−k, −1) and P(2M−1−k−1, −1), where k=0, . . . , 2M−1. The SAD is obtained in a similar manner for the top row.

In some examples, the three sample pixels ($P_{2M+1}$, $P_{M-1,-1}$, $P_{-1,-1}$,) in the left and ($P_{2N+1}$, $P_{N-1,-1}$, $P_{-1,-1}$,) in the above are used for the FIR filters. Each of the results are combined to make one flag. In another example, the same condition used in the MDIS is used for this decision criterion. For example, the disabling flag for disabling filters applied to neighboring reference samples may be turned on if the criterion for turning off MDIS is satisfied. Furthermore, in some examples, the variance of the differences in two consecutive pixels is used. For example, as pixel differences between consecutive pixels are determined along a path, as described above, the video coder may calculate a variance among the pixel differences. If the variance exceeds a predetermined variance threshold, the video coder may turn on the disabling flag such that filters applied to the reference samples are partially or entirely disabled.

As another alternative, counts of the sign change of the pixel differences are used. For example, as pixel differences between consecutive pixels are determined along a path, as described above, the number of sign changes, e.g., from positive to negative and/or negative to positive, can be counted and compared to a threshold. If the count exceeds a predetermined count threshold, the encoder or decoder may turn on the disabling flag such that filters applied to the reference samples are partially or entirely disabled.

In accordance with another example of this disclosure, a partial region of the reference samples is adaptively selected to make a filter on/off decision. In other words, a video coder may adaptively select a partial region of the intra-prediction reference samples and determine, based on the selected partial region of reference sample, whether to enable or disable filtering. For example, instead of scanning all reference samples in the left neighboring column and top neighboring row, a selected subset or region that includes less than all of the neighboring reference samples may be used. Such a subset may be used for one or more of the example processes described above in one or more of the examples above.

For instance, one example is to use the reference pixel for the given prediction mode. For example, the given prediction mode may be a particular angular intra-prediction mode. In this example, if the prediction angle is negative, the pixels between $[P_{M-1,-1}, P_{-1,-1}]$ and $[P_{-1,-1}, P_{-1,N-1}]$ are used. Otherwise, if the prediction angle is positive and more close to the vertical direction, the pixels in the range $[P_{-1,-1}, P_{-1,2N-1}]$ are used. Otherwise (if the prediction angle is positive and close to the horizontal), the pixels in the range $[P_{-1,-1}, P_{2M-1,-1}]$ are used. In each of these examples, a subset of pixels along a path of the left column and the top row of the neighboring pixels can be used in any of the determinations described above with reference to one or more of the examples above. As examples, if the prediction angle is positive and closer to the vertical direction than the horizontal direction, the video coder may use the pixels in the range $[P_{-1,-1}, P_{-1,2N-1}]$ for a pixel difference based determination, a count-based determination, or an FIR-based determination as described in various examples above (e.g., in order to determine whether to turn on a filter disabling flag). Likewise, if the prediction angle is negative, the video coder may use the pixels between $[P_{M-1,-1}, P_{-1,-1}]$ and $[P_{-1,-1}, P_{-1,N-1}]$ in such determinations.

In another example, if a counter for the above row is greater than a counter for the left column, the video coder uses the reference samples in the above row. For example, if the count of pixel differences (e.g., absolute pixel differences) that exceed a predetermined pixel threshold for reference samples in the top row is greater than the count of pixel differences (e.g., absolute pixel differences) that exceed a predetermined pixel threshold for reference samples in the left column, the video coder compares the count from the top row to a count threshold. Conversely, if the count for the left column is greater than that in the top row, the video coder uses reference samples in the left column. For example, if the count of pixel differences (e.g., absolute pixel differences) that exceed a predetermined pixel threshold for reference samples in the left column is greater than the count of pixel differences (e.g., absolute pixel differences) that exceed a predetermined pixel threshold for reference samples in the top row, the video coder may compare the count from the left column to the count threshold. In either case, if the selected count exceeds the count threshold, the video coder turns on the disabling flag. The count threshold may be selected or scaled according to whether the entire set of neighboring reference samples (i.e., intra-prediction reference samples) is used or whether a selected subset is use.

In another example, some reference pixels generated from the padding specified in 8.4.4.2.2 of the HEVC Range Extensions (i.e., JCTVC-M1005-v2) are not considered in the decision. For example, any of the determinations described above may exclude from consideration, e.g., for different thresholds, count thresholds, or other determinations, reference pixels that have been added by padding.

In accordance with another example of this disclosure, several parameter adaptations are presented depending on a block size, a component type, and an input video type. For instance, the thresholds are adaptively changed with block sizes instead of one value. In other words, instead of using one threshold value, a video coder may adaptively change the threshold value based on block sizes. For example, the various values of the pixel difference thresholds and/or count thresholds described above, e.g., for use in one or more of the examples provided above, may be adjusted based on block size (e.g., pixel-by-pixel size), component type (e.g., luma or chroma component), or input video type (e.g., color sampling format). In one example, the threshold Thr2 and/or Thr4 used for a 4×4 block size are doubled if the block size of the block to be coded is doubled. In the other example, a positive integer or a zero offset can be added to the threshold Thr2 and/or Thr4 when the block size is increased, e.g., relative to a predetermined size.

Furthermore, in some examples, the thresholds are adaptively changed with a component type instead of one value for all components. For example, the values of the thresholds may be specified to be different for luma components than for the chroma components of a block. Hence, there may be individual thresholds for luma components and chroma components. The thresholds for the chroma components may be the same or different. The various thresholds may be calculated or stored.

Additionally, in some examples, the thresholds are adaptively changed with an input video type. In other words, a video coder may adaptively change the thresholds based on an input video type. Hence, different color sampling formats may have different thresholds. For 4:2:2 video sequences, the thresholds Thr2 and/or Thr4 used for a chroma component is reduced by a half of the threshold used in 4:4:4 video sequences. A video coder may use different thresholds for different input video types to determine the same thresholds for luma and chroma components of a given input video type, or different thresholds between the luma and chroma components of a given input video type, where in either case the thresholds may vary according to the input video type.

In accordance with another example of this disclosure, the method for adaptively turning off one or more filters, e.g., as described above with reference to the examples above, is restricted with a block size and/or a component type. For instance, the techniques described in one or more of the examples provided above are only applied to a block size smaller than a certain size, and are not applied when the block size of the block to be coded is greater than or equal to the certain size. For example, the method is applied only to the 4×4 block size. Alternatively, however, the method for adaptively turning off one or more filters is applied to only the smallest TU size. Alternatively, however, the method for adaptively turning off one or more filters is applied to only the smallest CU size. Alternatively, however, the method for adaptively turning off one or more filters is applied only if a CU has an N×N partition. As another example, the method for adaptively turning off one or more filters is only applied to a certain component type. For example, the method is applied only to the luma component coding. Alternatively, however, the proposed method can be applied to all the components (e.g., Y, U, and V) if the input video is a 4:4:4 video input.

In accordance with another example of this disclosure, the neighboring reference samples (i.e., intra-prediction reference samples) are sub-sampled in the comparison so that the computational complexity can be decreased. For example, the neighboring reference samples used to determine whether to turn off filtering (e.g., turn on the disabling flag) may be a sub-sampled set of the reference samples. In some examples, the reference pixels are down-sampled by a factor of 2. Alternatively, in other examples, the video coder increases the down sampling ratio as the block size is increased.

Figure 6:
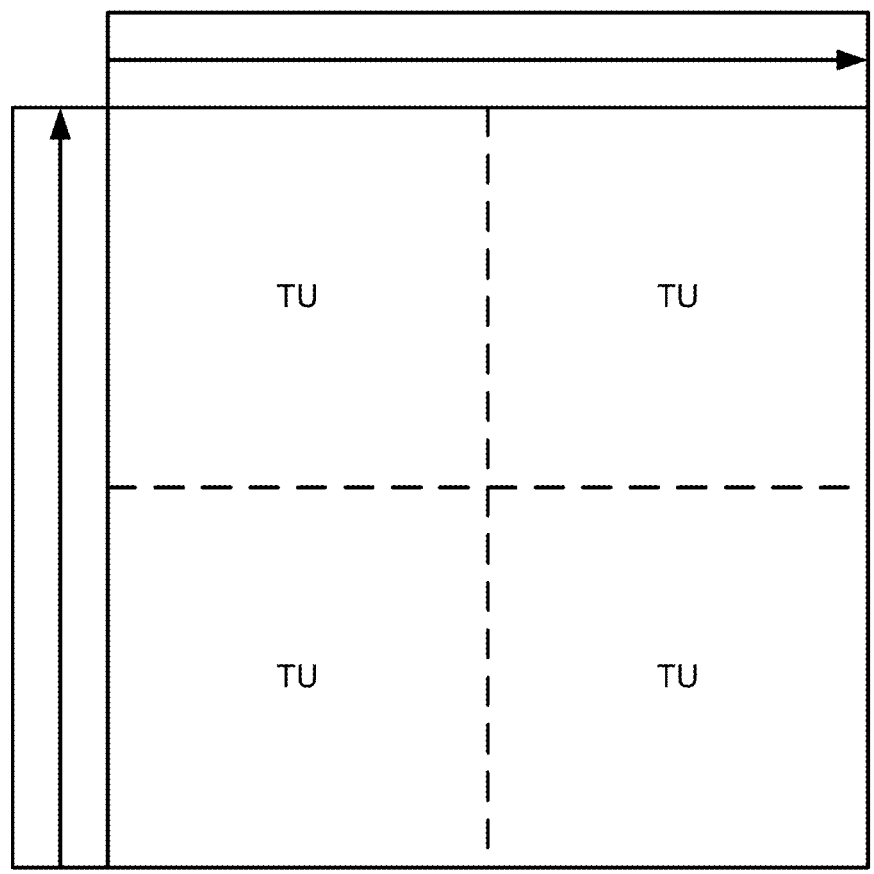
FIG. 6 is a conceptual diagram illustrating a method for adaptive filter control for reference samples of transform units (TUs) of a coding unit (CU) for HEVC intra-prediction in accordance with another example of this disclosure.

FIG. 6 is a conceptual diagram illustrating use a method for adaptive filter control for reference samples of TUs of a CU for HEVC intra-prediction in accordance with another example of this disclosure. In HEVC, intra-prediction is performed per TU. Thus, in accordance with some examples of this disclosure, the video coder may perform 4×4 block processing. With reference to FIG. 6, to reduce the complexity, the method for adaptively turning off one or more filters is performed once in a CU, and the disabling flag controls all the relevant filtering used for the intra-prediction in that CU. FIG. 6 shows an example where there are four TUs in a CU. The reference samples in the above and the left of the CU are used for the decision, e.g., in any of the example techniques described in this disclosure to determine whether to apply filters for reference samples used for intra coding of PUs and/or TUs within the CU, and the disabling flag is applied for switching off the filters in the PUs and/or TUs of the CU.

In the examples above, the disabling flag was derived both at the encoder and the decoder in the same manner. However, in some examples, the flag is derived at the encoder side and signaled to the decoder side. In other words, a video encoder may signal a filter disable flag to a video decoder. The video decoder may control the relevant filtering after parsing the flag. In some examples, the video encoder signals the flag in a PU. In other examples, such as the example of the previous paragraph, the video encoder may the flag in a CU.

Furthermore, in accordance with one or more examples of this disclosure, the thresholds (e.g., Thr1, Thr2, Thr3, etc.) were fixed or adaptively changed with a block size and a component type in the examples above. In some such examples, a video encoder may signal and transmit the thresholds (e.g., Thr1, Thr2, Thr3, etc.) to the video decoder. In some examples, the video encoder signals the thresholds in at least one of a slice header, a PPS, a SPS, or a VPS generated by the video encoder. Additionally, in some examples, the video encoder may signal the restriction condition (e.g., as described in one or more of the examples above where the method can be restricted with a block size and/or component type) in at least one of: a slice header, a PPS, a SPS, or a VPS.

In HEVC, a coding unit syntax structure corresponds to a CU. A coding_unit syntax structure of a CU may include a transform_tree syntax structure corresponding to a RQT of the CU. The transform_tree syntax structure may include additional transform_tree syntax structures or a transform_unit syntax structure. If a transform_tree syntax structure comprises a transform_unit syntax structure, the transform_tree syntax structure corresponds to a leaf node of the RQT. The transform_tree syntax structure of HEVC is reproduced in Table 1, below.

TABLE 1

| | Descriptor |
|---|---|
| transform_tree( x0, y0, xBase, yBase, log2TrafoSize, trafoDepth, blkIdx ) { | |
|   if( log2TrafoSize <= Log2MaxTrafoSize && | |
|     log2TrafoSize > Log2MinTrafoSize && | |
|     trafoDepth < MaxTrafoDepth && !( IntraSplitFlag && ( | |
| trafoDepth = = 0 ) ) ) | |
|     split_transform_flag[ x0 ][ y0 ][ trafoDepth ] | ae(v) |
|   if( log2TrafoSize > 2 ) { | |
|     if( trafoDepth = = 0 \|\| cbf_cb[ xBase ][ yBase ][ | |
| trafoDepth − 1 ] ) | |
|       cbf_cb[ x0 ][ y0 ][ trafoDepth ] | ae(v) |
|     if( trafoDepth = = 0 \|\| cbf_cr[ xBase ][ yBase ][ | |
| trafoDepth − 1 ] ) | |
|       cbf_cr[ x0 ][ y0 ][ trafoDepth ] | ae(v) |
|   } | |
|   if( split_transform_flag[ x0 ][ y0 ][ trafoDepth ] ) { | |
|     x1 = x0 + ( 1 << ( log2TrafoSize − 1 ) ) | |
|     y1 = y0 + ( 1 << ( log2TrafoSize − 1 ) ) | |
|     transform_tree( x0, y0, x0, y0, log2TrafoSize − 1, | |
| trafoDepth + 1, 0 ) | |
|     transform_tree( x1, y0, x0, y0, log2TrafoSize − 1, | |
| trafoDepth + 1, 1 ) | |
|     transform_tree( x0, y1, x0, y0, log2TrafoSize − 1, | |
| trafoDepth + 1, 2 ) | |
|     transform_tree( x1, y1, x0, y0, log2TrafoSize − 1, | |
| trafoDepth + 1, 3 ) | |
|   } else { | |
|     if( CuPredMode[ x0 ][ y0 ] = = MODE_INTRA \|\| | |
| trafoDepth != 0 \|\| | |
|       cbf_cb[ x0 ][ y0 ][ trafoDepth ] \|\| | |
|       cbf_cr[ x0 ][ y0 ][ trafoDepth ] ) | |
|       cbf_luma[ x0 ][ y0 ][ trafoDepth ] | ae(v) |
|     transform_unit( x0, y0, xBase, yBase, log2TrafoSize, | |
| trafoDepth, blkIdx ) | |
|   } | |
| } | |

As shown in Table 1, the transform_tree syntax structure may include cbf_cb, cbf_cr, and cbf_luma syntax elements. The cbf_cb, cbf_cr, and cbf_luma syntax elements may collectively be referred to as coded block flags (CBFs). The cbf_cb syntax element equal to 1 specifies that the Cb transform block corresponding to the transform_tree syntax structure contains one or more transform coefficient levels not equal to 0. The cbf_cr syntax element equal to 1 specifies that the Cr transform block corresponding to the transform_tree syntax structure contains one or more transform coefficient levels not equal to 0. The cbf_luma syntax element equal to 1 specifies that the luma transform block corresponding to the transform_tree syntax structure contains one or more transform coefficient levels not equal to 0.

Furthermore, in HEVC, a transform_unit syntax structure may include one or more residual_coding syntax structures. The inclusion of the residual_coding syntax structures in a transform_unit syntax structure is dependent on the values of the CBFs specified in the transform_tree syntax structure that contains the transform_unit syntax structure. The transform_unit syntax structure of HEVC is reproduced in Table 2, below.

TABLE 2

| | Descriptor |
|---|---|
| transform_unit( x0, y0, xBase, yBase, log2TrafoSize, trafoDepth, blkIdx ) { | |
|   if( cbf_luma[ x0 ][ y0 ][ trafoDepth ] \|\| cbf_cb[ x0 ][ y0 ][ | |

TABLE 2-continued

| | Descriptor |
|---|---|
| trafoDepth ] \|\| | |
|     cbf_cr[ x0 ][ y0 ][ trafoDepth ] ) { | |
|   if( cu_qp_delta_enabled_flag && | |
| !IsCuQpDeltaCoded ) { | |
|     cu_qp_delta_abs | ae(v) |
|     if( cu_qp_delta_abs ) | |
|       cu_qp_delta_sign_flag | ae(v) |
|   } | |
|   if( cbf_luma[ x0 ][ y0 ][ trafoDepth ] ) | |
|     residual_coding( x0, y0, log2TrafoSize, 0 ) | |
|   if( log2TrafoSize > 2 ) { | |
|     if( cbf_cb[ x0 ][ y0 ][ trafoDepth ] ) | |
|       residual_coding( x0, y0, log2TrafoSize − 1, 1 ) | |
|     if( cbf_cr[ x0 ][ y0 ][ trafoDepth ] ) | |
|       residual_coding( x0, y0, log2TrafoSize − 1, 2 ) | |
|   } else if( blkIdx = = 3 ) { | |
|     if( cbf_cb[ xBase ][ yBase ][ trafoDepth ] ) | |
|       residual_coding( xBase, yBase, log2TrafoSize, 1 ) | |
|     if( cbf_cr[ xBase ][ yBase ][ trafoDepth ] ) | |
|       residual_coding( xBase, yBase, log2TrafoSize, 2 ) | |
|   } | |
| } | |
| } | |

Furthermore, the residual_coding syntax structure may include a transform_skip_flag syntax element that specifies whether a transform is applied to the associated transform block or not. In other words, the transform_skip_flag invokes a transform skip operation where residual signals after the prediction are quantized without transform, e.g., without application of a DCT. This disclosure may refer to samples of the residual blocks of a block (e.g., CU) as residual signals for the block. The residual_coding syntax structure may also include syntax elements (e.g., sig_coeff_flag, coeff_abs_level_greater1_flag, coeff_abs_level_greater2_flag, coeff_sign_flag, coeff_abs_level_remaining) specifying values of transform coefficients, or in the case where the transform is not applied, residual samples. In some examples, the transform_skip_flag is not signaled if a cu_transquant_bypass_flag is turned on.

In accordance with another example of this disclosure, a transform skip syntax element, such as the transform_skip_flag syntax element, is used to determine whether to turn the filter disabling flag on or off. For instance, video decoder 30 may determine, based on a transform skip syntax element that indicates whether a transform is applied to a transform block, whether to turn the filter disabling flag on or off. For example, the filter disabling flag is turned on (or off) if the transform_skip_flag is turned on (or off). In this configuration, the filter disabling flag is turned on if transform_skip_flag is turned on, and the disabling flag is turned off if transform_skip_flag is turned off. In other words, the syntax element (i.e., transform_skip_flag) specifies whether residual signals are quantized without transformation, the disabling flag is turned on if the syntax element is turned on, and if the disabling flag is on, the one or more filters used for intra prediction are disabled. In some examples, this may be applied to 4×4 blocks only, but may not be subject to the size. In some examples, the operation of turning the disabling flag on or off based on the on or off status of the transform_skip_flag may be applied only for 4×4 blocks.

Alternatively, in some examples, the transform skip flag condition may be combined with any other condition mentioned in the various examples above. For example, the filter disabling flag may be turned on or off based on a combination of whether the transform_skip_flag is on or off and other criteria such as, for example, any of a variety of threshold-based criteria, such as the threshold-based criteria described above.

In HEVC, a coding_unit syntax structure corresponds to a CU. The coding_unit syntax structure may include a cu_transquant_bypass_flag syntax element. The cu_transquant_bypass_flag syntax element equal to 1 specifies that the scaling and transform process as specified in subclause 8.6 of HEVC and the in-loop filter process as specified in subclause 8.7 of HEVC are bypassed. When the cu_transquant_bypass_flag syntax element is not present in a coding_unit syntax structure, it is inferred to be equal to 0. In some instances, the cu_transquant_bypass_flag may be referred to as the transquant_bypass_flag. In a lossless coding configuration, the cu_transquant_bypass_flag syntax element is turned on (e.g., equal to 1), and a predicted block (i.e., a transform block) is coded without quantization and transform.

As another example of this disclosure, a quantization and transform bypass syntax element, such as a cu_transquant_bypass_flag syntax element, may be used to determine whether to turn the filter disabling flag on or off. For instance, video decoder 30 may determine, based on the quantization and transform bypass syntax element, whether to turn the filter disabling flag on or off. In this configuration, the filter disabling flag is turned on if the cu_transquant_bypass_flag syntax element is turned on. The disabling flag is turned off if the cu_transquant_bypass_flag syntax element is turned off. Thus, in this example, a predictive block is coded without quantization and transformation when the syntax element (i.e., the cu_transquant_bypass_flag), the disabling flag is turned on if the syntax element is turned on, and if the disabling flag is on, the one or more filters are disabled. Alternatively, the same transform_skip_flag may be used. In other words, the filter disabling flag is turned off if the transform_skip_flag is turned off. In some examples, the transform_skip_flag is not signaled if the cu_transquant_bypass_flag is turned on. Additional elaboration of details consistent with one or more examples of this disclosure is provided below.

Consistent with one or more of the examples above or other examples of this disclosure, a transform_skip_flag may be used for deciding the disable filtering flag. The transform_skip_flag is already available in a TU because the infra-prediction/reconstruction process is done in every TU level. Furthermore, consistent with one or more examples described above or other examples of this disclosure, the operation of the disable filtering flag may be decided based on a transform skip flag, such as transform_skip_flag. When the transform skip flag is 0 for a TU, a disable filtering flag is set to 0, and filtering as in the current HEVC Range Extensions specification is applied. When the transform skip flag is 1, disable filtering flag is set to 1, and, filtering is disabled.

In another example, the disabling of filtering may be based on any implicit derivation method, such as the 3-tap FIR filter [1, −2, 1] described in this disclosure. In this example, if the transform skip flag is 0, filtering as in the current HEVC Range Extensions specification is applied (e.g., as described in section 8.4.4.2.3 of JCTVC-M1005-v2). When the transform_skip_flag is 1, and the result of FIR filtering is below threshold, and the disable filtering flag is 0, the filtering as in the current HEVC Range Extensions specification (i.e., JCTVC-M1005-v2) is applied. When the transform skip flag is 1, and the result of FIR filtering is above a threshold, the disable filtering flag is 1, and filtering is disabled. In other words, a syntax element (i.e., the transform_skip_flag) specifies whether residual signals are quantized without transformation, and if the disabling flag is equal to 1 and a result of a FIR filter is determined to be above a threshold, one or more filters used for intra prediction are disabled.

Furthermore, consistent with one or more examples of this disclosure, in the case of lossless coding, the application of filtering may be made dependent on the transquant_bypass_flag instead of the transform_skip_flag and/or the result of the FIR filter. Alternatively, the application of filtering may be solely dependent on the disable filtering flag in lossless coding.

In various examples, the disclosure describes a method for coding video data. The method may comprise adaptively disabling one or more filters used to filter a plurality of intra-prediction reference samples based on one or more characteristics of at least some of the intra-prediction reference samples, intra-coding video data using the intra-prediction reference samples. Adaptively disabling may comprise adaptively disabling the one or more filters for all PUs or TUs in a CU based on one or more characteristics of intra-prediction samples neighboring the CU. In some examples, adaptively disabling comprises adaptively disabling the one or more filters for individual PUs or TUs in a CU based on one or more characteristics of individual sets of intra-prediction samples neighboring the respective PUs or TUs.

The one or more characteristics used to adaptively disable the one or more filters may include whether a pixel difference (e.g., an absolute pixel difference) between reference samples in the plurality of reference samples exceeds a predetermined threshold. Alternatively, or additionally, the one or more characteristics may include whether a count of a number of instances, in which a pixel difference (e.g., an absolute pixel difference) between reference samples of the plurality of reference samples exceeds a predetermined threshold, exceeds a count threshold. The one or more characteristics, alternatively or additionally, may include whether a count of a number of instances, in which a pixel difference (e.g., an absolute pixel difference) between reference samples of the plurality of reference samples exceeds a first predetermined threshold, exceeds a first count threshold, and whether a count of a number of instances, in which a pixel difference (e.g., an absolute pixel difference) between reference samples of the plurality of reference samples is less than a second predetermined threshold, exceeds a second count threshold.

As another example, the one or more characteristics include whether an output of a 3-tap FIR filter (e.g., an absolute value of the output of a 3-tap FIR filter) applied to reference samples of the plurality of reference samples exceeds a threshold. As another example, the one or more characteristics include whether a count of instances, in which an output of a 3-tap FIR filter (e.g., an absolute value of the output of a 3-tap FIR filter) applied to reference samples of the plurality of reference samples exceeds a threshold, exceeds a count threshold. Reference samples to which the FIR filter is applied may include successive sets of three reference samples in a path through an array of the reference samples, incremented by one pixel at a time or by three pixels at a time. Reference samples to which the FIR filter is applied may include reference samples $P_{2M-1,\,-1}$, $P_{-1,-1}$, and $P_{-1,2N-1}$, reference samples $P_{2M-1,\,-1}$, $P_{M,-1}$, and $P_{-1,-1}$, or reference samples $P_{-1,2N-1}$, $P_{-1,\,N}$, and $P_{-1,-1}$ in an array of the reference samples.

The characteristics of at least some of the intra-prediction reference samples may include characteristics of a subset of less than all of the plurality of reference samples selected based on a selected one of a plurality of prediction modes. The characteristics of at least some of the intra-prediction reference samples may include characteristics of either a top row or left column of the reference samples, wherein either the top row or left column is selected based on a count of a number of instances, in which a pixel difference between reference samples of the top row or left column exceeds a predetermined threshold, exceeds a count threshold.

In some examples, the video coder may selectively adapt one or more thresholds based on at least one of block size, component type, or input video type, and/or selectively turning on and off the step of adaptively disabling based on at least one of block size or component type. The one or more characteristics of at least some of the intra-prediction reference samples may be for a sub-sampled set of the reference samples. One or more of the thresholds used in various examples may be signaled in an encoded bitstream, e.g., in at least one of a PPS, SPS or VPS.

In another example, the disclosure describes a method for coding video data, the method comprising adaptively disabling one or more filters used to filter a plurality of intra-prediction reference samples based on a syntax element, and intra-coding video data using the intra-prediction reference samples. The syntax element may be a transform skip syntax element, such as a transform_skip_flag, and the method may comprise disabling the one or more filters when the transform_skip_flag is turned on. The transform_skip_flag invokes a transform skip operation where residual signals after prediction are quantized without transform. Alternatively, the syntax element may be a quantization and transform syntax element, such as a cu_transquant_bypass_flag, and the method may comprise disabling the one or more filters when the cu_transquant_bypass flag is turned on. The cu_transquant_bypass_flag invokes an operation in which a predicted block is coded without quantization and transform.

In at least some examples, intra-coding comprises intra-decoding, e.g., at a video decoder 30, and intra-decoding comprises intra-decoding video data based on the intra-prediction reference samples (either filtered, partially filtered, or unfiltered as a result of adaptively disabling one or more filters) and residual data. The method may further comprise, at decoder 30, turning on a disabling flag based on the one or more characteristics, or receiving the disabling flag in an encoded bitstream. In other examples, intra-coding may comprise intra-encoding, and intra-encoding comprises intra-encoding video data based on the intra-prediction reference samples (either filtered, partially filtered, or unfiltered as a result of adaptively disabling one or more filters) and residual data.

The disclosure further contemplates any combination of the methods described herein, as well as video decoders, video encoders and other devices configured to perform any combination of such methods, and a computer-readable storage medium storing instructions that, when executed, cause one or more processors of a device configured to perform any combination of such methods.

Some of the examples provided above are implicit derivation methods for determining whether to disable filters. Implicit derivation methods may provide less flexibility in encoder side than the explicit signaling, and may provide a smaller coding gain. Additional techniques of this disclosure may further reduce complexity and increase flexibility at the encode side when performing filtering operations for intra-prediction of HEVC, or other video coding standards.

For instance, this disclosure describes various techniques related to coding (e.g., signaling) a syntax element (such as a flag) for turning off one or multiple filters used for intra-prediction. These techniques include the techniques described below, which may be used alone or in any combination. In general, the techniques include various hierarchical signaling, which may be CU based, CU-partition based, and/or TU based. There may be different signaling methods, depending on a video sequence format (e.g., whether video data conforms to a 4:2:0 format, a 4:2:2 format, or a 4:4:4 format). This disclosure also describes restrictions of the signaling methods based on, e.g., block sizes and color component types (e.g., luminance, blue-hue chrominance, and/or red-hue chrominance). This disclosure also describes techniques for CABAC-coding the syntax element, e.g., a flag. The syntax element may be signaled in a VPS, a SPS, a PPS, and/or a slice header, in addition to or in the alternative to signaling the syntax element in a CU, a CU partition, and/or a TU. In general, the syntax element may indicate whether one or more intra-prediction filters are disabled.

In the HEVC version 1, the filtering operation during intra-prediction is applied to a TU. In an example of the techniques of this disclosure, a TU-based signaling method is presented. In other words, flags may be signaled in a TU (i.e., a leaf node of the transform tree) to control the filtering on/off indication. In some examples, three flags may be signaled to control the three components separately. For example, the three flags may be signaled to control luminance (luma or Y), blue-hue chrominance (Cb), and red-hue chrominance (Cr), respectively. Alternatively, in other examples, two flags may be signaled: one to control filtering for luma and the other to control filtering for both chroma channels (Cb and Cr). In such examples, the filtering operations for Cb and Cr may be subject to only the flag in the chroma channel.

Figure 7:
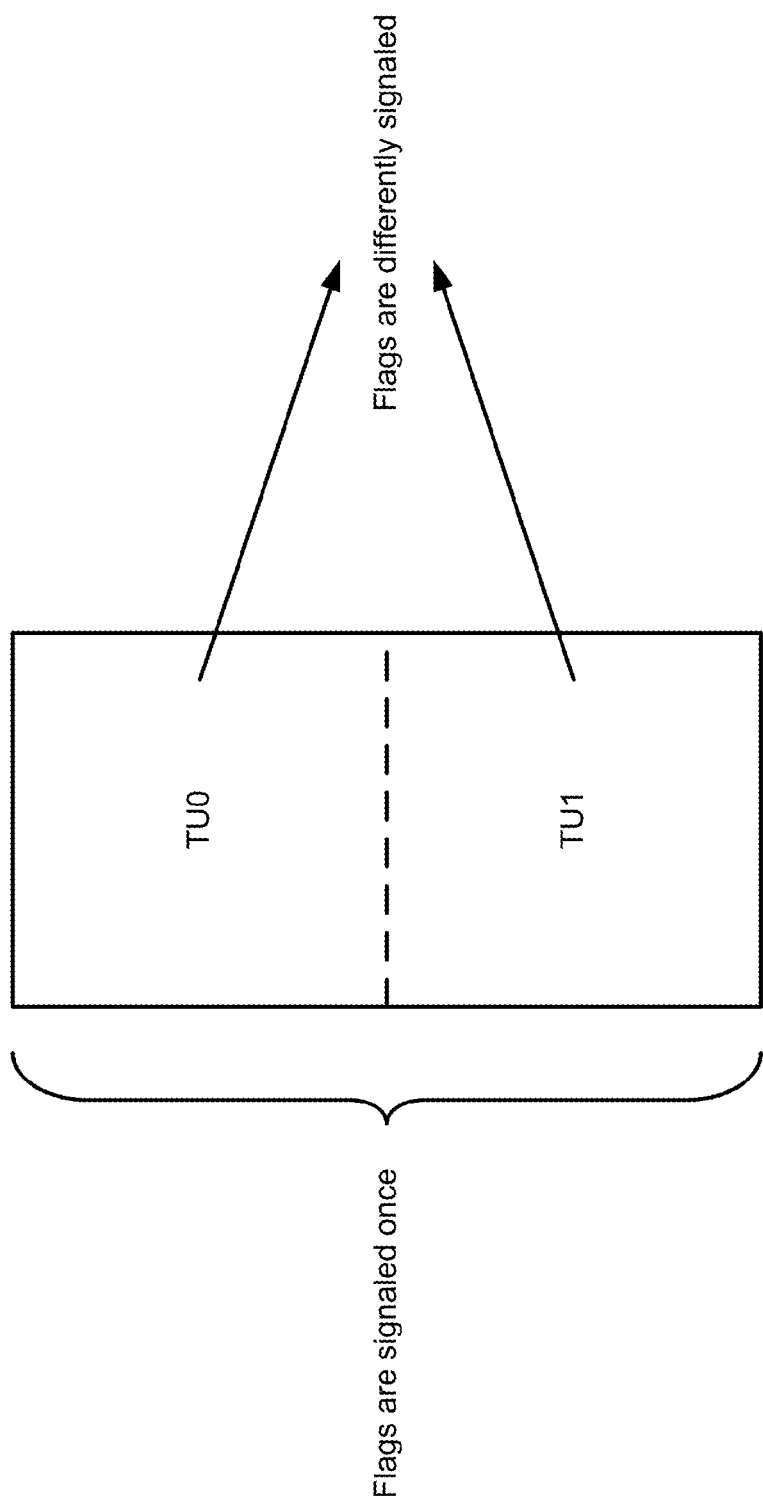
FIG. 7 is a conceptual diagram illustrating an example rectangle including two square TUs.

FIG. 7 is a conceptual diagram illustrating an example rectangle including two square TUs. In particular, the rectangular block includes TU0 and TU1. In one example, a flag may be signaled for the rectangular block, such that the flag indicates whether intra-prediction filtering is enabled for each of TU0 and TU1. In another example, separate flags may be signaled for TU0 and TU1, where the flag for TU0 indicates whether intra-prediction filtering is enabled for TU0 and the flag for TU1 indicates whether intra-prediction filtering is enabled for TU1.

As described in the HEVC Range Extensions working draft specification (i.e., JCTVC-M1005-v2) with regard to the 4:2:2 video format, the shape of a TU for Cb/Cr can be non-square. For instance, in the 4:2:2 video format, the shape of a TU for Cb/Cr can be a rectangle, as shown in FIG. 7. The rectangle is further divided into the two squares, e.g., TU0 and TU1, as shown in FIG. 7, to avoid the use of non-square transforms. In this case (4:2:2 video format and Cb/Cr component transforms), video encoder 20 may signal the flags for the each of the squares (TU0 and TU1). Alternatively, video encoder 20 may signal the flags for only the rectangle, so that the flag can control the filtering related for both square transforms. However, this case is not subject to only the 4:2:2 video format and Cb/Cr component. That is, the signaling method can be generalized for any rectangular transform that may be not only applied for the Y component but also for the chroma components in any video formats.

Video encoder 20 may signal flags in a CU-partition (N×N or 2N×2N), so that the flags can control the filtering on/off for all of the TUs inside the CU partition. In some examples, video encoder 20 signals three flags for the partition, each corresponding to one component, (e.g., Y, Cb, and Cr, respectively). Alternatively, video encoder 20 may signal two flags per partition, corresponding respectively to the Y component and, jointly, the Cb and Cr components (or channels). In this manner, filtering operations for both Cb and Cr may be subject to the flag for the chroma channel.

Figure 8:
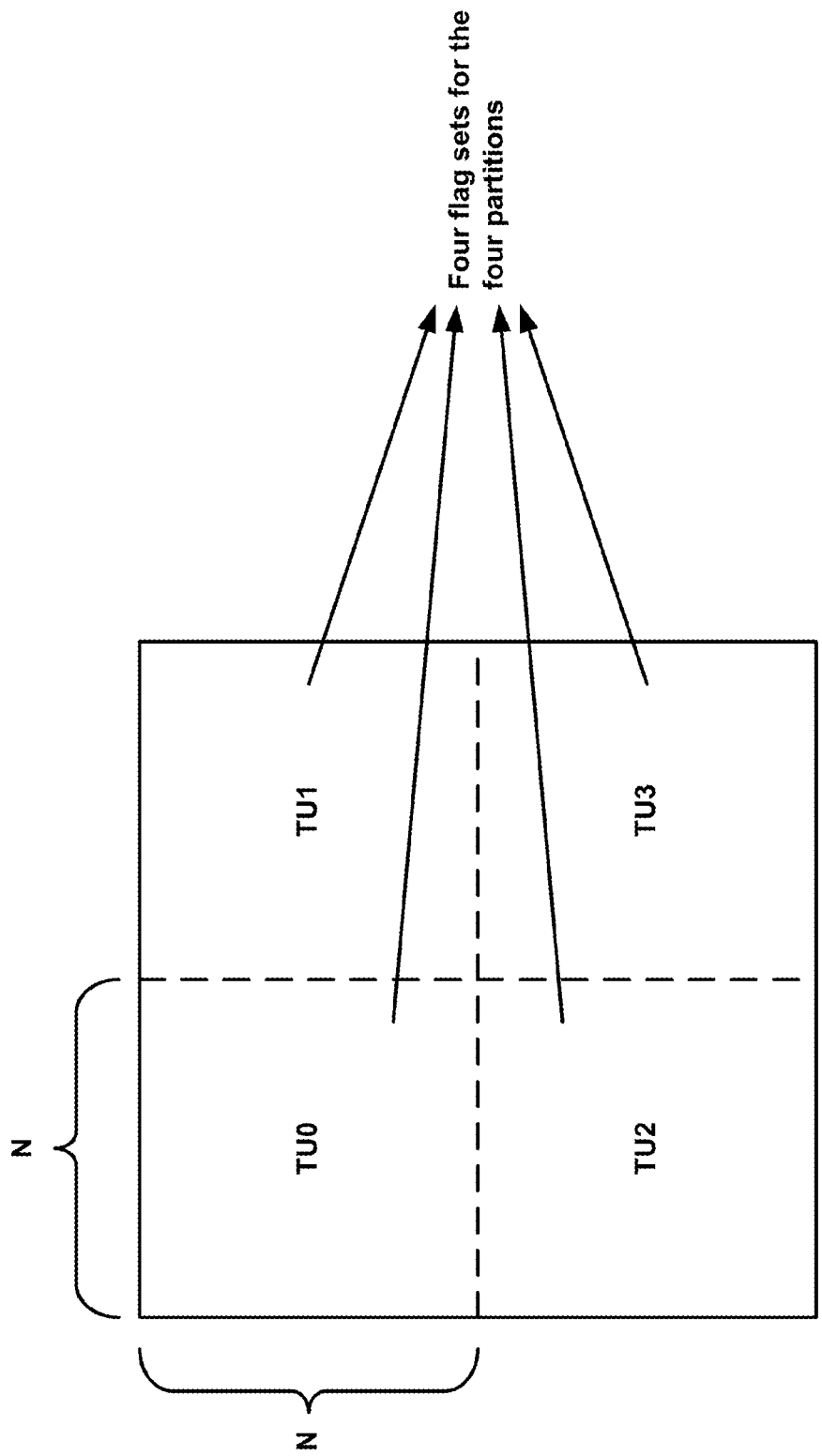
FIG. 8 is a conceptual diagram illustrating an example 2N×2N CU that is partitioned into four N×N TUs.
Figure 9:
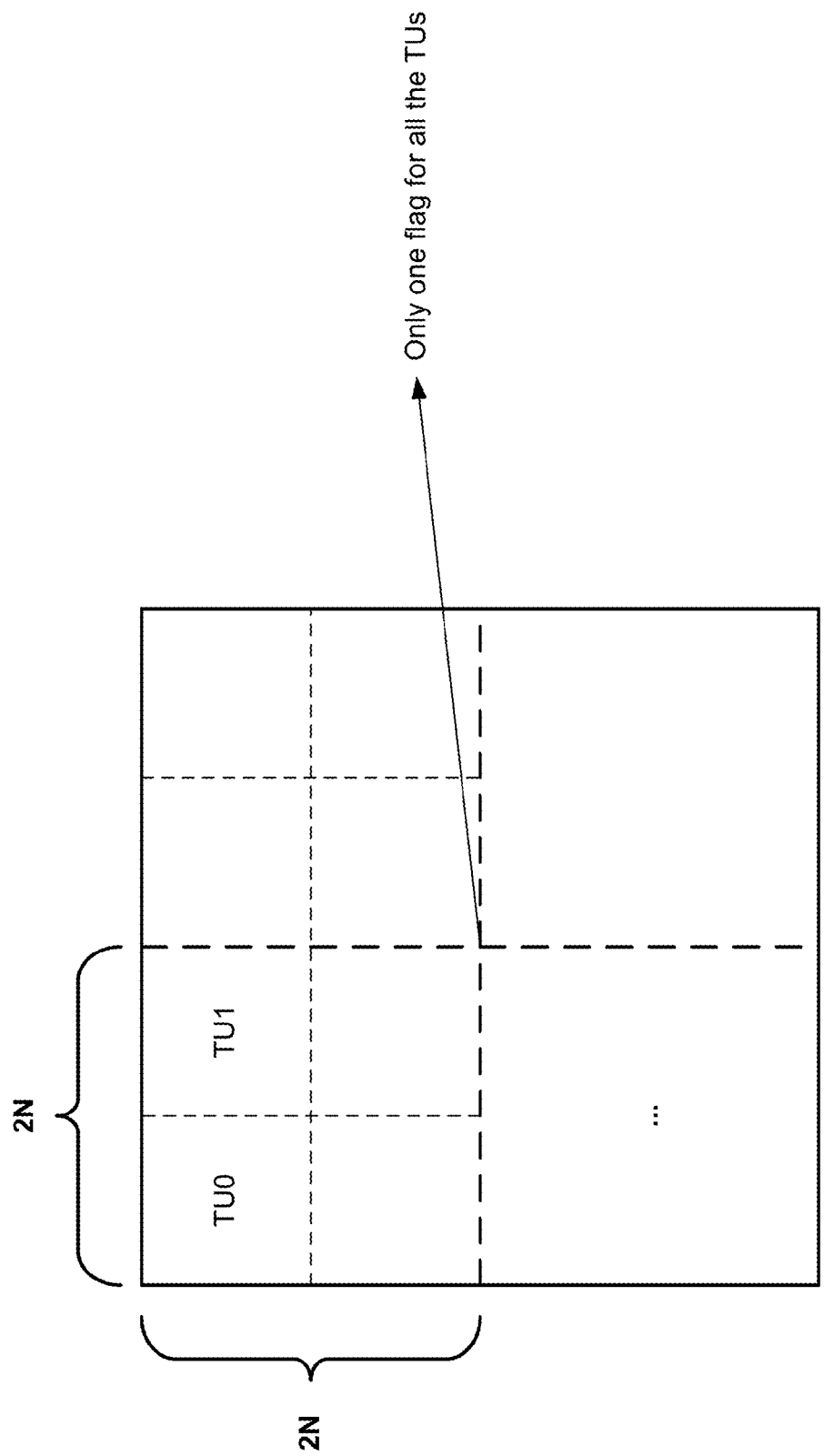
FIG. 9 is a conceptual diagram illustrating an example 2N×2N CU that has one 2N×2N partition.

As explained in detail with respect to FIGS. 8 and 9 below, flags may be signaled for one or more partitions of a CU. The flags may indicate whether filtering is to be performed for TUs of the corresponding partition. The examples shown in FIGS. 8 and 9 represent how flags can be signaled for a luma component. Variations exist for chrominance components. In one example, video encoder 20 signals flags for chrominance components once, regardless of how the CU is partitioned. In another example, video encoder 20 may signal one flag for each partition per chroma component (in the same manner as for the luma component). In some examples, video encoder 20 signals one flag for each partition per chroma component only when the video data conforms to a 4:4:4 video format.

FIG. 8 is a conceptual diagram illustrating an example 2N×2N CU that is partitioned into four N×N TUs. FIG. 8 shows an example of a CU that is partitioned into four N×N partitions (assuming the containing CU is 2N×2N). As shown in FIG. 8, there are four flags, respectively, for the four partitions. Each flag controls filtering operations inside a respective one of the partitions.

FIG. 9 is a conceptual diagram illustrating an example 2N×2N CU that has one 2N×2N partition. FIG. 9 shows an example when a CU is partitioned into one 2N×2N partition. As shown in FIG. 9, there is the only one flag for the entire partition, which corresponds to each of the TUs.

In some examples, regardless of the CU partition shapes, video encoder 20 may signal flags once in a CU, such that the flags control all filtering operations inside the CU. For instance, video encoder 20 may signal three flags, each of which controls filtering for respective ones of the Y, Cb, and Cr components. Alternatively, video encoder 20 may signal two flags, one to control filtering for the luma channel and the other to control filtering for the chroma channel. The filtering operations for both Cb and Cr may be subject to the flag signaled for the chroma channel.

In some examples, signaling of the flag for controlling filtering in intra-prediction may be restricted in one or more various ways. For instance, there may be a restriction based on TU and/or CU size, partition shape, and or channel/component type. The various restrictions can be independent or combined to form one or more joint conditions. Some example restrictions are listed below, which again may be used alone or in any combination:

The flags are signaled only if the CU partition is N×N.
The flags are signaled only if the CU size is less than a threshold that may be (or may be not) signaled in a slice header, PPS, SPS, and/or VPS.
The flags are signaled only if the TU size is less than a threshold that may be (or may be not) signaled in a slice header, PPS, SPS, and/or VPS.
The flags are signaled only if certain prediction modes are used.
The flags are signaled only if the method is allowed by a flag signaled in a slice header, PPS, SPS, and/or VPS.
The flags are signaled only for the Luma channel or the Y component.
The flags are signaled only if the CU size is the smallest CU size supported.
The flags are signaled only if the TU size is the smallest TU size supported.
The flags are signaled only if the coded block flag (CBF) is set to 1 in a TU.

In discussing signaling above, it should be understood that video encoder 20 generally signals a value for a flag in the sense that video encoder 20 may encode a value for a syntax element, such as a flag. In other words, video encoder 20 may include, in a bitstream, data indicating the value of the syntax element. Video decoder 30, likewise, may decode the value for the syntax element. In other words, video decoder 30 may determine, based on data in a bitstream, a value of the syntax element. More generally, encoding and decoding of the value for the syntax element may be referred to as "coding" the value for the syntax element. Video encoder 20 and video decoder 30 may code the value for the syntax element using CABAC.

To apply CABAC encoding to a syntax element, the video encoder may binarize the syntax element to form a series of one or more bits, which are referred to as "bins." In addition, the video encoder may identify a coding context. The coding context may identify probabilities of coding bins having particular values. For instance, a coding context may indicate a 0.7 probability of coding a 0-valued bin and a 0.3 probability of coding a 1-valued bin. After identifying the coding context, the video encoder may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, the video encoder may repeat these steps with the interval being the sub-interval associated with the value of the encoded bit. When the video encoder repeats these steps for the next bin, the video encoder may use modified probabilities based on the probabilities indicated by the identified coding context and the actual values of bins encoded.

When a video decoder performs CABAC decoding on a syntax element, the video decoder may identify a coding context. The video decoder may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, the video decoder may decode a bin having the value associated with the lower sub-interval. If the encoded value is within the upper sub-interval, the video decoder may decode a bin having the value associated with the upper sub-interval. To decode a next bin of the syntax element, the video decoder may repeat these steps with the interval being the sub-interval that contains the encoded value. When the video decoder repeats these steps for the next bin, the video decoder may use modified probabilities based on the probabilities indicated by the identified coding context and the decoded bins. The video decoder may then de-binarize the bins to recover the syntax element.

In some examples, video encoder 20 and video decoder 30 may determine a context (i.e., a coding context) for coding the syntax element using one context per channel (or, alternatively, for each component). Alternatively, there may be two context indices, decided by one or more signaled flags in one or more neighboring blocks (e.g., a left- and/or top-neighboring CU, PU, and/or TU). As one example, if the flag in a left-neighboring CU, PU, or TU is set equal to zero or is unavailable, video encoder 20 and video decoder 30 may determine that the context index for CABAC coding the flag of a current CU, PU, or TU is zero. As another example, if the flag in the left-neighboring block is available and equal to one, video encoder 20 and video decoder 30 may determine that the context index for CABAC coding the flag of the current CU/PU/TU is one.

As yet another example, there may be three contexts, decided by a signaled flag in a left-neighboring block (e.g., CU, PU, and/or TU) and a flag in an above-neighboring block (e.g., CU, PU, and/or TU). Video encoder 20 and video decoder 30 may determine the context index (ctxIdx) as follows:

$$ctxIdx=(\text{FlagLeft \&\& AvailLeft})+(\text{FlagAbove \&\& AvailAbove}) \quad (1)$$

In the example of formula (1), FlagLeft and FlagAbove refer to the signaled flag, respectively, in the left and the above CU, PU, or TU, and AvailLeft and AvailAbove refers to whether the flags are available or not. If available, they are 1. Otherwise, they are 0.

Alternatively, video encoder 20 and video decoder 30 may derive a context with a measurement obtained from neighboring reference samples. In one or more of the examples provided in this disclosure, there are several implicit criteria for turning on/off a set of filters, and those criteria may be used for the context index derivation, as follows:

Variance of the reference samples
Sum of the absolute difference between two adjacent pixels
Maximum difference (e.g., absolute difference) among pixels larger than a threshold.
Counting numbers to have the maximum difference (e.g., maximum absolute difference) greater than a threshold
[1, −2, 1] FIR filtering and the result (e.g., the absolute value of the result) greater than a threshold
Counts of the sign change of the pixel difference
Any combination of the above criteria.

In addition, or in the alternative, several syntax elements may be considered in the context index derivation:
Prediction mode
Block sizes
Partition sizes In some examples, video encoder 20 and video decoder 30 may be configured to implicitly derive a value for the syntax element (e.g., flag) representative of whether a filter for intra-prediction is to be disabled. When implicitly derived, video encoder 20 need not signal a value for the syntax element, and video decoder 30 need not receive a value for the syntax element.

In some examples, for a block size smaller (or, alternatively, greater) than a threshold, video encoder 20 and video decoder 30 implicitly derive values for the flags. The derivation criteria may be the same as that described in other examples of this disclosure. Otherwise, the flags may be explicitly signaled.

In one example, for a luma channel (or Y component), video encoder 20 and video decoder 30 implicitly derive the flags, but for a chroma channel (or Cb, Cr components), video encoder 20 and video decoder 30 may explicitly code values for the flags. Alternatively, for a luma channel (or Y component), video encoder 20 and video decoder 30 may code values for the flags, but for a chroma channel (or Cb, Cr components), video encoder 20 and video decoder 30 may implicitly derive values for the flags.

In some examples, some filters are adaptively turned on/off with the implicit derivation method, while the flags for other filters are explicitly signaled. That is, for the same block, one or more filters may be explicitly enabled or disabled using explicitly coded flags, while one or more other filters may be enabled or disabled using implicit derivation.

In some examples, high-level syntax (HLS) flags may be signaled (e.g., coded) in a slice header, PPS, SPS, and/or VPS. Video encoder 20 and video decoder 30 may code values for similar flags at the CU, PU, and/or TU level only when a corresponding flag in one or more of the slice header, PPS, SPS, and/or VPS indicates that intra-prediction filtering can be enabled.

In general, in the examples above, one or more filters may be enabled or disabled using the syntax elements or implicit derivation. For example, the filters may include any or all of an MDIS filter, a ⅟₃₂-pixel (pel) bilinear interpolation filter, a boundary filter, an edge filter, and/or a DC filter. A VPS, SPS, PPS, and/or slice header may specify which filters are switched off (or can be enabled) based on one or more of a CU, PU, and/or TU level syntax element (e.g., flag).

In another example of this disclosure, it is assumed that a disable filtering flag is signaled explicitly at the CU level or at the TU level. In such examples, video encoder 20 may signal, at the TU level, a disable filtering flag before a CBF. For instance, the disable filtering flag may be located in a transform_tree syntax structure prior to a CBF. Thus, under this assumption, the disable filtering flag is always signaled before the transform_skip_flag syntax element (which is signaled in a residual_coding syntax structure in a transform_unit syntax structure that occurs after the CBFs in a transform_tree syntax element). As indicated above, the value of the transform_skip_flag syntax element may invoke the transform skip operation, where residual signals after the prediction may be quantized without transform (e.g., without application of a DCT).

Various examples of this disclosure described above provide techniques in which the disable filtering flag is decided by a transform skip flag and/or any implicit derivation method. In accordance with an additional example of this disclosure regarding explicit signaling of the disable filtering flag, the operation of the disable filtering flag may be further changed based on the value of the transform_skip_flag syntax element. In accordance with this example, when the disable filtering flag is 1 (or has some other value indicating that filtering can be disabled) and the transform_skip_flag syntax element for a TU is 0 (or another value indicating that the transform is to be skipped for the TU, i.e., that no transform is to be applied to the TU), filtering as described in section 8.4.4.2.6 of the HEVC Range Extensions (JCTVC-M1005-v2) specification may be applied. In other words, a video coder may apply the bilinear filtering of equations (8-52) or (8-60) of JCTVC-M1005-v2 or the nearest-neighbor interpolation of equations (8-53) or (8-61) of JCTVC-M1005-v2. However, when the disable filtering flag is 1 (or some other value indicating that filtering can be disabled) and the transform_skip_flag for a TU is 1 (or some other value indicating that whether to apply the transform to the TU depends on other syntax elements), filtering may be disabled. When the disable filtering flag is 0, filtering as in the HEVC Range Extensions specification (JCTVC-M1005-v2) may be applied, irrespective of the transform_skip_flag.

In other words, a video coder may apply the bilinear filtering of equations (8-52) or (8-60) of JCTVC-M1005-v2 or the nearest-neighbor interpolation of equations (8-53) or (8-61) of JCTVC-M1005-v2.

In the case of lossless coding, the application of filtering may be made dependent on the transquant_bypass_flag instead of the transform_skip_flag. For example, when the transquant_bypass_flag syntax element of a CU containing a TU has a value indicating that the transform and quantization is to be skipped for the TU, a video coder may apply filtering as described in section 8.4.4.2.6 of JCTVC-M1005-v2. However, when the cu_transquant_bypass_flag does not have a value indicating that the transform and quantization are skipped for the TU, the video coder may disable filtering. Alternatively, the application of filtering may be solely dependent on the disable filtering flag in lossless coding.

In another example, the disabling of filtering may be based on any implicit derivation method, such as the 3-tap FIR filter [1, −2, 1] described in various examples of this disclosure. In this case, if the disable filtering flag is 1, and the result of FIR filtering is below a threshold, filtering as in JCTVC-M1005-v2 may be applied. When the disable filtering flag is 1 and the result of FIR filtering is above the threshold, filtering may be disabled. When the disable filtering flag is 0, filtering as in JCTVC-M1005-v2 may be applied irrespective of the transform_skip_flag. Furthermore, in some examples, the criteria for applying the filtering may be conditioned on a combination of transform_skip_ flag and one or more implicit derivation methods, as described in other examples of this disclosure.

Figure 10:
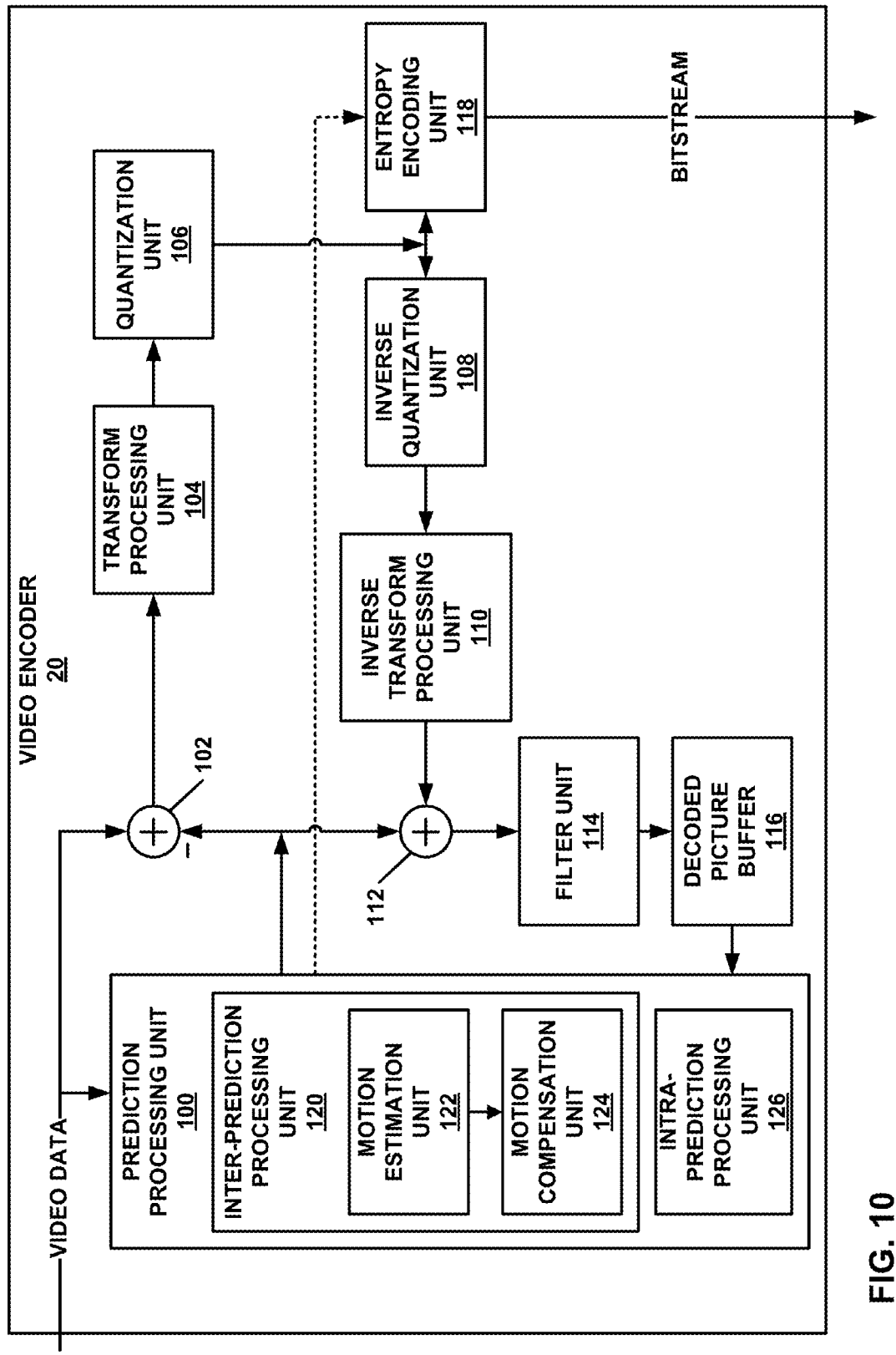
FIG. 10 is a block diagram illustrating an example video encoder that may implement the techniques described in this disclosure.

FIG. 10 is a block diagram illustrating an example video encoder 20 that may implement the techniques of this disclosure. FIG. 10 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 10, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 114, a decoded picture buffer 116, and an entropy encoding unit 118. Prediction processing unit 100 includes an inter-prediction processing unit 120 and an intra-prediction processing unit 126. Prediction processing unit 100 may also be referred to as a "mode select unit." Inter-prediction processing unit 120 includes a motion estimation unit 122 and a motion compensation unit 124. Motion estimation unit 122 and motion compensation unit 124 may be highly integrated, but are illustrated separately for conceptual purposes. Video encoder 20 includes inverse quantization unit 108, inverse transform processing unit 110, and reconstruction unit 112 for video block reconstruction. In some examples, residual generation unit 102 and/or reconstruction unit 112 are summers. In other examples, video encoder 20 may include more, fewer, or different functional components.

Video encoder 20 may receive video data. Video encoder 20 may encode each CTU in a slice of a picture of the video data. Each of the CTUs may be associated with equally-sized luma coding tree blocks (CTBs) and corresponding CTBs of the picture. As part of encoding a CTU, prediction processing unit 100 may perform quad-tree partitioning to divide the CTBs of the CTU into progressively-smaller blocks. The smaller blocks may be coding blocks of CUs. For example, prediction processing unit 100 may partition a CTB associated with a CTU into four equally-sized sub-blocks, partition one or more of the sub-blocks into four equally-sized sub-sub-blocks, and so on.

As shown in FIG. 10, video encoder 20 receives video data and partitions the data into video blocks. In other words, during the encoding process, video encoder 20 receives a video frame or slice to be coded. In some examples, a partitioning module (not shown) of video encoder 20 partitions the data into video blocks. In other words, the partitioning module may partition blocks of video data into sub-blocks (e.g., based on evaluation of previous partitioning schemes in previous coding passes). For example, prediction processing unit 100 may initially partition a frame or slice into LCUs, and partition each of the LCUs into sub-CUs based on rate-distortion analysis (e.g., rate-distortion optimization). Prediction processing unit 100 may further produce a quadtree data structure indicative of partitioning of an LCU into sub-CUs. Leaf-node CUs of the quadtree may include one or more PUs and one or more TUs. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 100 may select one of a plurality of possible coding modes, such as one of a plurality of intra coding modes or one of a plurality of inter coding modes, for the current video block based on error results (e.g., coding rate and the level of distortion). Prediction processing unit 100 may be configured to implement the techniques of this disclosure for performing intra-prediction. Prediction processing unit 100 may provide the resulting intra- or inter-coded block to residual generation unit 102 (e.g., a summer) to generate residual block data and to reconstruction unit 112 (e.g., a summer) to reconstruct the encoded block for use as a reference picture.

Video encoder 20 may encode CUs of a CTU to generate encoded representations of the CUs (i.e., coded CUs). As part of encoding a CU, prediction processing unit 100 may partition the coding blocks associated with the CU among one or more PUs of the CU. Thus, each PU may be associated with a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra-prediction, and symmetric PU sizes of 2N×2N, 2N×N, N×2N, N×N, or similar for inter-prediction. Video encoder 20 and video decoder 30 may also support asymmetric partitioning for PU sizes of 2N×nU, 2N×nD, nL×2N, and nR×2N for inter-prediction.

Intra-prediction processing unit 126 within prediction processing unit 100 may perform intra-predictive coding of the current video block relative to one or more neighboring blocks in the same frame or slice as the current block to be coded to provide spatial compression. In various examples, intra-prediction processing unit 126 may perform one or more of the techniques described herein for adaptively controlling filtering during intra-prediction of an encoding process. Motion estimation unit 122 and motion compensation unit 124 within prediction processing unit 100 perform inter-predictive coding of the current video block relative to one or more predictive blocks in one or more reference pictures to provide temporal compression.

Inter-prediction processing unit 120 may generate predictive data for a PU by performing inter-prediction on each PU of a CU. The predictive data for the PU may include predictive blocks of the PU and motion information for the PU. Inter-prediction processing unit 120 may perform different operations for a PU of a CU depending on whether the PU is in an I slice, a P slice, or a B slice. In an I slice, all PUs are intra predicted. Hence, if the PU is in an I slice, inter-prediction processing unit 120 does not perform inter-prediction on the PU. In some examples, motion estimation unit 122 may be configured to determine the inter-prediction mode for a video slice according to a predetermined pattern for a video sequence. The predetermined pattern may designate video slices in the sequence as P slices, B slices or GPB slices. Video encoder 20 may perform multiple coding passes, e.g., to select an appropriate coding mode for each block of video data.

Motion estimation, performed by motion estimation unit 122, is the process of generating motion vectors, which estimate motion for video blocks. A motion vector, for example, may indicate the displacement of a PU of a video block within a current video frame or picture relative to a predictive block within a reference picture. Motion estimation unit 122 may calculate a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in decoded picture buffer 116. Motion estimation unit 122 sends the calculated motion vector to entropy encoding unit 118 and motion compensation unit 124.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in decoded picture buffer 116 (i.e., a reference frame memory). For example, video encoder 20 may interpolate values of one-quarter pixel positions, one-eighth pixel positions, or other fractional pixel positions of the reference picture. Therefore, motion estimation unit 122 may perform a motion search relative to the full pixel positions and fractional pixel positions and output a motion vector with fractional pixel precision.

Motion compensation, performed by motion compensation unit 124, may involve fetching or generating the predictive block based on the motion vector determined by motion estimation, possibly performing interpolations to sub-pixel precision. Upon receiving the motion vector for the PU of the current video block, motion compensation unit 124 may locate the predictive block to which the motion vector points in one of the reference picture lists. Video encoder 20 (e.g., residual generation unit 102 of video encoder 20) may form a residual video block by subtracting pixel values of the predictive block from the pixel values of the current video block being coded, forming pixel difference values. In general, motion estimation unit 122 performs motion estimation relative to luma components, and motion compensation unit 124 uses motion vectors calculated based on the luma components for both chroma components and luma components. The pixel difference values form residual data for the block, and may include both luma and chroma difference components. Residual generation unit 102 (e.g., a "summer") may represent the component or components that perform this subtraction operation. Motion compensation unit 124 may also generate syntax elements associated with the video blocks and the video slice for use by video decoder 30 in decoding the video blocks of the video slice.

If a PU is in a P slice, motion estimation unit 122 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 122 may generate a reference index that indicates a position in RefPicList0 of the reference picture containing the reference region for the PU. In addition, motion estimation unit 122 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 122 may output the reference index and the motion vector as the motion information of the PU. Motion compensation unit 124 may generate the predictive blocks of the PU based on actual or interpolated samples at the reference location indicated by the motion vector of the PU.

If a PU is in a B slice, motion estimation unit 122 may perform uni-prediction or bi-prediction for the PU. To perform uni-prediction for the PU, motion estimation unit 122 may search the reference pictures of RefPicList0 or a second reference picture list ("RefPicList1") for a reference region for the PU. Motion estimation unit 122 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 124 may generate the predictive blocks of the PU based at least in part on actual or interpolated samples at the reference location indicated by the motion vector of the PU.

To perform bi-directional inter-prediction for a PU, motion estimation unit 122 may search the reference pictures in RefPicList0 for a reference region for the PU and may also search the reference pictures in RefPicList1 for another reference region for the PU. Motion estimation unit 122 may generate reference indexes that indicate positions in RefPicList0 and RefPicList1 of the reference pictures that contain the reference regions. In addition, motion estimation unit 122 may generate motion vectors that indicate spatial displacements between the reference locations associated with the reference regions and a prediction block of the PU. The motion information of the PU may include the reference indexes and the motion vectors of the PU. Motion compensation unit 124 may generate the predictive blocks of the PU based at least in part on actual or interpolated samples at the reference locations indicated by the motion vectors of the PU.

Intra-prediction processing unit 126 may generate predictive data for a PU by performing intra-prediction on the PU. In other words, intra-prediction processing unit 126 may intra-predict a current block, as an alternative to the inter-prediction performed by motion estimation unit 122 and motion compensation unit 124, as described above. The predictive data for the PU may include predictive blocks for the PU and various syntax elements. Intra-prediction processing unit 126 may perform intra-prediction on PUs in I slices, P slices, and B slices.

Intra-prediction processing unit 126 may determine an intra-prediction mode to use to encode a current block (e.g., determine a predictive block for a PU). For instance, to perform intra-prediction on a PU, intra-prediction processing unit 126 may use multiple intra-prediction modes to generate multiple sets of predictive blocks for the PU. In other words, intra-prediction processing unit 126 may encode a current block using various intra-prediction modes, e.g., during separate encoding passes, and intra-prediction processing unit 126 (or a mode select unit, in some examples) may select an appropriate intra-prediction mode to use from the tested modes.

In some examples, intra-prediction processing unit 126 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 126 may calculate ratios from the distortions and rates for the various encoded blocks to determine which intra-prediction mode exhibits the best rate-distortion value for the block.

When performing intra-prediction using a particular intra-prediction mode, intra-prediction processing unit 126 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 126 may use various numbers of intra-prediction modes, e.g., 33 directional intra-prediction modes. In some examples, the number of intra-prediction modes may depend on the size of the prediction blocks of the PU.

In some examples, intra-prediction processing unit 126 may calculate, based at least in part on a sum of absolute differences between neighboring reference samples, a metric. In addition, intra-prediction processing unit 126 may determine, based at least in part on the metric, whether to use nearest-neighbor interpolation when generating a predictive block based on the neighboring reference samples. In some examples, when intra-prediction processing unit 126 does not make the determination to use nearest-neighbor interpolation, intra-prediction processing unit 166 may use bilinear interpolation. Video encoder 20 may include, in a video data bitstream, data representing residual data based on the predictive block.

In another example, intra-prediction processing unit 126 may calculate, based at least in part on a sum of absolute differences between neighboring reference samples, a metric. When the metric is not greater than a threshold, intra-prediction processing unit 126 may apply smoothing filtering or bilinear interpolation filtering to the neighboring reference samples. In addition, intra-prediction processing unit 126 may generate, based at least in part on the neighboring reference samples, a predictive block. Video encoder 20 may include, in a video data bitstream, data representing residual data based on the predictive block.

In another example, for each respective sample in a predictive block, intra-prediction processing unit 126 may determine, based at least in part on a position of the respective sample and an intra-prediction angle, a variable. When the variable is not equal to a particular value, intra-prediction processing unit 126 may select, based at least in part on a first metric, a first filtering mode from among smoothing filtering and bilinear interpolation filtering. In addition, when the variable is not equal to the particular value, intra-prediction processing unit 126 may determine a value of the respective sample at least in part by applying the first selected filtering mode to one or more intra-prediction reference samples. When the variable is equal to the particular value, intra-prediction processing unit 126 may select, based at least in part on a second metric, a second filtering mode from among smoothing filtering and bilinear interpolation filtering. Intra-prediction processing unit 126 may determine a value of the respective sample at least in part by applying the second selected filtering mode to the one or more intra-prediction reference samples. Video encoder 20 may include, in a video data bitstream, data representing residual data based on the predictive block.

In another example, for each respective predictive sample in a predictive block, intra-prediction processing unit 126 may select, based at least in part on a metric, an interpolation mode from among bilinear interpolation and nearest-neighbor interpolation. Intra-prediction processing unit 126 may determine, based on the selected interpolation mode, the respective predictive sample. Furthermore, video encoder 20 may include, in a video data bitstream, data representing residual data based on the predictive block.

After selecting an intra-prediction mode for a block, intra-prediction processing unit 126 may provide information indicative of the selected intra-prediction mode for the block to entropy encoding unit 118. Entropy encoding unit 118 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Prediction processing unit 100 may select the predictive data for PUs of a CU from among the predictive data generated by inter-prediction processing unit 120 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive blocks of the selected predictive data may be referred to herein as the selected predictive blocks. In other words, prediction processing unit 100 (acting as a mode select unit) may select one of the coding modes, intra or inter, e.g., based on error results, and may provide the resulting intra- or inter-coded block to residual generation unit 102 to generate residual block data and to reconstruction unit 112 to reconstruct the encoded block for use as a reference frame. Prediction processing unit 100 may also provide syntax elements, such as syntax elements associated with motion vectors, intra-mode indicators, partition information, and other such syntax information, to entropy encoding unit 118.

Residual generation unit 102 may generate, based on the coding block (e.g., luma, Cb and Cr coding blocks) of a CU and the selected predictive blocks (e.g., luma, Cb and Cr blocks) of the PUs of the CU, residual blocks (e.g., luma, Cb and Cr residual blocks) of the CU. For instance, residual generation unit 102 may generate the residual blocks of the CU such that each sample in the residual blocks has a value equal to a difference between a sample in a coding block of the CU and a corresponding sample in a corresponding selected predictive block of a PU of the CU. In some examples, after prediction processing unit 100 generates a predictive block for a current video block via either inter-prediction or intra-prediction, video encoder 20 (e.g., residual generation unit 102 of video encoder 20) forms a residual video block by subtracting the predictive block from the current video block (i.e., the video block being coded). The residual video data in the residual block may be included in one or more TUs and applied to transform processing unit 104.

Transform processing unit 104 may perform quad-tree partitioning to partition the residual blocks of a CU into transform blocks associated with TUs of the CU. Thus, a TU may be associated with a luma transform block and two corresponding chroma transform blocks. The sizes and positions of the luma and chroma transform blocks of TUs of a CU may or may not be based on the sizes and positions of prediction blocks of the PUs of the CU.

Transform processing unit 104 may generate transform coefficient blocks for each TU of a CU by applying one or more transforms to the transform blocks of the TU. Transform processing unit 104 may apply various transforms to a transform block associated with a TU. For example, transform processing unit 104 may apply a discrete cosine transform (DCT), a directional transform, or a conceptually-similar transform to a transform block. In other words, transform processing unit 104 may transform the residual video data into residual transform coefficients using a transform, such as a DCT or a conceptually similar transform. Wavelet transforms, integer transforms, sub-band transforms or other types of transforms could also be used. Applying the transform may produce a video block comprising residual transform coefficient values (i.e., a block of residual transform coefficients). In some examples, transform processing unit 104 may convert the residual video data from a pixel domain to a transform domain, such as a frequency domain. In some examples, transform processing unit 104 sends the resulting transform coefficients to quantization unit 106.

Quantization unit 106 may quantize the transform coefficients in a coefficient block. The quantization process may reduce the bit depth associated with some or all of the transform coefficients. Thus, quantization unit 106 may quantize the transform coefficients to further reduce bit rate. The quantization process may reduce the bit depth associated with some or all of the coefficients. The quantization process may also be referred to as a "scaling" process, and thus, quantized transform coefficients may also be referred to as "scaled transform coefficients." For example, an n-bit transform coefficient may be rounded down to an m-bit transform coefficient during quantization, where n is greater than m.

Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU. In other words, the degree of quantization (or scaling) may be modified by adjusting a quantization parameter. Quantization may introduce loss of information, thus quantized transform coefficients may have lower precision than the original ones. In some examples, quantization unit 106 may then perform a scan of the matrix including the quantized transform coefficients. Alternatively, entropy encoding unit 118 may perform the scan.

Inverse quantization unit 108 and inverse transform processing unit 110 may apply inverse quantization and inverse transforms, respectively, to a coefficient block, respectively, to reconstruct a residual block from the coefficient block. Reconstruction unit 112 may add the reconstructed residual block to corresponding samples from one or more predictive blocks generated by prediction processing unit 100 to produce a reconstructed transform block associated with a TU. In this way, inverse quantization unit 108 and inverse transform processing unit 110 may apply inverse quantization and inverse transformation, respectively, to reconstruct the residual block in the pixel domain for later use as a reference block of a reference picture. By reconstructing transform blocks for each TU of a CU in this way, video encoder 20 may reconstruct the coding blocks of the CU.

Furthermore, in some examples, transform processing unit 104 does not apply transforms to a transform block. In such examples, the transform block may be treated as a transform coefficient block. In some examples, transform processing unit 104 sends the resulting transform coefficients to quantization unit 54.

Filter unit 114 may perform one or more deblocking operations to reduce blocking artifacts in the coding blocks associated with a CU. Decoded picture buffer 116 may store the reconstructed coding blocks after filter unit 114 performs the one or more deblocking operations on the reconstructed coding blocks. For instance, a deblocking filter may also be included to filter block boundaries to remove blockiness artifacts from reconstructed video. If desired, the deblocking filter would typically filter the output of reconstruction unit 112. Additional loop filters (in loop or post loop) may also be used in addition to the deblocking filter. Such filters are not shown for brevity, but if desired, may filter the output of reconstruction unit 112 (as an in-loop filter). Inter-prediction processing unit 120 may use a reference picture that contains the reconstructed coding blocks to perform inter-prediction on PUs of other pictures. In addition, intra-prediction processing unit 126 may use reconstructed coding blocks in decoded picture buffer 116 to perform intra-prediction on other PUs in the same picture as the CU.

Entropy encoding unit 118 may receive data from other functional components of video encoder 20. For example, entropy encoding unit 118 may receive coefficient blocks from quantization unit 106 and may receive syntax elements from prediction processing unit 100. Entropy encoding unit 118 may perform one or more entropy encoding operations on the data to generate entropy-encoded data. For example, following quantization, entropy encoding unit 118 may entropy encode quantized transform coefficients. Entropy encoding unit 118 may perform various entropy encoding operations. For example, entropy encoding unit 118 may perform a CABAC operation, a CAVLC operation, a variable-to-variable (V2V) length coding operation, a SBAC operation, a PIPE coding operation, an Exponential-Golomb encoding operation, or another type of entropy encoding operation on the data. In the case of context-based entropy coding, context may be based on neighboring blocks. Following the entropy encoding by entropy encoding unit 118, the encoded bitstream may be transmitted to video decoder 30, or archived for later transmission or retrieval by video decoder 30. Entropy encoding unit 118 may also entropy encode the motion vectors and the other syntax elements for the current video slice being coded. Video encoder 20 may output a bitstream that includes entropy-encoded data generated by entropy encoding unit 118.

Video encoder 20 of FIG. 10 may represent an example of a video encoder configured to code (i.e., encode) a value for a syntax element representative of whether to enable at least one filter for intra-prediction of at least one block of video data, and intra-predictive code (i.e., encode) the at least one block of video data, wherein when the value for the syntax element represents that the at least one filter is enabled, intra-predictive coding the at least one block comprises filtering intra-predictive data for the at least one block. Furthermore, in some examples, video encoder 20 of FIG. 10 represents an example of a video encoder configured to adaptively disable one or more filters used to filter a plurality of intra-prediction reference samples. Additionally, video encoder 20 may signal a syntax element that controls the one or more filters. Intra-prediction processing unit 126 of video encoder 20 may intra-encode video data using the intra-prediction reference samples.

Figure 11:
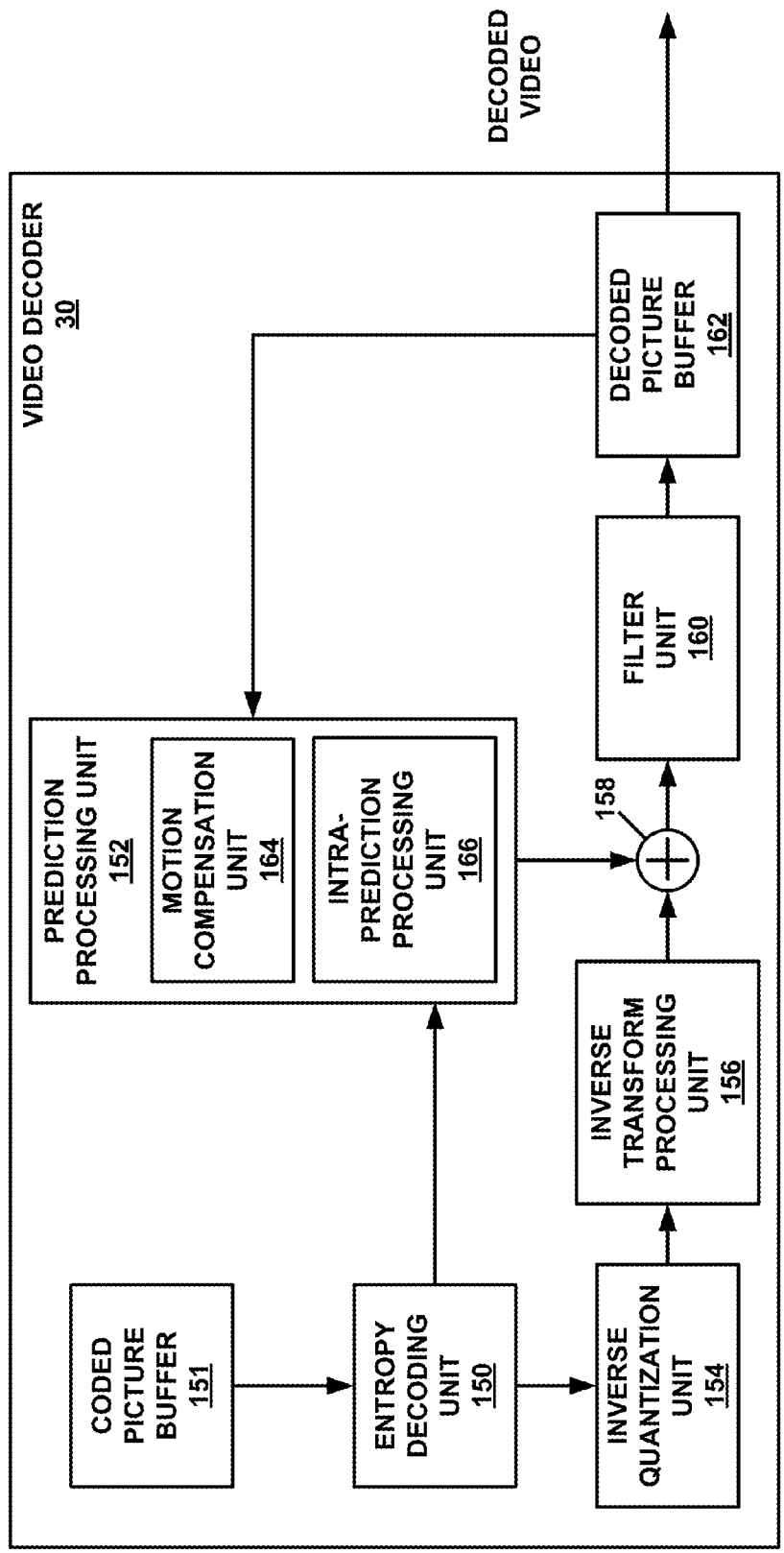
FIG. 11 is a block diagram illustrating an example video decoder that may implement the techniques described in this disclosure.

FIG. 11 is a block diagram illustrating an example video decoder 30 that is configured to implement the techniques of this disclosure. FIG. 11 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 11, video decoder 30 includes an entropy decoding unit 150, a prediction processing unit 152, an inverse quantization unit 154, an inverse transform processing unit 156, a reconstruction unit 158, a filter unit 160, and a decoded picture buffer 162. Prediction processing unit 152 includes a motion compensation unit 164 and an intra-prediction processing unit 166. Motion compensation unit 164 may generate prediction data (e.g., a predictive block) based on motion vectors received from entropy decoding unit 150, while intra-prediction processing unit 166 may generate prediction data (e.g., a predictive block) based on intra-prediction mode indicators received from entropy decoding unit 150. In some examples, reconstruction unit 158 is a summer. In other examples, video decoder 30 may include more, fewer, or different functional components. Video decoder 30 may, in some examples, perform a decoding pass generally reciprocal to the encoding pass described with respect to video encoder 20 from FIG. 10.

A coded picture buffer (CPB) 151 may receive and store encoded video data (e.g., NAL units) of a bitstream. Entropy decoding unit 150 may receive NAL units from CPB 151 and may parse the NAL units to obtain syntax elements from the bitstream. Thus, during the decoding process, video decoder 30 may receive an encoded video bitstream that represents video blocks of an encoded video slice and associated syntax elements from video encoder 20. Entropy decoding unit 150 may entropy decode entropy-encoded syntax elements in the NAL units. In some examples, entropy decoding unit 150 of video decoder 30 entropy decodes the bitstream to generate quantized coefficients, motion vectors, and other syntax elements. In such examples, entropy decoding unit 150 may forward the motion vectors and other syntax elements to prediction processing unit 152. Video decoder 30 may receive the syntax elements at the video slice level and/or the video block level. Prediction processing unit 152, inverse quantization unit 154, inverse transform processing unit 156, reconstruction unit 158, and filter unit 160 may generate decoded video data based on the syntax elements extracted from the bitstream.

The NAL units of the bitstream may include coded slice NAL units. As part of decoding the bitstream, entropy decoding unit 150 may extract and entropy decode syntax elements from the coded slice NAL units. Each of the coded slices may include a slice header and slice data. The slice header may contain syntax elements pertaining to a slice.

In addition to decoding syntax elements from the bitstream, video decoder 30 may perform a reconstruction operation on a CU. To perform the reconstruction operation on a CU, video decoder 30 may perform a reconstruction operation on each TU of the CU. By performing the reconstruction operation for each TU of the CU, video decoder 30 may reconstruct residual blocks of the CU.

As part of performing a reconstruction operation on a TU of a CU, inverse quantization unit 154 may inverse quantize, i.e., de-quantize, coefficient blocks associated with the TU. For instance, inverse quantization unit 154 may inverse quantize, i.e., de-quantize, the quantized transform coefficients provided in the bitstream and decoded by entropy decoding unit 150. Inverse quantization unit 154 may use a QP value associated with the CU of the TU to determine a degree of quantization and, likewise, a degree of inverse quantization for inverse quantization unit 154 to apply. For instance, the inverse quantization process may include use of a quantization parameter $QP_Y$ calculated by video decoder 30 for each video block in the video slice to determine a degree of quantization and, likewise, a degree of inverse quantization that should be applied. In other words, the inverse quantization process may include use of a quantization parameter calculated by video encoder 20 for each video block in the video slice to determine a degree of quantization and, likewise, a degree of inverse quantization that should be applied. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 154 inverse quantizes a coefficient block, inverse transform processing unit 156 may apply one or more inverse transforms to the coefficient block in order to generate a residual block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block (e.g., to produce residual blocks in the pixel domain).

When a video slice is coded as an intra-coded (I) slice, intra-prediction processing unit 166 of prediction processing unit 152 may generate prediction data (e.g., a predictive block) for a video block of the current video slice based on a signaled intra-prediction mode and data from previously decoded blocks of the current frame or picture. In various examples, intra-prediction processing unit 166 may perform one or more of the techniques described herein for adaptively controlling filtering during intra-prediction of a decoding process. When the video frame is coded as an inter-coded (i.e., B, or P) slice, motion compensation unit 164 of prediction processing unit 152 produces predictive blocks for a video block of the current video slice based on the motion vectors and other syntax elements received from entropy decoding unit 150. The predictive blocks may be produced from one of the reference pictures within one of the reference picture lists. Video decoder 30 may construct the reference frame lists, List 0 and List 1, using default construction techniques based on reference pictures stored in decoded picture buffer 92.

If a PU is encoded using intra-prediction, intra-prediction processing unit 166 may perform intra-prediction to generate predictive blocks for the PU. Intra-prediction processing unit 166 may use an intra-prediction mode to generate the predictive blocks (e.g., predictive luma, Cb, and Cr blocks) for the PU based on the prediction blocks of spatially-neighboring PUs. Intra-prediction processing unit 166 may determine the intra-prediction mode for the PU based on one or more syntax elements decoded from the bitstream.

In some examples, intra-prediction processing unit 166 may calculate, based at least in part on a sum of absolute differences between neighboring reference samples, a metric. Furthermore, intra-prediction processing unit 166 may determine, based at least in part on the metric, whether to use nearest-neighbor interpolation when generating a predictive block based on the neighboring reference samples. In some examples, when intra-prediction processing unit 166 does not make the determination to use nearest-neighbor interpolation, intra-prediction processing unit 166 may use bilinear interpolation. Video decoder 30 may reconstruct, based in part on the predictive block, a decoded video block.

In another example, intra-prediction processing unit 166 may calculate, based at least in part on a sum of absolute differences between neighboring reference samples, a metric. In this example, when the metric is not greater than a threshold, intra-prediction processing unit 166 may apply smoothing filtering or bilinear interpolation filtering to the neighboring reference samples. In addition, intra-prediction processing unit 166 may generate, based at least in part on the neighboring reference samples, a prediction block. Video decoder 30 may reconstruct, based in part on the predictive block, a decoded video block.

In another example, for each respective sample in a predictive block, intra-prediction processing unit 166 may determine, based at least in part on a position of the respective sample and an intra-prediction angle, a variable (e.g., iFact). When the variable is not equal to a particular value (e.g., 0), intra-prediction processing unit 166 may select, based at least in part on a first metric, a first filtering mode from among smoothing filtering and bilinear interpolation filtering, Furthermore, when the variable is not equal to the particular value, intra-prediction processing unit 166 may determine a value of the respective sample at least in part by applying the first selected filtering mode to one or more intra-prediction reference samples. When the variable is equal to the particular value, intra-prediction processing unit 166 may select, based at least in part on a second metric, a second filtering mode from among smoothing filtering and bilinear interpolation filtering. In addition, when the variable is equal to the particular value, intra-prediction processing unit 166 may determine a value of the respective sample at least in part by applying the second selected filtering mode to the one or more intra-prediction reference samples. Video decoder 30 may reconstruct, based in part on the predictive block, a decoded video block.

In another example, for each respective predictive sample in a predictive block, intra-prediction processing unit 166 may select, based at least in part on a metric, an interpolation mode from among bilinear interpolation and nearest-neighbor interpolation. In addition, intra-prediction processing unit 166 may determine, based on the selected interpolation mode, the respective predictive sample. Video decoder 30 may reconstruct, based in part on the predictive block, a decoded video block.

Prediction processing unit 152 may construct a first reference picture list (RefPicList0) and a second reference picture list (RefPicList1) based on syntax elements extracted from the bitstream. Furthermore, if a PU is encoded using inter-prediction, entropy decoding unit 150 may obtain motion information for the PU. Motion compensation unit 164 may determine, based on the motion information of the PU, one or more reference regions for the PU. Motion compensation unit 164 may generate, based on samples at the one or more reference blocks for the PU, predictive blocks (e.g., predictive luma, Cb, and Cr blocks) for the PU.

In some examples, motion compensation unit 164 determines prediction information for a video block of the current video slice by parsing the motion vectors and other syntax elements, and uses the prediction information to produce the predictive blocks for the current video block being decoded. For example, motion compensation unit 164 may use some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Furthermore, in some examples, motion compensation unit 164 may also perform interpolation based on interpolation filters. Motion compensation unit 164 may use interpolation filters as used by video encoder 20 during encoding of the video blocks to calculate interpolated values for sub-integer pixels of reference blocks. In this case, motion compensation unit 164 may determine the interpolation filters used by video encoder 20 from the received syntax elements and use the interpolation filters to produce predictive blocks.

Reconstruction unit 158 may use the transform blocks (e.g., luma, Cb, and Cr transform blocks) associated with TUs of a CU and the predictive blocks (e.g., luma, Cb, and Cr blocks) of the PUs of the CU, i.e., either intra-prediction data or inter-prediction data, as applicable, to reconstruct the coding blocks (e.g., luma, Cb, and Cr coding blocks) of the CU. For example, reconstruction unit 158 may add samples of the transform blocks (e.g., luma, Cb, and Cr transform blocks) to corresponding samples of the predictive blocks (e.g., predictive luma, Cb, and Cr blocks) to reconstruct the coding blocks (e.g., luma, Cb, and Cr coding blocks) of the CU. In other words, after motion compensation unit 164 generates the predictive block for the current video block based on the motion vectors and other syntax elements, video decoder 30 may form a decoded video block by summing the residual blocks from inverse transform processing unit 156 with the corresponding predictive blocks generated by motion compensation unit 164. In this way, after motion compensation unit 164 generates the predictive block for the current video block based on the motion vectors and other syntax elements, video decoder 30 may form a decoded video block by summing the residual blocks from inverse transform processing unit 156 with the corresponding predictive blocks generated by motion compensation unit 164. Reconstruction unit 158 (e.g., summer) may represent the component or components that perform this summation operation.

Filter unit 160 may perform a deblocking operation to reduce blocking artifacts associated with the coding blocks (e.g., luma, Cb, and Cr coding blocks) of the CU. Thus, if desired, a deblocking filter may also be applied to filter the decoded blocks in order to remove blockiness artifacts. Other loop filters (either in the coding loop or after the coding loop) may also be used to smooth pixel transitions, or otherwise improve the video quality.

Video decoder 30 may store the coding blocks (e.g., luma, Cb, and Cr coding blocks) of the CU in decoded picture buffer 162. Thus, the decoded video blocks in a given frame or picture are then stored in decoded picture buffer 162, which stores reference pictures used for subsequent motion compensation. Decoded picture buffer 162 may also store decoded video for later presentation on a display device, such as display device 32 of FIG. 1. In other words, decoded picture buffer 162 may provide reference pictures for subsequent motion compensation, intra-prediction, and presentation on a display device, such as display device 32 of FIG. 1. For instance, video decoder 30 may perform, based on the blocks (e.g., luma, Cb, and Cr blocks) in decoded picture buffer 162, intra-prediction or inter-prediction operations on PUs of other CUs. In this way, video decoder 30 may extract, from the bitstream, transform coefficient levels of the significant luma coefficient block, inverse quantize the transform coefficient levels, apply a transform to the transform coefficient levels to generate a transform block, generate, based at least in part on the transform block, a coding block, and output the coding block for display.

Video decoder 30 of FIG. 11 may represent an example of a video decoder configured to code (i.e., decode) a value for a syntax element representative of whether to enable at least one filter for intra-prediction of at least one block of video data, and intra-predictive code (i.e., decode) the at least one block of video data, wherein when the value for the syntax element represents that the at least one filter is enabled, intra-predictive coding the at least one block comprises filtering intra-predictive data for the at least one block. Furthermore, video decoder 30 of FIG. 11 may represent an example of a video decoder configured to adaptively disable, based on a syntax element, one or more filters used to filter a plurality of intra-prediction reference samples. Video decoder 30 may intra-decode video data using the intra-prediction reference samples.

FIG. 12A is a flowchart illustrating an example operation of video encoder 20 to encode video data, in accordance with one or more techniques of this disclosure. FIG. 12A, along with the other flowcharts of this disclosure are presented as examples. Other examples may include more, fewer, or different actions.

In the example of FIG. 12A, video encoder 20 may calculate, based at least in part on a sum of absolute differences (SAD) between neighboring reference samples, a metric (200). For example, video encoder 20 may determine the SAD values for reference samples in the subset that are above the current block, separately determine the SAD values for reference samples that are on the left side of the current block, and then add these two SAD values.

In addition, video encoder 20 may determine, based at least in part on the metric, whether to use nearest-neighbor interpolation when generating a predictive block based on the neighboring reference samples (202). Video encoder 20 may include, in a video data bitstream, data representing residual data based on the predictive block (204).

Although not illustrated in the example of FIG. 12A, video encoder 20 may, in some examples, further determine, based at least in part on the metric, whether to use bilinear interpolation to generate the predictive block. For example, video encoder 20 may determine a sum of absolute differences between neighboring reference samples, as described elsewhere in this disclosure. In this example, video encoder 20 may make the determination to use bilinear interpolation when iFact is not equal to 0 and the sum of absolute differences is greater than a threshold value.

Furthermore, in some examples, the sum of absolute differences is a first sum of absolute differences. In such examples, when video encoder 20 calculates the metric, video encoder 20 may calculate the first sum of absolute differences based on reference samples that are above the predictive block. In addition, video encoder 20 may calculate a second sum of absolute differences based on reference samples that are left of the predictive block. In addition, video encoder 20 may calculate the metric based at least in part on a sum of the first and the second sums of absolute differences. As described elsewhere in this disclosure, when video encoder 20 uses bilinear interpolation to generate the predictive block, video encoder 20 may determine the value of each sample in the predictive block using the equation:

$$predSamples[x][y]=((32-iFact)*ref[x+iIdx+1]+iFact*ref[x+iIdx+2]+16)>>5,$$

or the equation:

$$predSamples[x][y]=((32-iFact)*ref[y+iIdx+1]+iFact*ref[y+iIdx+2]+16)>>5.$$

FIG. 12B is a flowchart illustrating an example operation of video decoder 30 to decode video data, in accordance with one or more techniques of this disclosure. In the example of FIG. 12B, video decoder 30 may calculate, based at least in part on a sum of absolute differences between neighboring reference samples, a metric (220). In addition, video decoder 30 may determine, based at least in part on the metric, whether to use nearest-neighbor interpolation when generating a predictive block based on the neighboring reference samples (222). Furthermore, video decoder 30 may reconstruct, based in part on the predictive block, a decoded video block (224).

Although not illustrated in the example of FIG. 12B, video decoder 30 may also determine, based at least in part on the metric, whether to use bilinear interpolation to generate the predictive block. For example, video decoder 30 may determine a sum of absolute differences between neighboring reference samples, as described elsewhere in this disclosure. In this example, video decoder 30 may make the determination to use bilinear interpolation when iFact is not equal to 0 and the sum of absolute differences is greater than a threshold value. As described elsewhere in this disclosure, when video decoder 30 uses bilinear interpolation to generate the predictive block, video decoder 30 may determine the value of each sample in the predictive block using the equation:

$$predSamples[x][y]=((32-iFact)*ref[x+iIdx+1]+iFact*ref[x+iIdx+2]+16)>>5,$$

or the equation:

$$predSamples[x][y]=((32-iFact)*ref[y+iIdx+1]+iFact*ref[y+iIdx+2]+16)>>5.$$

Furthermore, in some examples, the sum of absolute differences is a first sum of absolute differences. In such examples, when video decoder 30 calculates the metric, video decoder 30 may calculate the first sum of absolute differences based on reference samples that are above the predictive block. In addition, in such examples, video decoder 30 may calculate a second sum of absolute differences based on reference samples that are left of the predictive block. In such examples, video decoder 30 may calculate the metric based at least in part on a sum of the first and the second sums of absolute differences.

FIG. 13A is a flowchart illustrating an example operation of video encoder 20 to encode video data, in accordance with one or more techniques of this disclosure. In the example of FIG. 13A, video encoder 20 may calculate a metric (250). In some examples, video encoder 20 may calculate the metric based at least in part on a sum of absolute differences (SAD) between neighboring reference samples. In other examples, video encoder 20 may calculate the metric based on a variance or another function.

Furthermore, video encoder 20 may determine whether the metric is greater than a threshold (252). For example, if the metric is a SAD between neighboring reference samples, the threshold may be equal to 50 or another value. When the metric is not greater than a threshold ("NO" of 252), video encoder 20 may apply smoothing filtering or bilinear interpolation filtering to the neighboring reference samples (254). After applying smoothing filtering or bilinear interpolation filtering, or after determining that the metric is greater than the threshold ("YES" of 252), video encoder 20 may generate, based at least in part on the neighboring reference samples, a predictive block (256). In other words, video encoder 20 may use intra-prediction to generate the predictive block based on samples of a current picture. In some examples, when the metric is greater than the threshold, video encoder 20 applies neither smoothing filtering nor bilinear interpolation filtering to the neighboring reference samples. For instance, when the metric is greater than the threshold, video encoder 20 may set a filterFlag to 0. Furthermore, video encoder 20 may include, in a video data bitstream, data representing residual data based on the predictive block (258). In some examples, video encoder 20 may generate the residual data such that each sample of the residual data indicates a difference between a sample in the predictive block and a corresponding sample of the block being encoded. The data representing the residual data may be transformed, quantized, and/or entropy encoded.

FIG. 13B is a flowchart illustrating an example operation of video decoder 30 to decode video data, in accordance with one or more techniques of this disclosure. In the example of FIG. 13B, video decoder 30 may calculate a metric (270). In some examples, video decoder 30 may calculate the metric based at least in part on a sum of absolute differences (SAD) between neighboring reference samples. In other examples, video decoder 30 may calculate the metric based on a variance or another function.

Video decoder 30 may then determine whether the metric is greater than a threshold (272). For example, if the metric is a SAD between neighboring reference samples, the threshold may be equal to 50 or another value. When the metric is not greater than the threshold ("NO" of 272), video decoder 30 may apply smoothing filtering or bilinear interpolation filtering to the neighboring reference samples (274). After applying the smoothing filtering or bilinear interpolation filtering to the neighboring reference samples, or after determining that the metric is greater than the threshold ("YES" of 272), video decoder 30 may generate, based at least in part on the neighboring reference samples, a predictive block (276). In other words, video decoder 30 may use intra-prediction to generate the predictive block based on the neighboring reference samples. In some examples, when the metric is greater than the threshold, video decoder 30 applies neither smoothing filtering nor bilinear interpolation to the neighboring reference samples. Video decoder 30 may reconstruct, based in part on the predictive block, a decoded video block (274). For example, video decoder 30 may reconstruct the decoded video block such that each sample of the decoded video block is equal to a sum of a sample in the predictive block and a corresponding sample of a block of residual samples.

Figure 14A:
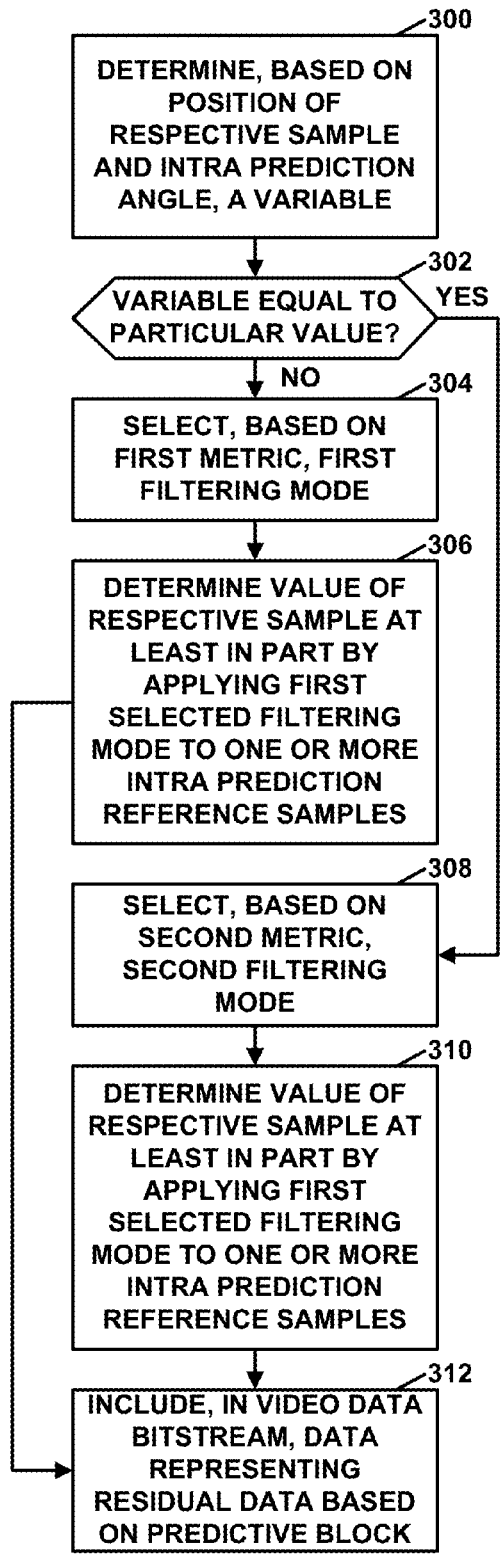
FIG. 14A is a flowchart illustrating an example operation of a video encoder to encode video data, in accordance with one or more techniques of this disclosure.

FIG. 14A is a flowchart illustrating an example operation of video encoder 20 to encode video data, in accordance with one or more techniques of this disclosure. In the example of FIG. 14A, video encoder 20 may perform actions 300-310 for each respective sample in a predictive block.

Particularly, in the example of FIG. 14A, video encoder 20 may determine, based at least in part on a position of the respective sample and an intra-prediction angle, a variable (e.g., iFact) (300). Furthermore, video encoder 20 may determine whether the variable is equal to a particular value (302). In some examples, the variable is equal to ((x+1)*intraPredAngle) & 31, where x is a row or column position of the respective sample and intraPredAngle is the intra-prediction angle. In such examples, the particular value may be equal to 0.

When the variable is not equal to the particular value ("NO" of 302), video encoder 20 may select, based at least in part on a first metric, a first filtering mode from among smoothing filtering or bilinear interpolation filtering (304). In some examples, video encoder 20 may calculate the first metric based at least in part on a sum of absolute differences between neighboring reference samples. In other examples, video encoder 20 may calculate the first metric based at least in part on a variance. In some examples, video encoder 20 may select smoothing filtering in response to determining that the first metric exceeds (or does not exceed) a threshold (e.g., 50). In some examples, video encoder 20 may select bilinear interpolation filtering in response to determining that the first metric exceeds (or does not exceed) a threshold (e.g., 50). In addition, video encoder 20 may determine a value of the respective sample at least in part by applying the first selected filtering mode to one or more intra-prediction reference samples (306).

On the other hand, when the variable is equal to the particular value ("YES" of 302), video encoder 20 may select, based at least in part on a second metric, a second filtering mode from among smoothing filtering or nearest neighbor interpolation (308). In some examples, video encoder 20 may calculate the second metric based at least in part on a sum of absolute differences between neighboring reference samples. In other examples, video encoder 20 may calculate the second metric based at least in part on a variance. Furthermore, in some examples, the first metric is the same as the second metric. In some examples, video encoder 20 may select bilinear interpolation filtering in response to determining that the second metric exceeds (or does not exceed) a threshold (e.g., 50). In some examples, video encoder 20 may select nearest neighbor interpolation in response to determining that the second metric exceeds (or does not exceed) a threshold (e.g., 50). In addition, video encoder 20 may determine a value of the respective sample at least in part by applying the second selected filtering mode to the one or more intra-prediction reference samples (310).

Furthermore, in the example of FIG. 14A, video encoder 20 may include, in a video data bitstream, data representing residual data based on the predictive block (312). In some examples, video encoder 20 may generate the residual data such that each sample of the residual data indicates a difference between a sample in the predictive block and a corresponding sample of the block being encoded. The data representing the residual data may be transformed, quantized, and/or entropy encoded.

Figure 14B:
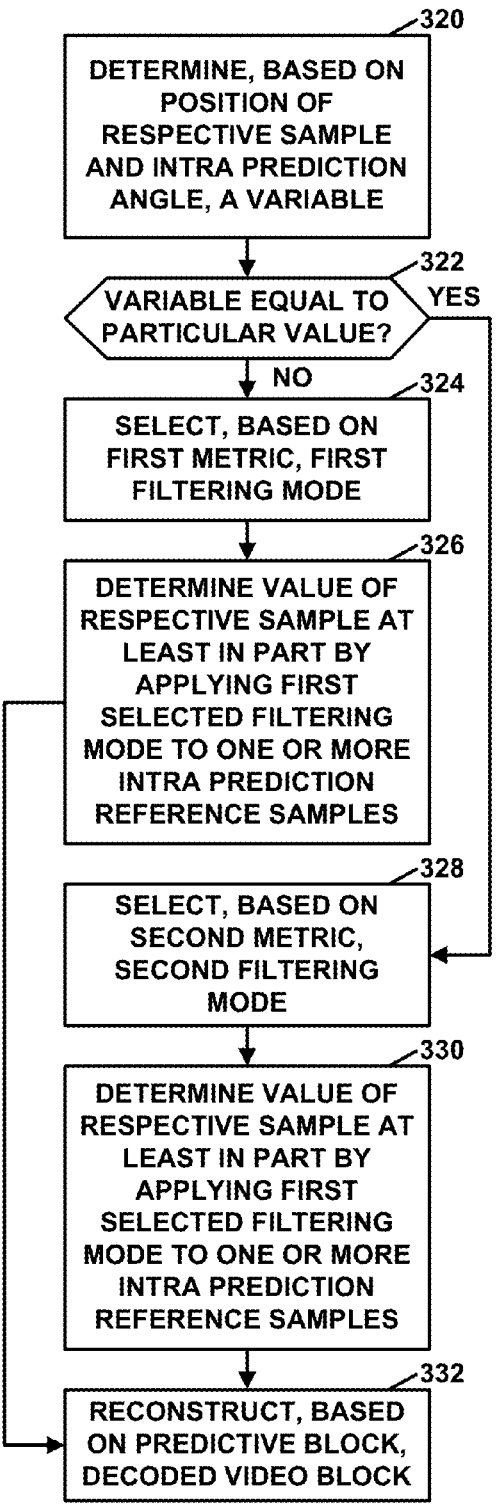
FIG. 14B is a flowchart illustrating an example operation of a video decoder to decode video data, in accordance with one or more techniques of this disclosure.

FIG. 14B is a flowchart illustrating an example operation of video decoder 30 to decode video data, in accordance with one or more techniques of this disclosure. In the example of FIG. 14B, video decoder 30 may perform actions 320-330 for each respective sample in a predictive block.

Particularly, in the example of FIG. 14B, video decoder 30 may determine, based at least in part on a position of the respective sample and an intra-prediction angle, a variable (320). In addition, video decoder 30 may determine whether the variable is equal to a particular value (322). In some examples, the variable is equal to ((x+1)*intraPredAngle) & 31, where x is a row or column position of the respective sample and intraPredAngle is the intra-prediction angle. Furthermore, in such examples, the particular value is equal to 0.

When the variable is not equal to a particular value ("NO" of 322), video decoder 30 may select, based at least in part on a first metric, a first filtering mode from among smoothing filtering and bilinear interpolation filtering (324). In some examples, video decoder 30 may select smoothing filtering in response to determining that the metric exceeds (or does not exceed) a threshold (e.g., 50). In some examples, video decoder 30 may select bilinear interpolation filtering in response to determining that the metric exceeds (or does not exceed) a threshold (e.g., 50). In addition, video decoder 30 may determine a value of the respective sample at least in part by applying the first selected filtering mode to one or more intra-prediction reference samples (326).

On the other hand, when the variable is equal to the particular value ("YES" of 322), video decoder 30 may select, based at least in part on a second metric, a second filtering mode from among smoothing filtering and nearest neighbor interpolation (328). In some examples, video decoder 30 may select bilinear interpolation in response to determining that the metric exceeds (or does not exceed) a threshold (e.g., 50). In some examples, video decoder 30 may select nearest neighbor interpolation in response to determining that the metric exceeds (or does not exceed) a threshold (e.g., 50). In some examples, video decoder 30 may calculate the first or the second metric based at least in part on a sum of absolute differences between neighboring reference samples. In other examples, video decoder 30 may calculate the first or the second metric based at least in part on a variance. Furthermore, in some examples, the first metric is the same as the second metric. Additionally, in FIG. 14B, video decoder 30 may determine a value of the respective sample at least in part by applying the second selected filtering mode to the one or more intra-prediction reference samples (330).

Video decoder 30 may reconstruct, based in part on the predictive block, a decoded video block (332). For example, video decoder 30 may reconstruct the decoded video block such that each sample of the decoded video block is equal to a sum of a sample in the predictive block and a corresponding sample of a block of residual samples.

Figure 15A:
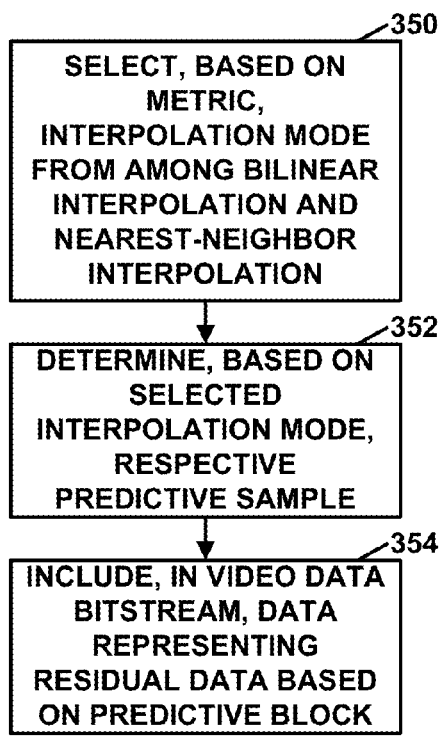
FIG. 15A is a flowchart illustrating an example operation of a video encoder to encode video data, in accordance with one or more techniques of this disclosure.

FIG. 15A is a flowchart illustrating an example operation of video encoder 20 to encode video data, in accordance with one or more techniques of this disclosure. In the example of FIG. 15A, video encoder 20 may perform actions 350 and 352 for each respective sample in a predictive block.

In the example of FIG. 15A, video encoder 20 may select, based at least in part on a metric, an interpolation mode from among bilinear interpolation and nearest-neighbor interpolation (350). In some examples, the metric is an absolute difference between two reference samples used for prediction of the respective predictive sample. Additionally, in some examples, when video encoder 20 selects the interpolation mode, video encoder 20 selects nearest-neighbor interpolation as the selected interpolation mode when the metric is greater than a threshold. In such examples, video encoder 20 selects bilinear interpolation as the selected interpolation mode when the metric is less than or equal to the threshold.

Furthermore, in the example of FIG. 15A, video encoder 20 may determine, based on the selected interpolation mode, the respective predictive sample (352). Video encoder 20 may include, in a video data bitstream, data representing residual data based on the predictive block (354). In some examples, video encoder 20 may generate the residual data such that each sample of the residual data indicates a difference between a sample in the predictive block and a corresponding sample of the block being encoded. The data representing the residual data may be transformed, quantized, and/or entropy encoded.

Figure 15B:
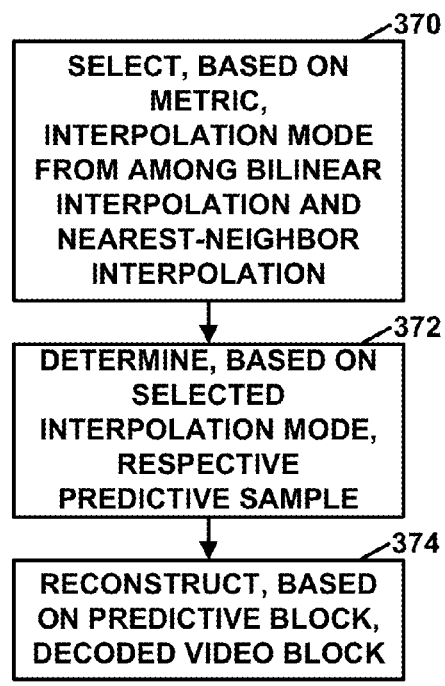
FIG. 15B is a flowchart illustrating an example operation of a video decoder to decode video data, in accordance with one or more techniques of this disclosure.

FIG. 15B is a flowchart illustrating an example operation of video decoder 30 to decode video data, in accordance with one or more techniques of this disclosure. In the example of FIG. 15B, video decoder 30 may perform actions 370 and 372 for each respective predictive sample in a predictive block.

In the example of FIG. 15B, video decoder 30 may select, based at least in part on a metric, an interpolation mode from among bilinear interpolation and nearest-neighbor interpolation (370). In some examples, the metric is an absolute difference between two reference samples used for prediction of the respective predictive sample. Additionally, in some examples, when video decoder 30 selects the interpolation mode, video decoder 30 selects nearest-neighbor interpolation as the selected interpolation mode when the metric is greater than a threshold. In such examples, video decoder 30 selects bilinear interpolation as the selected interpolation mode when the metric is less than or equal to the threshold.

Furthermore, in the example of FIG. 15B, video decoder 30 may determine, based on the selected interpolation mode, the respective predictive sample (372). Video decoder 30 may reconstruct, based in part on the predictive block, a decoded video block (374). For example, video decoder 30 may reconstruct the decoded video block such that each sample of the decoded video block is equal to a sum of a sample in the predictive block and a corresponding sample of a block of residual samples.

Figure 16:
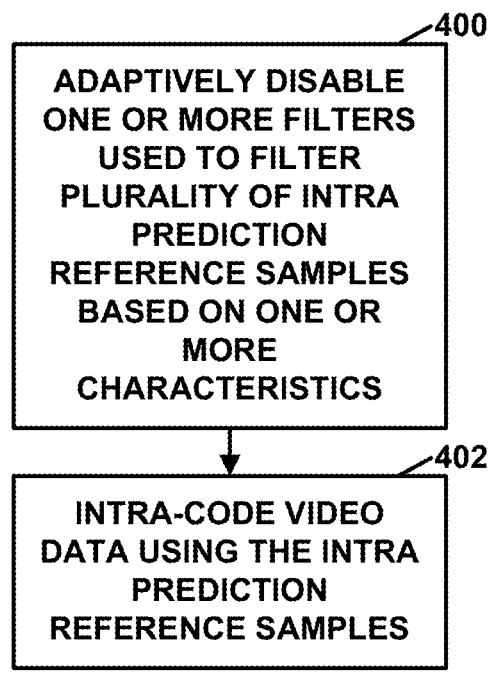
FIG. 16 is a flowchart illustrating an example operation of a video coder for coding video data, in accordance with one or more techniques of this disclosure.

FIG. 16 is a flowchart illustrating an example operation of a video coder for coding video data, in accordance with one or more techniques of this disclosure. In the example of FIG. 16, the video coder adaptively disables one or more filters used to filter a plurality of intra-prediction reference samples based on one or more characteristics of at least some of the intra-prediction reference samples (400).

Furthermore, the video coder may intra-code video data using the intra-prediction reference samples (402). In some examples, as part of intra-coding the video data, the video coder may perform intra-decoding. Intra-decoding may comprise intra-decoding video data based on the intra-prediction reference samples (either filtered, partially filter, or unfiltered as a result of adaptively disabling one or more filters) and residual data. In other examples, intra-coding comprises intra-encoding. Intra-encoding may comprise intra-decoding video data based on the intra-prediction reference samples (either filtered, partially filter, or unfiltered as a result of adaptively disabling one or more filters) and residual data.

In some examples, the one or more characteristics include whether a pixel difference (e.g., an absolute pixel difference) between reference samples in the plurality of reference samples exceeds a predetermined threshold. Furthermore, in some examples, the one or more characteristics include whether a count of a number of instances in which a pixel difference (e.g., an absolute pixel difference) between reference samples of the plurality of reference samples exceeds a predetermined threshold exceeds a count threshold. Additionally, in some examples, the one or more characteristics include whether a count of a number of instances, in which a pixel difference (e.g., an absolute pixel difference) between reference samples of the plurality of reference samples exceeds a first predetermined threshold, exceeds a first count threshold, and whether a count of a number of instances, in which a pixel difference between reference samples of the plurality of reference samples is less than a second predetermined threshold, exceeds a second count threshold.

In some examples, the one or more characteristics include whether an output (e.g., an absolute value of an output) of a 3-tap finite impulse response (FIR) filter applied to reference samples of the plurality of reference samples exceeds a threshold. In some examples, the one or more characteristics include whether a count of instances, in which an output (e.g., an absolute value of an output) of a 3-tap FIR filter applied to reference samples of the plurality of reference samples exceeds a threshold, exceeds a count threshold. In either of these examples, reference samples to which the FIR filter is applied may include successive sets of three reference samples in a path through an array of the reference samples, incremented by one pixel at a time or by three pixels at a time. Furthermore, in either of these examples, reference samples to which the FIR filter is applied include reference samples $P_{2M-1, -1}$, $P_{-1,-1}$, and $P_{-1,2N-1}$, reference samples $P_{2M-1, -1}$, $P_{M,-1}$, and $P_{-1,1}$, or reference samples $P_{-1,2N-1}$, $P_{-1, N}$, and $P_{-1,-1}$ in an array of the reference samples.

Furthermore, in some examples, the characteristics of at least some of the intra-prediction reference samples include characteristics of a subset of less than all of the plurality of reference samples selected based on a selected one of a plurality of prediction modes. In some examples, the characteristics of at least some of the intra-prediction reference samples include characteristics of either a top row or left column of the reference samples, wherein either the top row or left column is selected based on a count of a number of instances, in which a pixel difference between reference samples of the top row or left column exceeds a predetermined threshold, exceeds a count threshold. Furthermore, in some examples, the one or more characteristics of the at least some of the intra-prediction reference samples are for a sub-sampled set of the reference samples.

Although not shown in the example of FIG. 16, the video coder may also selectively adapt one or more thresholds based on at least one of block size, component type, or input video type. In addition, the video coder may selectively turn on and off the step of adaptively disabling based on at least one of block size or component type. In some such examples, one or more of the thresholds are signaled in an encoded bitstream. For instance, in various examples, the one or more of the thresholds are signaled in at least one of a PPS, a SPS, or a VPS.

As indicated above, the video coder may adaptively disable one or more filters used to filter the plurality of intra-prediction reference samples. In some examples, as part of adaptively disabling the one or more filters, the video coder may adaptively disable, based on one or more characteristics of intra-prediction samples neighboring a CU, the one or more filters for all PUs or TUs in the CU. Furthermore, in some examples, as part of adaptively disabling the one or more filters, the video coder may adaptively disable the one or more filters for individual PUs or TUs in a CU based on one or more characteristics of individual sets of intra-prediction samples neighboring the respective PUs or TUs.

Furthermore, although not shown in the example of FIG. 16, the video coder may turn on a disabling flag based on the one or more characteristics. In other examples, the video coder may receive the disabling flag in an encoded bitstream. In these examples, the one or more filters are disabled when the disabling flag is turned on.

Figure 17:
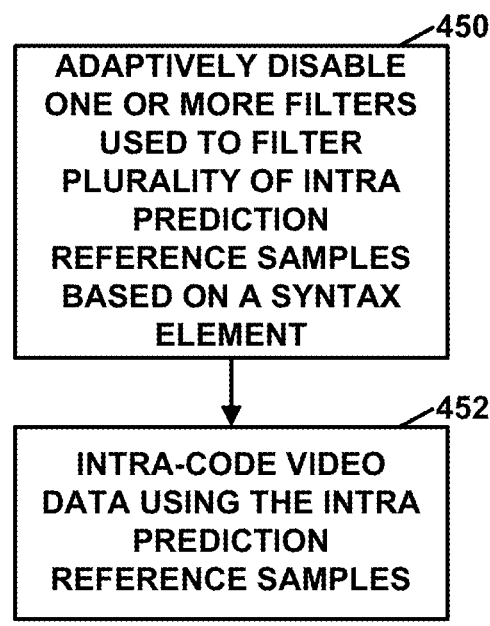
FIG. 17 is a flowchart illustrating an additional operation of a video coder for coding video data, in accordance with one or more techniques of this disclosure.

FIG. 17 is a flowchart illustrating an additional operation of a video coder for coding video data, in accordance with one or more techniques of this disclosure. In the example of FIG. 17, the video coder adaptively disables one or more filters used to filter a plurality of intra-prediction reference samples based on a syntax element (450). In some examples, the syntax element is a transform_skip_flag and the video coder disables the one or more filters when the transform_skip_flag is turned on. In at least some such examples, the transform_skip_flag invokes a transform skip operation where residual signals after prediction are quantized without transformation.

In some examples, the syntax element is a cu_transquant_bypass_flag and the video coder disables the one or more filters when the cu_transquant_bypass_flag is turned on. In at least some examples, the cu_transquant_bypass_flag invokes an operation in which a predicted block is coded without quantization and transformation Furthermore, in some examples, the syntax element is a transform skip syntax element, the method comprising disabling the one or more filters when the transform skip syntax element is turned on. In at least some such examples, the transform skip syntax element invokes a transform skip operation where residual signals after prediction are quantized without transformation.

In some examples, the syntax element is a quantization and transform bypass syntax element and the video coder disables the one or more filters when the quantization and transform bypass syntax element is turned on. In at least some such examples, the quantization and transform bypass syntax element invokes an operation in which a predicted block is coded without quantization and transformation.

Furthermore, in the example of FIG. 17, the video coder intra-codes video data using the intra-prediction reference samples (452). In some examples, intra-coding comprises intra-decoding. Intra-decoding may comprise intra-decoding video data based on the intra-prediction reference samples including one of filtered, partially filtered, and unfiltered reference samples as a result of adaptively disabling the one or more filters and residual data. In other examples, intra-coding comprises intra-encoding. Intra-encoding may comprise intra-encoding video data based on the intra-prediction reference samples including one of filtered, partially filtered, or unfiltered reference samples as a result of adaptively disabling the one or more filters and residual data.

Figure 18:
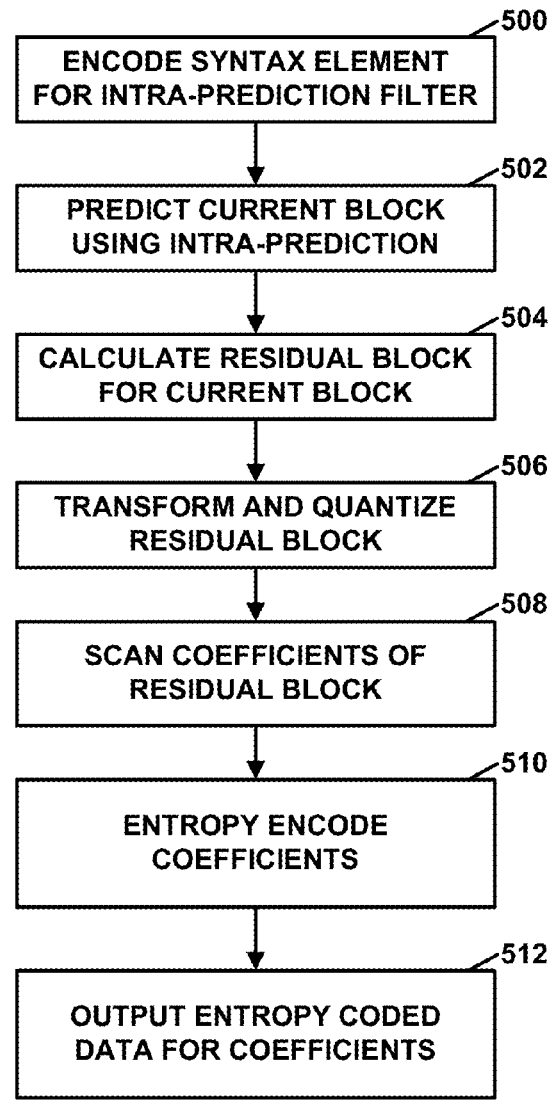
FIG. 18 is a flowchart illustrating an example method for encoding a current block.

FIG. 18 is a flowchart illustrating an example method for encoding a current block. The current block may comprise a current CU or a portion of the current CU. Although described with respect to video encoder 20 (FIGS. 1 and 10), it should be understood that other devices may be configured to perform a method similar to that of FIG. 18.

In this example, video encoder 20 encodes a syntax element for an intra-prediction filter (500), where the value of the syntax element indicates whether the intra-prediction filter is enabled. Encoding the syntax element may include CABAC coding the syntax element, which may involve selecting a context for coding the syntax element, as discussed above. Video encoder 20 then predicts the current block (502). In particular, if the intra-prediction filter is enabled, video encoder 20 may execute the intra-prediction filter, whereas if the intra-prediction filter is not enabled, video encoder 20 may skip execution of the intra-prediction filter. Video encoder 20 may calculate one or more PUs for the current block.

Video encoder 20 may then calculate a residual block for the current block, e.g., to produce a TU (504). To calculate the residual block, video encoder 20 may calculate a difference between the original, unencoded block and the predicted block for the current block. Video encoder 20 may then transform and quantize coefficients of the residual block (506). Next, video encoder 20 may scan the quantized transform coefficients of the residual block (508). During the scan, or following the scan, video encoder 20 may entropy encode the coefficients (510). For example, video encoder 20 may encode the coefficients using CAVLC or CABAC. Video encoder 20 may then output the entropy coded data of the block (512).

In this manner, the method of FIG. 18 represents an example of a method including coding (encoding, in this example) a value for a syntax element representative of whether to enable at least one filter for intra-prediction of at least one block of video data, and intra-predictive coding (encoding, in this example) the at least one block of video data, wherein when the value for the syntax element represents that the at least one filter is enabled, intra-predictive coding the at least one block comprises filtering intra-predictive data for the at least one block.

Figure 19:
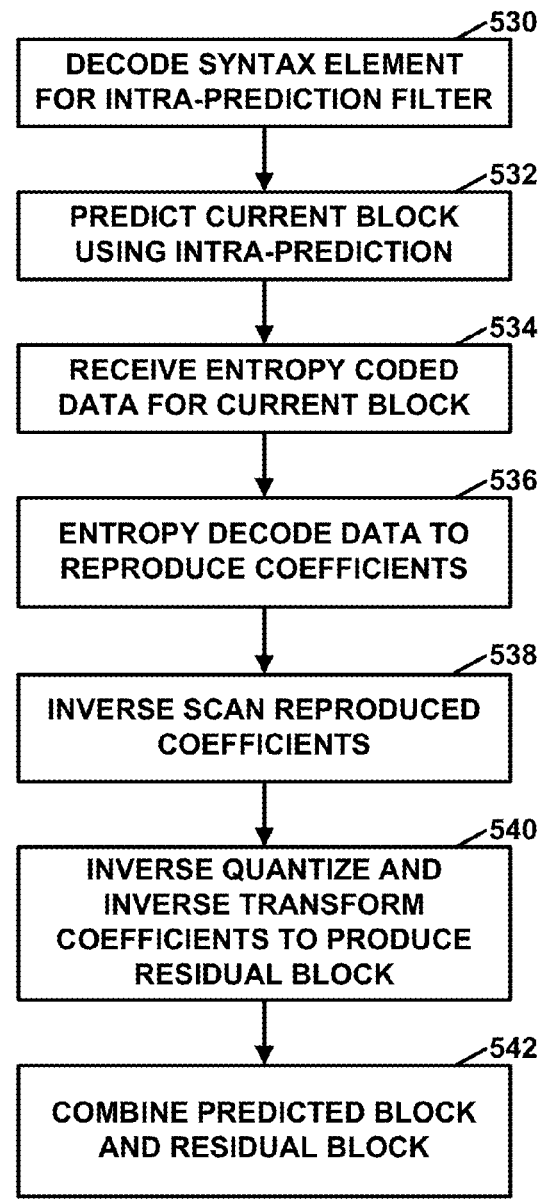
FIG. 19 is a flowchart illustrating an example method for decoding a current block of video data.

FIG. 19 is a flowchart illustrating an example method for decoding a current block of video data. The current block may comprise a current CU or a portion of the current CU. Although described with respect to video decoder 30 (FIGS. 1 and 11), it should be understood that other devices may be configured to perform a method similar to that of FIG. 19.

Video decoder 30 may decode a syntax element (e.g., a flag) for an intra-prediction filter for a current block (530). The value of the syntax element may indicate whether the intra-prediction filter is enabled or disabled for the current block. Again, decoding the value of the syntax element may be performed using CABAC, and determination of a context for decoding the syntax element may be performed in accordance with the techniques described above.

Video decoder 30 may then predict the current block (532), e.g., using an intra-prediction mode to calculate a predicted block for the current block. When the syntax element indicates that the filter is enabled, video decoder 30 may execute the filter, whereas when the syntax element indicates that the filter is not enabled, video decoder 30 may skip execution of the filter. Video decoder 30 may also receive entropy coded data for the current block, such as entropy coded data for coefficients of a residual block corresponding to the current block (534). Video decoder 30 may entropy decode the entropy coded data to reproduce transform coefficients of the residual block (536). Video decoder 30 may then inverse scan the reproduced coefficients (538), to create a block of quantized transform coefficients. Video decoder 30 may then inverse quantize and inverse transform the coefficients to produce a residual block (540). Video decoder 30 may ultimately decode the current block by combining the predicted block and the residual block (542). For example, video decoder 30 may combine the predicted block and the residual block such that each sample in the decoded current block is equal to a sum of a sample in the predicted block and a corresponding sample of the residual block. A sample in a predicted block (i.e., predictive block) may correspond to a sample of a residual block if the two samples correspond to the same location within a picture.

In this manner, the method of FIG. 19 represents an example of a method including coding (decoding, in this example) a value for a syntax element representative of whether to enable at least one filter for intra-prediction of at least one block of video data, and intra-predictive coding (decoding, in this example) the at least one block of video data, wherein when the value for the syntax element represents that the at least one filter is enabled, intra-predictive coding the at least one block comprises filtering intra-predictive data for the at least one block.

Figure 20:
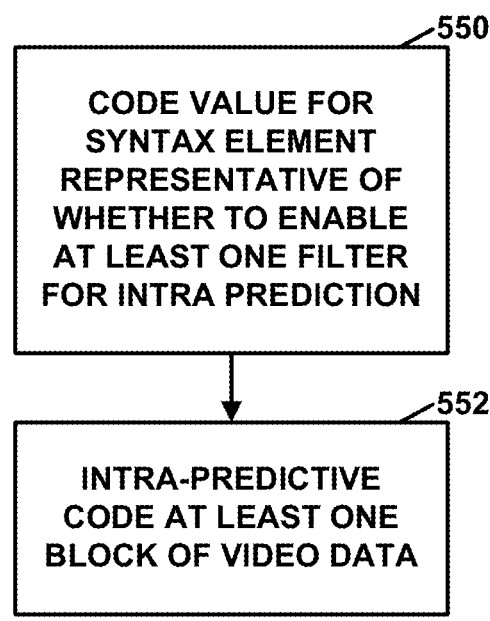
FIG. 20 is a flowchart illustrating an example operation of a video coder to code video data, in accordance with one or more techniques of this disclosure.

FIG. 20 is a flowchart illustrating an example operation of a video coder to code video data, in accordance with one or more techniques of this disclosure. In the example of FIG. 20, the video coder may code a value for a syntax element representative of whether to enable at least one filter for intra-prediction of at least one block of video data (550). In addition, the video coder may perform intra-predictive coding of the at least one block of video data (552). When the value for the syntax element represents that the at least one filter is enabled, intra-predictive coding the at least one block comprises filtering intra-predictive data for the at least one block.

In the example of FIG. 20, the at least one block may be (or comprise) a TU. Furthermore, in some such examples, the value for the syntax element may comprise coding the value for a syntax element of the TU. When the at least one block comprises a non-square rectangular block, the syntax element may comprise a first syntax element for a first square portion of the non-square rectangular block and the method further comprises coding a second value for a second square portion of the non-square rectangular block. Furthermore, in some examples, the at least one block comprises the non-square rectangular block when the at least one block conforms to a 4:2:2 video format.

Furthermore, in some examples, the syntax element comprises a syntax element for one of a luminance block, a first chrominance block, and a second chrominance block. In such examples, the video coder may code values for syntax elements for each of the luminance block, the first chrominance block, and the second chrominance block. In such examples, the syntax elements may represent whether to enable the at least one filter for intra-prediction of the respective luminance block, first chrominance block, or second chrominance block.

In some examples, the syntax element may comprise a syntax element for a luminance block or a first chrominance block and a second chrominance block. In such examples, the video coder may code a first value for a syntax element for the luminance block and a second value for a second syntax element for the first chrominance block and the second chrominance block. The first syntax element represents whether to enable the at least one filter for intra-prediction of the luminance block. The second syntax element represents whether to enable the at least one filter for intra-prediction of the first chrominance block and the second chrominance block. In such examples, the first chrominance block may comprise a blue-hue chrominance block (e.g., a Cb block) and the second chrominance block may comprise a red-hue chrominance block (e.g., a Cr block).

As indicated above, the video coder may code the value of the syntax element. In some examples, the video coder may code the value for the syntax element for a partition of a CU. In such examples, the CU has a size of 2N×2N pixels and the partition of the CU comprises one of a 2N×2N pixel sized partition and an N×N pixel sized partition. Furthermore, in some examples, the video coder may code data indicative of whether the CU comprises a single partition or a plurality of partitions. When the data indicates that the CU comprises the single partition, the video coder may code a value for a single syntax element for the single partition. When the data indicates that the CU comprises the plurality of partitions, the video coder may code values for respective syntax elements for each of the partitions. In some such examples, the plurality of partitions may comprise four partitions.

Furthermore, in some examples, each partition of the CU may comprise a luminance component, a first chrominance component, and a second chrominance component. For each partition, the video coder may code values for a first syntax element representative of whether to enable the at least one filter for the luminance component, a second syntax element representative of whether to enable the at least one filter for the first chrominance component, and a third syntax element representative of whether to enable the at least one filter for the second chrominance component. In some such examples, when the video coder codes the values for the first syntax element, the second syntax element, and the third syntax element, the video coder may code the values for the first syntax element, the second syntax element, and the third syntax element only when the block conforms to a 4:4:4 video format.

In some examples, each partition of the CU comprises a luminance component, a first chrominance component, and a second chrominance component. For each partition, the video coder may code a value for a single syntax element representative of whether to enable the at least one filter for each of the luminance component, the first chrominance component, and the second component. In at least some such examples, the first chrominance component comprises a blue-hue chrominance component (i.e., Cb), and the second chrominance component comprises a red-hue chrominance component (i.e., Cr).

Furthermore, in some examples, for each partition, the video coder may code a value of a respective syntax element for a luminance component of the partition representative of whether to enable the at least one filter for the luminance component of the partition. For the CU, the video coder may code a value of a respective syntax element representative of whether to enable the at least one filter for chrominance components of all partitions of the CU.

In some examples, when the video coder codes the value for the syntax element, the video coder may code the value for the syntax element for a CU. In some such examples, the video coder may code a first value for a first syntax element representative of whether to enable the at least one filter for luminance components of one or more partitions of the CU. In addition, the video coder may code a second value for a second syntax element representative of whether to enable the at least one filter for chrominance components of a first type of the one or more partitions of the CU. Furthermore, the video coder may code a third value for a third syntax element representative of whether to enable the at least one filter for chrominance components of a second type of the one or more partitions of the CU. Furthermore, in some examples, the video coder may code a first value for a first syntax element representative of whether to enable the at least one filter for luminance components of one or more partitions of the CU. Additionally, the video coder may code a second value for a second syntax element representative of whether to enable the at least one filter for chrominance components of a first type and of a second type of the one or more partitions of the CU. In some such examples, the chrominance components of the first type comprise blue-hue chrominance components (i.e., Cb), and the chrominance components of the second type comprise red-hue chrominance components (i.e., Cr).

Furthermore, in some examples, the video coder may code the value for the syntax element only when the block comprises an N×N pixel size partition of a 2N×2N pixel size CU. In other examples, the video coder may code the value for the syntax element only when the block comprises a CU having a size that is less than a threshold. In some such examples, the video coder may code a value of a syntax element representative of the threshold in at least one of a slice header of a slice including the block, a PPS for a picture including the block, a SPS for a sequence of pictures including the block, and a VPS for one or more layers of video data including the block.

In some examples, the video coder may code the value for the syntax element only when the block comprises a TU having a size that is less than a threshold. Furthermore, in at some such examples, the video coder may code a value of a syntax element representative of the threshold in at least one of a slice header of a slice including the block, a PPS for a picture including the block, a SPS for a sequence of pictures including the block, and a VPS for one or more layers of video data including the block.

In some examples, the video coder codes the value for the syntax element only when the block is coded using a particular prediction mode. In some examples, the video coder codes the value for the syntax element only when a value for a syntax element indicates that the at least one filter can be selectively enabled or disabled. In some examples, the video coder codes the value for the syntax element indicating whether the at least one filter can be selectively enabled or disabled in at least one of a slice header of a slice including the block, a PPS for a picture including the block, a SPS for a sequence of pictures including the block, and a VPS for one or more layers of video data including the block.

Furthermore, in some examples, the video coder codes the value for the syntax element only for a luminance channel. In other examples, the video coder codes the value for the syntax element only for luminance components of blocks. In other examples, the video coder codes the value for the syntax element only when the block comprises a CU having a size that is a smallest-supported CU size. In other examples, the video coder codes the value for the syntax element only when the block comprises a TU having a size that is a smallest-supported TU size. In other examples, the video coder may code the value for the syntax element only when the block comprises a TU and when a coded block flag for the TU indicates that the TU includes at least one non-zero coefficient.

Additionally, in some examples, when the video coder codes the value for the syntax element, the video coder may code the value for the syntax element using CABAC. In some such examples, the video coder may determine a context for coding the syntax element based on whether the syntax element corresponds to a luminance channel, a first chrominance channel, or a second chrominance channel. In some such examples, the video coder may determine a context for coding the syntax element based on whether the syntax element corresponds to a luminance channel or one of a first chrominance channel or a second chrominance channel. Furthermore, in some such examples, the first chrominance channel comprises a blue-hue chrominance channel (i.e., Cb), and the second chrominance channel comprises a red-hue chrominance channel (i.e., Cr).

In some examples, the video coder may determine a context for the syntax element based on whether the syntax element corresponds to a luminance component of the block, a first chrominance component of the block, or a second chrominance component of the block. In some examples, the video coder may determine a context for the syntax element based on whether the syntax element corresponds to a luminance component of the block or one of a first chrominance component of the block or a second chrominance component of the block. In such examples, the first chrominance component may comprise a blue-hue chrominance component (i.e., Cb), and the second chrominance component may comprise a red-hue chrominance component (i.e., Cr).

Furthermore, in some examples, the block may comprise a current block and the video coder may determine a context for the syntax element based on a value for the syntax element of at least one neighboring block to the current block. The at least one neighboring block may comprise at least one of a left-neighboring block to the current block and an above-neighboring block to the current block. Furthermore, when the neighboring block is not available or when a value for the syntax element of the neighboring block is zero, the video coder may determine the context comprises determining that a context index for the context is equal to 0. In some examples, when a value for the syntax element of the neighboring block is equal to one, the video coder may determine the context comprises determining that a context index for the context is equal to 1.

In some examples, the video coder may determine a context for coding the syntax element based on at least one of a variance of reference samples for the block, a sum of absolute difference between two adjacent pixels, a maximum difference among pixels that is larger than a threshold, a comparison of a count of numbers having the maximum difference to a threshold, a comparison of a result of [1, −2, 1] FIR filtering to a threshold, a count of a number of sign changes of pixel differences, a prediction mode for predicting the block, a size of the block, and a partition size for the block.

Additionally, in some examples, the video coder may code the value for the syntax element for a first result of a comparison of a size of the block to a threshold, wherein for a different result, the method comprises inferring a value for the syntax element representative of whether to enable the at least one filter. In some such examples, the first result comprises the comparison indicating that the size of the block is greater than the threshold. In some examples, the first result comprises the comparison indicating that the size of the block is less than the threshold.

Furthermore, in some examples, the video coder may infer a value for the syntax element when the syntax element is for a luminance channel or a luminance component of the block. In some examples, the video coder may infer a value for the syntax element when the syntax element is for a chrominance channel or a chrominance component of the block.

In some examples, when the video coder codes the value for the syntax element, the video coder may code the value for a first syntax element for the at least one filter. In such examples, the video coder may infer a value for a second syntax element representative of whether to enable a second, different filter for intra-prediction of the block.

In some examples, when the video coder codes the value for the syntax element, the video coder may code the value for a syntax element of at least one of a slice header, a PPS, a SPS, and a VPS. In some such examples, the video coder may code a value for a syntax element representative of whether to enable the at least one filter for intra-prediction of the block only when the value for the syntax element of the at least one of the slice header, the PPS, the SPS, and the VPS indicates that the at least one filter for intra-prediction can be enabled.

In some examples, the at least one filter comprises at least one of an MDIS filter, a 32-tap interpolation filter, and an edge filter. Furthermore, in some examples, when the video coder intra-predictive codes the block, the video coder may execute the at least one filter when the value for the syntax element indicates that the at least one filter is enabled. Furthermore, the video coder may skip execution of the at least one filter when the value for the syntax element indicates that the at least one filter is not enabled. Additionally, in some examples, the at least one filter comprises at least one of a mode-dependent intra-smoothing (MDIS) filter, a ⅟₃₂-pixel bi-linear interpolation filter, a boundary filter, an edge filter, and a DC filter.

In some examples, the at least one block corresponds to one of a CU and a TU. Furthermore, when the video coder codes the value for the syntax element, the video coder codes the value for a syntax element for the CU or the TU prior to coding a value for a transform skip flag syntax element. In addition, the video coder may determine whether to enable or disable the at least one filter based at least in part on the value for the syntax element representative of whether to enable the at least one filter and the value for the transform skip flag syntax element.

In at least the example of the preceding paragraph, when the video coder determines whether to enable or disable the at least one filter, the video coder may enable or disable the at least one filter as specified in the HEVC Range Extensions specification (JCTVC-M1005-v2) when the syntax element representative of whether to enable the at least one filter has a value indicating that filtering can be disabled and when the transform skip flag syntax element has a value that indicates that no transform is to be applied to the TU or when the syntax element representative of whether to enable the at least one filter has a value indicating that filtering has a value indicating that filtering is not to be disabled. In addition, the video coder may disable the at least one filter when the syntax element representative of whether to enable the at least one filter has a value indicating that filtering can be disabled and when the value of the transform skip flag syntax element indicates that whether to apply the transform to the TU depends on other syntax elements. That is, a video decoder may determine, based on syntax elements other than the transform skip flag, whether to apply the transform.

Furthermore, in some examples, when the video coder determines whether to enable or disable the at least one filter, the video coder enables or disables the at least one filter as specified in the HEVC Range Extensions specification (JCTVC-M1005-v2) when the syntax element representative of whether to enable the at least one filter has a value indicating that filtering can be disabled. In some examples, when the video coder determines whether to enable or disable the at least one filter, the video coder enables or disables the at least one filter as specified in the HEVC Range Extensions specification (JCTVC-M1005-v2) when the syntax element representative of whether to enable the at least one filter has a value indicating that filtering has a value indicating that filtering is not to be disabled. In some examples, when the video coder determines whether to enable or disable the at least one filter, the video coder may disable the at least one filter when the syntax element representative of whether to enable the at least one filter has a value indicating that filtering can be disabled and when the transform skip flag syntax element indicates that whether to apply the transform to the TU depends on other syntax elements.

In some examples, the value indicating that filtering can be disabled for the syntax element representative of whether to enable the at least one filter comprises a value of 1. In some examples, the value indicating that filtering is not to be disabled for the syntax element representative of whether to enable the at least one filter comprises a value of 0. Furthermore, in some examples, the value that indicates that no transform is to be applied to the TU for the transform skip flag syntax element comprises a value of 1. In some examples, the value for the transform skip flag syntax element that indicates that whether to apply the transform to the TU depends on other syntax elements comprises a value of 0.

Furthermore, in some examples, when the video coder determines whether to enable or disable the at least one filter, the video coder may enable or disable the at least one filter based at least in part on a value for the syntax element representative of whether to enable the at least one filter and a value for a transquant_bypass_flag for the at least one block.

In some examples, the video coder may determine whether to disable the at least one filter using implicit derivation. In some examples, the video coder may determine whether to disable the at least one filter comprises determining whether to disable the at least one filter using a 3-tap FIR filter [1, −2, 1]. In at least some such examples, when the video coder determines whether to disable the at least one filter, the video coder may determine whether to enable or disable the at least one filter as specified in the HEVC Range Extensions specification (JCTVC-M1005-v2) when the syntax element representative of whether to enable the at least one filter has a value indicating that filtering can be disabled for the at least one block and when a result of the FIR filter is below a threshold. Furthermore, in some such examples, when the video coder determines whether to disable the at least one filter, the video coder may disable the at least one filter when the syntax element representative of whether to enable the at least one filter has a value indicating that filtering can be disabled for the at least one block and when a result of the FIR filter is equal to or above a threshold.

In some examples, when the video coder intra-predictive codes the block, the video coder may intra-predict a predicted block for the block, decode one or more residual values for the block, and combine the predicted block with the residual values to decode the block. For example, the video coder may combine the predicted block and the residual values such that each sample in the decoded block is equal to a sum of a sample in the predicted block and a corresponding residual sample. In other examples, when the video coder intra-predictive codes the block, the video coder may intra-predict a predicted block for the block, calculate one or more residual values for the block based on differences between the block and the predicted block; and encode the residual values.

Figures 21A, 21B:
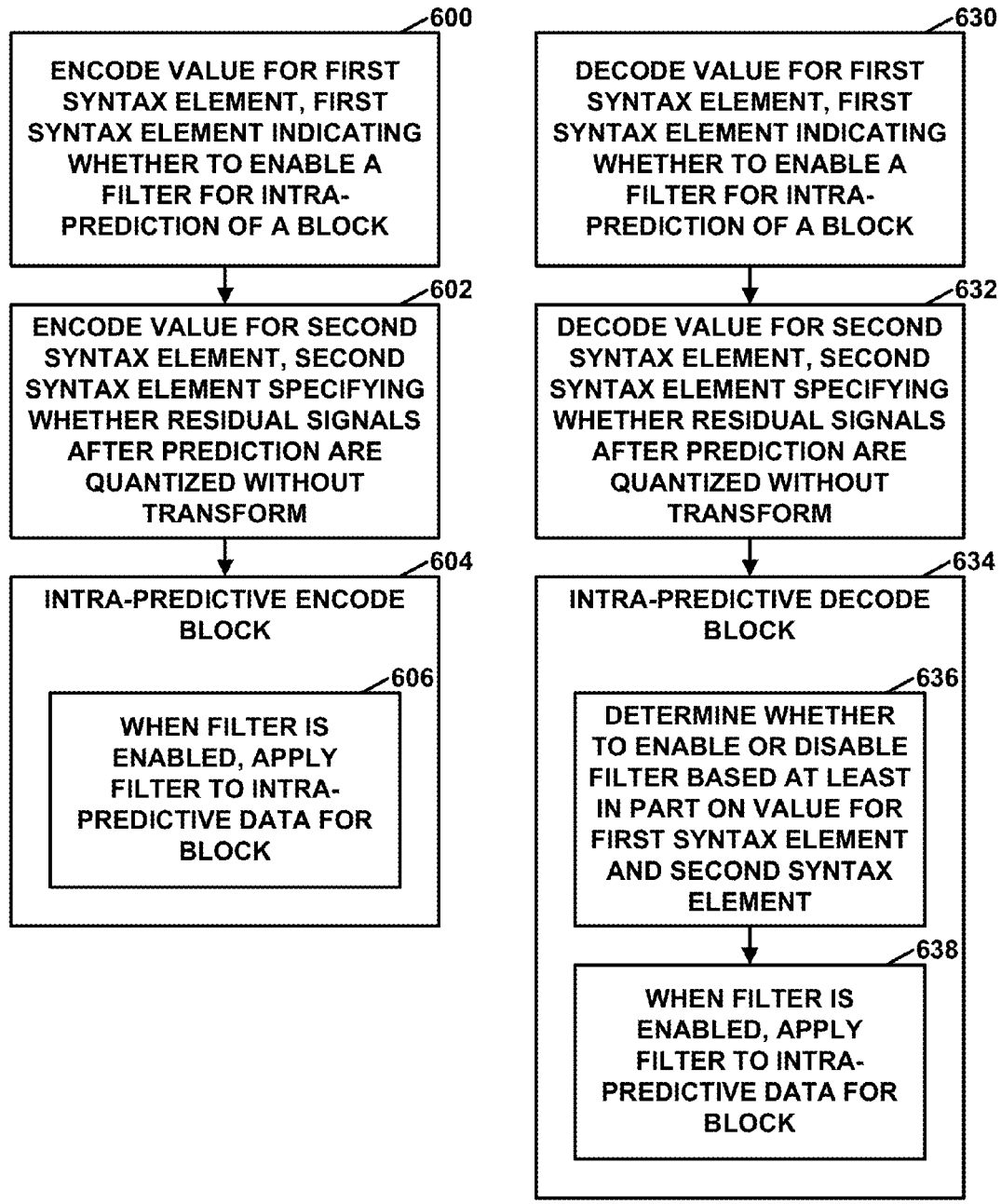
FIG. 21A is a flowchart illustrating an example operation of a video encoder to encode video data, in accordance with one or more techniques of this disclosure.
FIG. 21B is a flowchart illustrating an example operation of a video decoder to decode video data, in accordance with one or more techniques of this disclosure.

FIG. 21A is a flowchart illustrating an example operation of video encoder 20 to encode video data, in accordance with one or more techniques of this disclosure. In the example of FIG. 21A, video encoder 20 may encode a value for a first syntax element (e.g., a filter_disable_flag syntax element), the first syntax element being representative of whether to enable a filter for intra-prediction of a block of the video data (600). In other words, video encoder 20 may include, in a bitstream, data indicating the first syntax element. In some instances, including the data indicating the first syntax element comprises entropy encoding (e.g., CABAC encoding) the first syntax element. In some examples, the filter is a bilinear interpolation filter, as described in JCTVC-M1005-v2.

Furthermore, video encoder 20 may encode a value for a second syntax element (e.g., a transform_skip_flag syntax element), the second syntax element specifying whether residual signals after prediction are quantized without transform (602). In other words, video encoder 20 may include, in the bitstream, data indicating the second syntax element. In some instances, including the data indicating the second syntax element comprises entropy encoding (e.g., CABAC encoding) the second syntax element. Video encoder 20 may set the value of the first syntax element and the second syntax element such that video decoder 30 is able to determine, based on the first syntax element and the second syntax element, whether the filter is disabled.

Additionally, video encoder 20 may intra-predictive encode the block (604). In other words, video encoder 20 may use intra prediction to encode the block. In the example of FIG. 21A, when video encoder 20 intra-predictive encodes the block, video encoder 20 may apply the filter to intra-predictive data for the block when the filter is enabled (606). For instance, video encoder 20 may apply the filter to each sample of a predictive block corresponding to the block.

FIG. 21B is a flowchart illustrating an example operation of video decoder 30 to decode video data, in accordance with one or more techniques of this disclosure. In the example of FIG. 21B, video decoder 30 may decode a value for a first syntax element (e.g., a filter_disable_flag syntax element), the first syntax element indicating (e.g., being representative of) whether to enable a filter for intra-prediction of a block of the video data (630). In other words, video decoder 30 may obtain the first syntax element from a bitstream. In some instances, obtaining the first syntax element from the bitstream comprises entropy decoding (e.g., CABAC decoding) the first syntax element. In some examples, the filter is a bilinear interpolation filter, as described in JCTVC-M1005-v2.

Furthermore, video decoder 30 may decode a value for a second syntax element (e.g., a transform_skip_flag syntax element), the second syntax element specifying whether residual signals after prediction are quantized without transform (632). In other words, video decoder 30 may obtain the second syntax element from the bitstream. In some instances, obtaining the second syntax element from the bitstream comprises entropy decoding (e.g., CABAC decoding) the second syntax element.

Additionally, video decoder 30 may intra-predictive decode the block (634). In other words, video decoder 30 may use intra prediction to decode the block. In the example of FIG. 21B, when video decoder 30 intra-predictive decodes the block, video decoder 30 may determine whether to enable or disable the filter based at least in part on the value for the first syntax element and the value for the second syntax element (636). Furthermore, when the filter is enabled, video decoder 30 may apply the filter to intra-predictive data for the block (638). For instance, video decoder 30 may apply the filter to each sample of a predictive block corresponding to the block.

FIG. 22A is a flowchart illustrating an example operation of a video encoder 20 to encode video data, in accordance with one or more techniques of this disclosure. In the example of FIG. 22A, video encoder 20 may adaptively disable one or more filters used for intra prediction (650). In some examples, the one or more filters include a smoothing filter. In some examples, the one or more filters include at least one of a bilinear interpolation filter, an edge filter, and a DC intra-prediction mode filter. The edge filter may filter a first prediction column and a first prediction row using gradient based smoothing. The DC intra-prediction mode filter may filter a first prediction row and a first prediction column of a predictive block using a DC value with a two-tap FIR filter and filters a corner sample of the predictive block using a 3-tap filter.

In addition, video encoder 20 may signal a syntax element that controls the one or more filters (652). In some examples, the syntax element is signaled in a PU. Furthermore, in some examples, the syntax element specifies whether residual signals are quantized without transformation. For instance, the syntax element may be a transform_skip_flag syntax element. In other examples, the syntax element may be a cu_transquant_bypass_flag. Furthermore, video encoder 20 may perform intra prediction to generate prediction data for a current video block the video data (654).

In some examples where the syntax element specifies whether residual signals are quantized without transformation, video encoder 20 may encode a value for a second syntax element. The second syntax element may be representative of whether to enable the one or more filters for intra-prediction of a block of the video data. Furthermore, video encoder 20 may encode a value for the first syntax element. The first and second syntax elements are set such that a video decoder is able to determine, based on the first syntax element and the second syntax element, whether the one or more filters are disabled. Furthermore, when the one or more filters are enabled, video encoder 20 may apply the one or more filters to intra-predictive data for the block. In some such examples, the one or more filters are enabled or disabled when the value for the second syntax element indicates that the one or more filters can be disabled and when the first syntax element has a value that indicates that no transform is to be applied to the TU or when the second syntax element has a value indicating that the one or more filters are not to be disabled. The one or more filters are disabled when the value of the second syntax element indicates that the one or more filters can be disabled and when the value of the first syntax element indicates that application of the transform to the TU depends on other syntax elements. The one or more filters may be specified in JCTVC-M1005-v2.

FIG. 22B is a flowchart illustrating an example operation of a video decoder 30 to decode video data, in accordance with one or more techniques of this disclosure. In the example of FIG. 22B, video decoder 30 may adaptively disable, based on a syntax element, one or more filters used for intra-prediction (670). In some examples, the one or more filters include a smoothing filter. In some examples, the one or more filters include at least one of a bilinear interpolation filter, an edge filter, and a DC intra-prediction mode filter. The edge filter may filter a first prediction column and a first prediction row using gradient based smoothing. The DC intra-prediction mode filter may filter a first prediction row and a first prediction column of a predictive block using a DC value with a two-tap FIR filter and filters a corner sample of the predictive block using a 3-tap filter. In some examples, the syntax element is signaled in a PU.

In addition, video decoder 30 may perform intra-prediction to generate prediction data for a current block of a current video slice (672). In some examples, the syntax element specifies whether residual signals are quantized without transformation (e.g., DCT). For instance, the syntax element may be a transform_skip_flag syntax element. Furthermore, in some examples, the syntax element is a first syntax element and video decoder 30 decodes a value for a second syntax element. The second syntax element may be representative of whether to enable the filter for intra-prediction of a block of the video data. In other words, the second syntax element may be a filter disable flag. Furthermore, video decoder 30 may decode a value for the first syntax element. As part of intra decoding the video data, video decoder 30 may determine whether to enable or disable the filter based at least in part on the value for the first syntax element and the value for the second syntax element. Furthermore, when the filter is enabled, video decoder 30 may apply the filter to the intra-predictive data for the block. For instance, in some examples, video decoder 30 may enable or disable the one or more filters when the value for the second syntax element indicates that the one or more filters can be disabled and when the first syntax element has a value that indicates that no transform is to be applied to a TU or when the second syntax element has a value indicating that filtering is not to be disabled. Furthermore, video decoder 30 may disable the one or more filters when the value of the second syntax element indicates that the one or more filters can be disabled and when the value of the first syntax element indicates that application of the transform to the TU depends on other syntax elements. The one or more filters may be specified in JCTVC-M1005-v2.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples, and particular combinations thereof, are within the scope of the following claims.

What is claimed is:

1. A method of decoding video data, the method comprising:
   adaptively disabling, based on a syntax element specifying whether residual signals are quantized without transformation, one or more filters used for intra-prediction; and
   performing the intra-prediction to generate a predictive block for a current block of a current video slice of a current picture of the video data based on a signaled intra prediction mode and data from previously decoded blocks of the current picture, wherein:
   the one or more filters include at least one of a mode dependent intra smoothing (MDIS) filter, a bilinear interpolation filter, an edge filter, or a DC intra-prediction mode filter,
   the MDIS filter is applied to reference samples differently for different block sizes and intra prediction modes,
   when angular prediction is used to generate the predictive block, each respective predicted sample of the predictive block is obtained by projecting a location of the respective sample to a sub-pixel location between two of the reference samples nearest to the sub-pixel location and interpolating the respective predicted sample by applying the bilinear interpolation filter to interpolate at $1/32$ pixel accuracy using the two reference samples nearest to the sub-pixel location,
   the edge filter filters a first prediction column of the predictive block and a first prediction row of the predictive block using gradient based smoothing, and
   the DC intra-prediction mode filter filters the first prediction row of the predictive block and the first prediction column of the predictive block using a DC value with a two-tap Finite Impulse Response (FIR) filter and filters a corner sample of the predictive block using a 3-tap filter.

2. The method of claim 1, wherein the syntax element is signaled in a prediction unit (PU).

3. The method of claim 1, wherein adaptively disabling the one or more filters comprises determining a value of a disabling flag that indicates whether the one or more filters are disabled.

4. The method of claim 3, wherein:
   the disabling flag is turned on if the syntax element is turned on, and
   wherein if the disabling flag is on, the one or more filters are disabled.

5. The method of claim 3, wherein:
   the two-tap FIR filter is a first FIR filter, and
   if the disabling flag is equal to 1 and a result of a second Finite Impulse Response (FIR) filter is determined to be above a threshold, the one or more filters are disabled.

6. The method of claim 1, further comprising: summing residual blocks with corresponding predictive blocks to form a decoded video block, the corresponding predictive blocks including the predictive block.

7. The method of claim 1, wherein interpolating the respective predicted sample by applying the bilinear interpolation filter comprises interpolating the respective predicted sample as follows:

$$predSamples[x][y]=((32-iFact)*ref[x+iIdx+1]+ iFact*ref[x+iIdx+2]+16)>>5$$

wherein ref[x+Idx+1] and ref[x+iIdx+2] are the references samples nearest to the sub-pixel location and iFact is a weighting between the reference samples nearest to the sub-pixel location.

8. A method of encoding video data, the method comprising:
adaptively disabling one or more filters used for intra prediction;
signaling a syntax element that controls the disabling of the one or more filters, the syntax element specifying whether residual signals are quantized without transformation; and
performing the intra prediction to generate a predictive block for a current video block of a current video slice of a current picture of the video data, wherein:
the one or more filters include at least one of a mode dependent intra smoothing (MDIS) filter, a bilinear interpolation filter, an edge filter, or a DC intra-prediction mode filter,
the MDIS filter is applied to reference samples differently for different block sizes and intra prediction modes,
when angular prediction is used to generate the predictive block, each respective predicted sample of the predictive block is obtained by projecting a location of the respective sample to a sub-pixel location between two of the reference samples nearest to the sub-pixel location and interpolating the respective predicted sample by applying the bilinear interpolation filter to interpolate at 1/32 pixel accuracy using the two reference samples nearest to the sub-pixel location,
the edge filter filters a first prediction column of the predictive block and a first prediction row of the predictive block using gradient based smoothing, and
the DC intra-prediction mode filter filters the first prediction row of the predictive block and the first prediction column of the predictive block using a DC value with a two-tap Finite Impulse Response (FIR) filter and filters a corner sample of the predictive block using a 3-tap filter.

9. The method of claim 8, wherein the syntax element is signaled in a prediction unit (PU).

10. The method of claim 8, wherein adaptively disabling the one or more filters comprises determining a value of a disabling flag that indicates whether the one or more filters are disabled.

11. The method of claim 10, wherein:
the disabling flag is turned on if the syntax element is turned on, and
if the disabling flag is on, the one or more filters are disabled.

12. The method of claim 10, wherein:
the two-tap FIR filter is a first FIR filter, and
if the disabling flag is equal to 1 and a result of the first or a second Finite Impulse Response (FIR) filter is determined to be above a threshold, the one or more filters are disabled.

13. The method of claim 8, wherein interpolating the respective predicted sample by applying the bilinear interpolation filter comprises interpolating the respective predicted sample as follows:

$$predSamples[x][y]=((32-iFact)*ref[x+iIdx+1]+iFact*ref[x+iIdx+2]+16)>>5$$

wherein ref[x+Idx+1] and ref[x+iIdx+2] are the references samples nearest to the sub-pixel location and iFact is a weighting between the reference samples nearest to the sub-pixel location.

14. A video decoding device comprising:
a computer-readable medium configured to store video data, and
one or more processors configured to:
adaptively disable, based on a syntax element specifying whether residual signals are quantized without transformation, one or more filters used for intra-prediction; and
perform the intra prediction to generate a predictive block for a current block of a current video slice of a current picture of the video data based on a signaled intra prediction mode and data from previously decoded blocks of the current picture, wherein:
the one or more filters include at least one of a mode dependent intra smoothing (MDIS) filter, a bilinear interpolation filter, an edge filter, or a DC intra-prediction mode filter,
the MDIS filter is applied to reference samples differently for different block sizes and intra prediction modes,
when angular prediction is used to generate the predictive block, each respective predicted sample of the predictive block is obtained by projecting a location of the respective sample to a sub-pixel location between two of the reference samples nearest to the sub-pixel location and interpolating the respective predicted sample by applying the bilinear interpolation filter to interpolate at 1/32 pixel accuracy using the two reference samples nearest to the sub-pixel location,
the edge filter filters a first prediction column of the predictive block and a first prediction row of the predictive block using gradient based smoothing, and
the DC intra-prediction mode filter filters the first prediction row of the predictive block and the first prediction column of the predictive block using a DC value with a two-tap Finite Impulse Response (FIR) filter and filters a corner sample of the predictive block using a 3-tap filter.

15. The video decoding device of claim 14, wherein the syntax element is signaled in a prediction unit (PU).

16. The video decoding device of claim 14, wherein as part of adaptively disabling the one or more filters, the one or more processors determine a value of a disabling flag that indicates whether the one or more filters are disabled.

17. The video decoding device of claim 16, wherein:
the disabling flag is turned on if the syntax element is turned on, and
if the disabling flag is on, the one or more filters are disabled.

18. The video decoding device of claim 16, wherein:
the two-tap FIR filter is a first FIR filter, and
if the disabling flag is equal to 1 and a result of the first or a second Finite Impulse Response (FIR) filter is determined to be above a threshold, the one or more filters are disabled.

19. The video decoding device of claim 16, wherein the one or more processors are configured to:
sum residual blocks with corresponding predictive blocks to form a decoded video block, the corresponding predictive blocks including the predictive block.

20. The video decoding device of claim 14, wherein the one or more processors are configured such that, when interpolating the respective predicted sample by applying the bilinear interpolation filter, the one or more processors interpolate the respective predicted sample as follows:

$$predSamples[x][y]=((32-iFact)*ref[x+iIdx+1]+iFact*ref[x+iIdx+2]+16)>>5$$

wherein ref[x+Idx+1] and ref[x+iIdx+2] are the references samples nearest to the sub-pixel location and iFact is a weighting between the reference samples nearest to the sub-pixel location.

21. A video decoding device comprising:
means for adaptively disabling, based on a syntax element specifying whether residual signals are quantized without transformation, one or more filters used for intra prediction; and
means for performing the intra prediction to generate a predictive block for a current block of a current video slice of a current picture of video data based on a signaled intra prediction mode and data from previously decoded blocks of the current picture, wherein:
the one or more filters include at least one of a mode dependent intra smoothing (MDIS) filter, a bilinear interpolation filter, an edge filter, or a DC intra-prediction mode filter,
the MDIS filter is applied to reference samples differently for different block sizes and intra prediction modes,
when angular prediction is used to generate the predictive block, each respective predicted sample of the predictive block is obtained by projecting a location of the respective sample to a sub-pixel location between two of the reference samples nearest to the sub-pixel location and interpolating the respective predicted sample by applying the bilinear interpolation filter to interpolate at ⅓₂pixel accuracy using the two reference samples nearest to the sub-pixel location,
the edge filter filters a first prediction column of the predictive block and a first prediction row of the predictive block using gradient based smoothing, and
the DC intra-prediction mode filter filters the first prediction row of the predictive block and the first prediction column of the predictive block using a DC value with a two-tap Finite Impulse Response (FIR) filter and filters a corner sample of the predictive block using a 3-tap filter.

22. The video decoding device of claim 21, further comprising:
means for summing residual blocks with corresponding predictive blocks to form a decoded video block, the corresponding predictive blocks including the predictive block.

23. The video decoding device of claim 21, wherein the means for performing the intra prediction to interpolate the respective predicted sample by applying the bilinear interpolation filter comprises means for interpolating the respective predicted sample as follows:

$$predSamples[x][y]=((32-iFact)*ref[x+iIdx+1]+iFact*ref[x+iIdx+2]+16)>>5$$

wherein ref[x+Idx+1] and ref[x+iIdx+2] are the references samples nearest to the sub-pixel location and iFact is a weighting between the reference samples nearest to the sub-pixel location.

* * * * *